(12) United States Patent
Kang et al.

(10) Patent No.: US 9,898,667 B2
(45) Date of Patent: Feb. 20, 2018

(54) ACCIDENT INFORMATION MANAGEMENT APPRATUS, VEHICLE INCLUDING THE SAME, AND ACCIDENT INFORMATION MANAGEMENT METHOD

(71) Applicant: HYUNDAI MOTOR COMPANY, Seoul (KR)

(72) Inventors: Kyunghyun Kang, Suwon-si (KR); Ki Dong Kang, Seoul (KR); HeeJin Ro, Seoul (KR); Seok-young Youn, Seoul (KR); Sung Un Kim, Yongin-si (KR); Bitna Baek, Seoul (KR); Ga Hee Kim, Suwon-si (KR); Jong Hyuck Heo, Yongin-si (KR); Chisung Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/957,649

(22) Filed: Dec. 3, 2015

(65) Prior Publication Data

US 2016/0275790 A1 Sep. 22, 2016

(30) Foreign Application Priority Data

Mar. 20, 2015 (KR) ........................ 10-2015-0039157

(51) Int. Cl.
G06K 9/00 (2006.01)
G06Q 40/08 (2012.01)
(Continued)

(52) U.S. Cl.
CPC ......... *G06K 9/00791* (2013.01); *G06Q 40/08* (2013.01); *G06Q 50/30* (2013.01);
(Continued)

(58) Field of Classification Search
None
See application file for complete search history.

(56) References Cited

U.S. PATENT DOCUMENTS

| 2005/0030202 A1* | 2/2005 | Tsuboi | G08G 1/096716 340/901 |
| 2014/0324247 A1* | 10/2014 | Jun | G07C 5/0866 701/1 |
| 2015/0358591 A1* | 12/2015 | Kim | G06F 17/30858 348/143 |

FOREIGN PATENT DOCUMENTS

| JP | 2009-246931 A | 10/2009 |
| JP | 2013-256167 A | 12/2013 |

(Continued)

OTHER PUBLICATIONS

Korean Office Action issued in Korean Application No. 10-2015-0039157 dated Feb. 25, 2016.

*Primary Examiner* — Leon-Viet Nguyen
(74) *Attorney, Agent, or Firm* — McDermott Will & Emery LLP

(57) ABSTRACT

An accident information management apparatus for acquiring accident associated information such as images stored in a black box (i.e., black box images) from a peripheral vehicle through direct communication between vehicles when an accident such as a traffic accident occurs, a vehicle including the accident information management apparatus, and a method for managing accident information are disclosed. The vehicle includes an antenna array having a plurality of antenna elements configured to transmit and receive a signal; and a beamformer configured to adjust a phase of the signal transmitted from the antenna elements so as to form a beam pattern focused in a specific direction; and a controller configured to focus the beam pattern onto a peripheral vehicle so as to control a communication unit to transmit a request signal of accident associated information. The antenna array and the beamformer are contained in the communication unit.

17 Claims, 65 Drawing Sheets

(51) Int. Cl.
 *G06Q 50/30* (2012.01)
 *G08G 1/0967* (2006.01)
 *G07C 5/00* (2006.01)
 *G07C 5/08* (2006.01)

(52) U.S. Cl.
 CPC ............ *G07C 5/008* (2013.01); *G07C 5/085* (2013.01); *G07C 5/0866* (2013.01); *G08G 1/09675* (2013.01); *G08G 1/096716* (2013.01); *G08G 1/096791* (2013.01)

(56) References Cited

FOREIGN PATENT DOCUMENTS

| | | |
|---|---|---|
| KR | 10-2008-0023483 A | 3/2008 |
| KR | 10-2010-0103178 A | 9/2010 |
| KR | 10-2011-0088012 A | 8/2011 |
| KR | 10-2013-0108928 A | 10/2013 |
| KR | 10-2014-0068312 A | 6/2014 |
| KR | 10-2014-0106289 A | 9/2014 |

* cited by examiner

FIG. 22
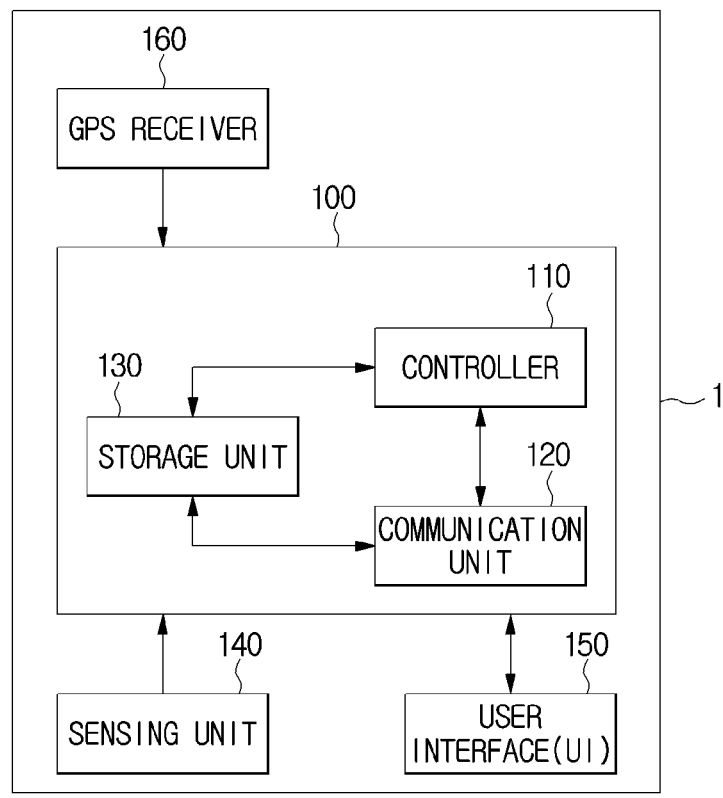
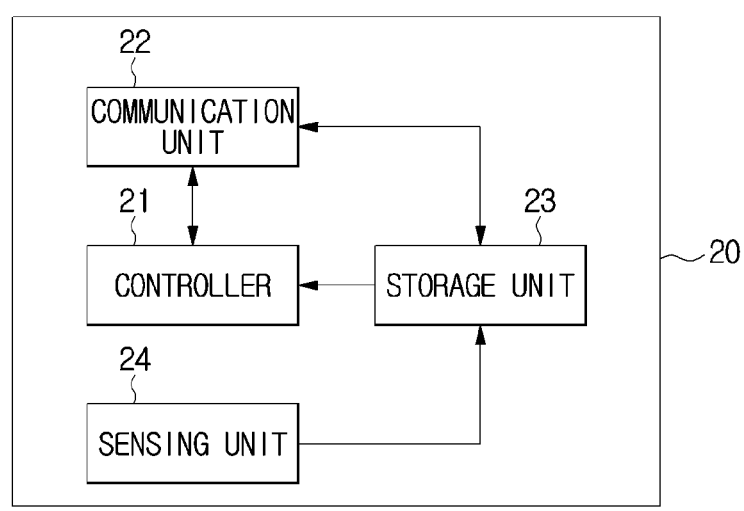

FIG. 32
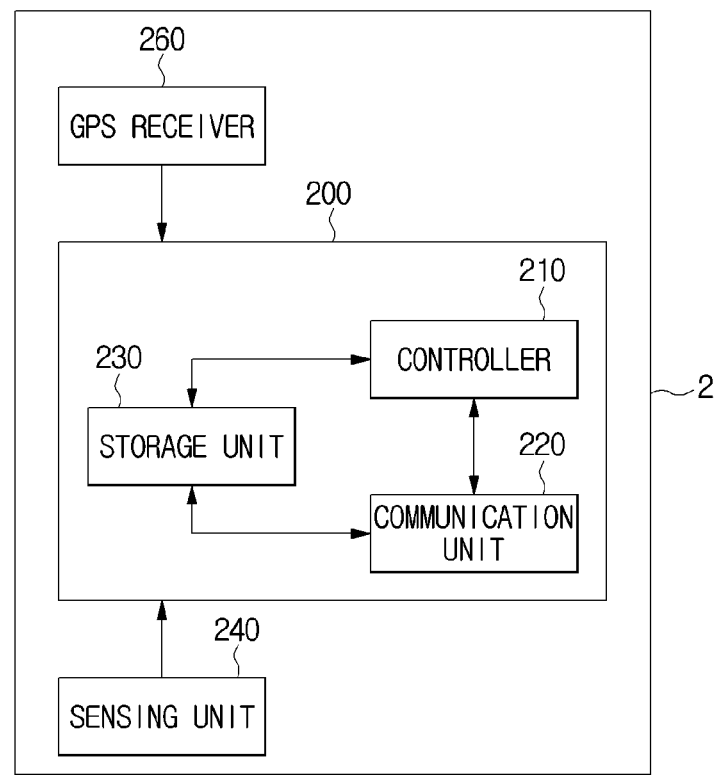
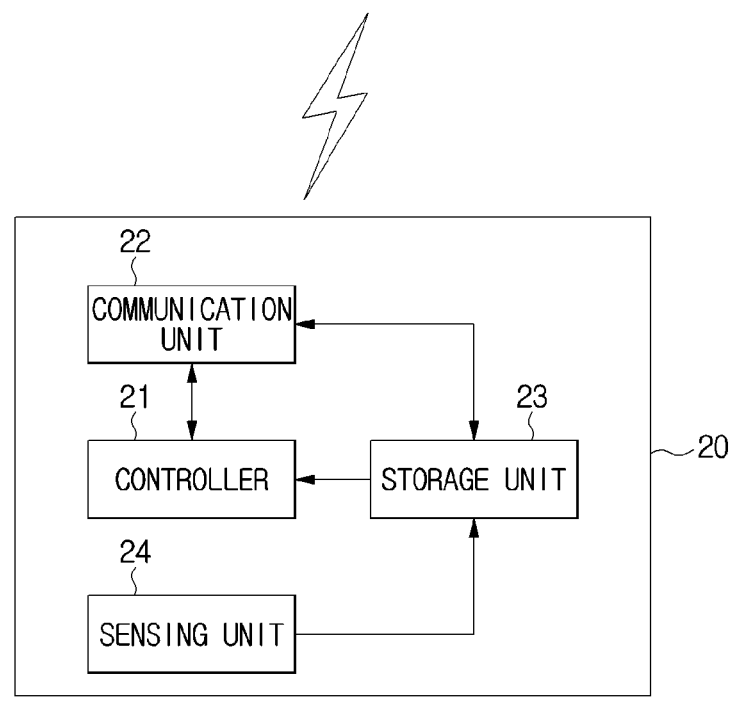

ACCIDENT INFORMATION MANAGEMENT APPRATUS, VEHICLE INCLUDING THE SAME, AND ACCIDENT INFORMATION MANAGEMENT METHOD

CROSS-REFERENCE TO RELATED APPLICATION

This application claims the benefit of priority to Korean Patent Application No. 10-2015-0039157, filed on Mar. 20, 2015 in the Korean Intellectual Property Office, the disclosure of which is incorporated herein by reference.

TECHNICAL FIELD

Embodiments of the present disclosure relate to an accident information management apparatus configured to share accident-associated information with a peripheral vehicle, a vehicle including the same, and a method for managing accident information.

BACKGROUND

If a traffic accident occurs, the traffic accident must be correctly analyzed such that the approximate cost of traffic accident settlement can be estimated or recurrence prevention programs can be prepared. To this end, a method for acquiring accident-associated information is of importance. Recently, a black box, generally in the form of a camera is installed in a vehicle. The block box acting as surveillance camera, can capture images from the vicinity of the vehicle (e.g., images in front of and/or to the rear of the vehicle) and can record the same as video images to be used in judging a traffic accident fairly. As a result, images recorded in the black box or information acquired from sensors embedded into the vehicle may be used as accident history information (or significant accident history information).

However, from the viewpoint of a user who rides in a vehicle, the images stored in the black box or the stored sensor information may not include all information needed to fairly investigate the accident history information. Since images stored in the black box (hereinafter referred to as black box images) or sensor information are changed according to various viewpoints of a traffic accident scene, it is necessary for a vehicle driver to obtain not only images and information directly obtained from his or her vehicle, but also much more information obtained from other peripheral vehicles.

SUMMARY

Therefore, it is an aspect of the present disclosure to provide an accident information management apparatus for acquiring accident associated information such as images stored in a black box (i.e., black box images) from a peripheral vehicle through direct communication between vehicles when an accident such as a traffic accident occurs, a vehicle including the accident information management apparatus, and a method for managing accident information.

Additional aspects of the invention will be set forth in part in the description which follows and, in part, will be obvious from the description, or may be learned by practice of the invention.

In accordance with an aspect of the present disclosure, a vehicle includes: a communication unit configured to perform D2D (Device to Device) communication with a peripheral vehicle; and a controller configured to control the communication unit to request at least one of accident associated information and vehicle state information from the peripheral vehicle, and to select a witness vehicle on the basis of any one of the accident associated information and the vehicle state information received from the peripheral vehicle.

The accident associated information received from the peripheral vehicle may include an accident associated image captured by the peripheral vehicle; and the vehicle state information received from the peripheral vehicle may include at least one of speed, position, and attitude of the peripheral vehicle and another peripheral vehicle located in the vicinity of the peripheral vehicle.

The controller may control the communication unit to request at least one of the accident associated information and the vehicle state information from all the peripheral vehicles located in a predetermined radius of the vehicle.

The controller may analyze at least one of the accident associated information and the vehicle state information received from the peripheral vehicle, and may select another peripheral vehicle, having captured an event generated in the vehicle during a predetermined time before or after an accident occurrence time, as the witness vehicle.

The controller may control the communication unit to request the accident associated information from the witness vehicle.

The communication unit may request the accident associated information from the witness vehicle according to a multi-hop communication scheme in which the peripheral vehicle is used as an intermediate node.

The communication unit may receive the accident associated information from the witness vehicle according to a multi-hop communication scheme in which the peripheral vehicle is used as an intermediate node.

The witness vehicle may be a first witness vehicle; and the controller may select a second witness vehicle on the basis of the accident associated information received from the first witness vehicle.

The communication unit may request the accident associated information from the second witness vehicle and may receive the accident associated information from the second witness vehicle, according to the multi-hop communication scheme in which the peripheral vehicle is used as a first intermediate node and the first witness vehicle is used as a second intermediate node.

The controller may control the communication unit to request the accident associated information from the peripheral vehicle either at an accident prediction time or at the accident occurrence time.

The controller may control the communication unit to upload the accident associated information received from the peripheral vehicle, and the witness vehicle, accident associated information and accident occurrence information obtained from the vehicle to a server configured to analyze the accident associated information.

In accordance with another aspect of the present disclosure, an accident information management apparatus mounted to a vehicle to manage accident information includes: a communication unit configured to perform D2D (Device to Device) communication with a peripheral vehicle; and a controller configured to control the communication unit to request at least one of accident associated information and vehicle state information from the peripheral vehicle, and to select a witness vehicle on the basis of any one of the accident associated information and the vehicle state information received from the peripheral vehicle.

The accident associated information received from the peripheral vehicle may include an accident associated image captured by the peripheral vehicle; and the vehicle state information received from the peripheral vehicle may include at least one of speed, position, and attitude of the peripheral vehicle and another peripheral vehicle located in the vicinity of the peripheral vehicle.

The controller may control the communication unit to request at least one of the accident associated information and the vehicle state information from all the peripheral vehicles located in a predetermined radius of the vehicle.

The controller may analyze at least one of the accident associated information and the vehicle state information received from the peripheral vehicle, and may select another peripheral vehicle, having captured an event generated in the vehicle during a predetermined time before or after an accident occurrence time, as the witness vehicle.

The communication unit may request the accident associated information from the witness vehicle according to a multi-hop communication scheme in which the peripheral vehicle is used as an intermediate node, and may receive the accident associated information from the witness vehicle.

The controller may control the communication unit to request the accident associated information from the peripheral vehicle either at an accident prediction time or at the accident occurrence time.

The controller may control the communication unit to upload the accident associated information received from the peripheral vehicle, and the witness vehicle, accident associated information and accident occurrence information obtained from the vehicle to a server configured to analyze the accident associated information.

The controller may communicate with the peripheral vehicle using a 5G communication scheme.

In accordance with another aspect of the present disclosure, an accident information management method for collecting accident associated information from a peripheral vehicle includes: communicating with the peripheral vehicle through D2D (Device to Device) communication; requesting at least one of accident associated information and vehicle state information from the peripheral vehicle; and selecting a witness vehicle on the basis of any one of the accident associated information and the vehicle state information received from the peripheral vehicle.

The requesting at least one of accident associated information and vehicle state information from the peripheral vehicle may include: requesting at least one of the accident associated information and the vehicle state information from all the peripheral vehicles located in a predetermined radius.

The selecting the new witness vehicle may include: analyzing at least one of the accident associated information and the vehicle state information received from the peripheral vehicle; and selecting another peripheral vehicle, having captured an event generated in the vehicle during a predetermined time before or after an accident occurrence time, as the witness vehicle.

The accident information management method may further include: requesting the accident associated information from the witness vehicle.

The requesting the accident associated information from the witness vehicle may include: requesting the accident associated information from the witness vehicle according to a multi-hop communication scheme in which the peripheral vehicle is used as an intermediate node.

The accident information management method may further include: receiving the accident associated information from the witness vehicle according to the multi-hop communication scheme in which the peripheral vehicle is used as an intermediate node.

The accident information management method may further include: uploading the accident associated information received from the peripheral vehicle, and the witness vehicle, accident associated information and accident occurrence information obtained from the vehicle to a server configured to analyze the accident associated information.

In accordance with another aspect of the present disclosure, a vehicle includes: a communication unit configured to perform D2D (Device to Device) communication with a peripheral vehicle; and a sensing unit configured to include at least one of an image sensor for capturing a peripheral image of a vehicle, a proximity sensor for detecting an object located in the vicinity of the vehicle, a distance to the object, and speed of the object, and a sound sensor for detecting sound; and a controller configured to determine whether an accident of the peripheral vehicle occurs on the basis of output data of the sensing unit, and configured to control the communication unit to transmit the accident associated information to the peripheral vehicle or a server when the occurrence of the accident of the peripheral vehicle is determined.

The controller may analyze the image captured by the image sensor, and may determine accident occurrence of the peripheral vehicle when the peripheral vehicle is broken or damaged in shape.

The controller may analyze the image captured by the image sensor, and may determine the accident occurrence of the peripheral vehicle when flash of light occurs.

The controller may determine the accident occurrence of the peripheral vehicle when sound volume detected by the sound sensor is equal to or higher than a predetermined reference volume.

The controller may determine the accident occurrence of the peripheral vehicle when a speed of the peripheral vehicle detected by the proximity sensor is equal to or less than a speed of another peripheral vehicle by a predetermined reference value or less.

BRIEF DESCRIPTION OF THE DRAWINGS

These and/or other aspects of the invention will become apparent and more readily appreciated from the following description of the embodiments, taken in conjunction with the accompanying drawings of which:

FIG. 22 is a block diagram illustrating a vehicle further including a GPS receiver.

FIG. 32 is a block diagram illustrating the vehicle further including a unit for acquiring vehicle state information according to another embodiment of the present disclosure.

DETAILED DESCRIPTION

Figure 1:
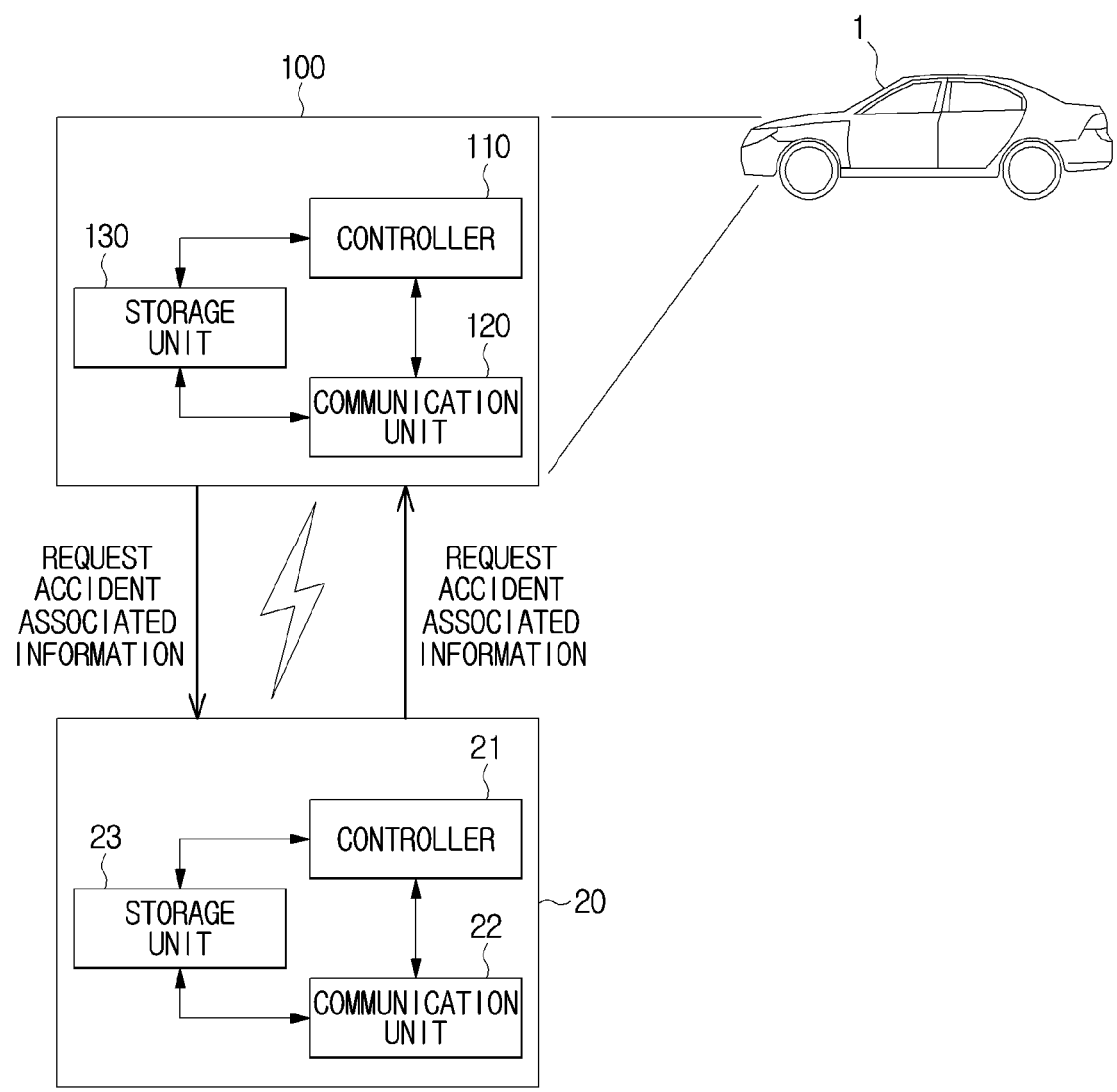
FIG. 1 is a block diagram illustrating an accident information management apparatus according to an embodiment of the present disclosure.

Reference will now be made in detail to the embodiments of the present disclosure, examples of which are illustrated in the accompanying drawings, wherein like reference numerals refer to like elements throughout. An accident information management apparatus, a vehicle including the same, and a method for controlling the vehicle according to one embodiment of the present disclosure will hereinafter be described with reference to the attached drawings.

FIG. 1 is a block diagram illustrating an accident information management apparatus according to an embodiment of the present disclosure.

Referring to FIG. 1, the accident information management apparatus 100 may include a communication unit 120 configured to communicate with a peripheral vehicle 20; a controller 110 configured to request accident associated information from the peripheral vehicle 20 through the communication unit 120; and a storage unit 130 configured to store information received from an external part.

The accident information management apparatus 100 may be installed in a vehicle 1, may request accident associated information of the vehicle 1 from a peripheral vehicle 20, and may transmit information received from the peripheral vehicle 20 to the server or may directly analyze the received information.

If a communication unit 22 of the peripheral vehicle 20 receives a request signal for requesting accident associated information from the vehicle 1 including the accident information management apparatus 100, the controller 21 may search for the corresponding accident associated information, and may transmit the accident associated information to the vehicle 1 through the communication unit 22.

The controller 110 may include a memory for temporarily or non-temporarily storing a program and data needed to execute operations to be described later; and a microprocessor for executing the program stored in the memory and processing the stored data. For example, the controller 110 may be contained in an Electronic Control Unit (ECU) or Micro Control Unit (MCU) embedded in the vehicle, or may be implemented as ECU or MCU. The storage unit 120 may include a storage medium, for example, a Random Access Memory (RAM), a Read Only Memory (ROM), a Hard Disk Drive (HDD), a magnetic disc, an optical disc, a solid state drive (SDD), etc. The memory configured to store the program and data of the controller 110 may be contained in the storage unit 130 or may be located independently of the storage unit 130, such that the scope or spirit of the memory and the storage unit 130 is not limited thereto, and can also be applied to other examples without difficulty.

The communication unit 120 may implement a 2G communication scheme, a 3G communication scheme, and/or a 4G communication scheme. For example, the 2G communication scheme may be Time Division Multiple Access (TDMA), Code Division Multiple Access (CDMA), etc. For example, the 3D communication scheme may be Wideband Code Division Multiple Access (WCDMA), CDMA2000 (Code Division Multiple Access 2000), Wireless Broadband (WiBro), World Interoperability for Microwave Access (Wi-MAX), etc. For example, the 4G communication scheme may be Long Term Evolution (LTE), Wireless Broadband Evolution, etc. In addition, the communication unit 120 may also implement a 5G communication scheme as necessary. The communication unit 120 may wirelessly communicate with other devices using the base station (BS) according to the above-mentioned communication schemes, or may wirelessly communicate with other devices without using the BS.

Additionally, the communication unit 120 may transmit and receive radio frequency (RF) signals to and from other devices located within a predetermined distance using various communication schemes, for example, Wireless LAN, Wi-Fi, Bluetooth, ZigBee, Wi-Fi Direct (WFD), Ultra wideband (UWB), Infrared Data Association (IrDA), Bluetooth Low Energy (BLE), Near Field Communication (NFC), etc.

Whereas the 4G communication scheme uses the frequency band of 2 GHz or less, the 5G communication scheme uses the frequency band of about 28 GHz. However, the scope or spirit of the frequency band of the 5G communication scheme is not limited thereto.

A large-scale antenna system may be used in 5G communication. The large-scale antenna system can cover up to the super-high frequency band using several tens of antennas, and can simultaneously transmit and receive a large amount of data through multiple access. In more detail, the large-scale antenna system can adjust an array of the antenna elements, and can transmit and receive radio waves in a specific direction within a larger-sized region, such that a large amount of data can be transmitted and the available region of the 5G communication network can be extended in size.

In the following embodiment, it is assumed that the communication unit 120 communicates with other devices using 5G communication for convenience of description and better understanding of the present disclosure.

Figure 2:
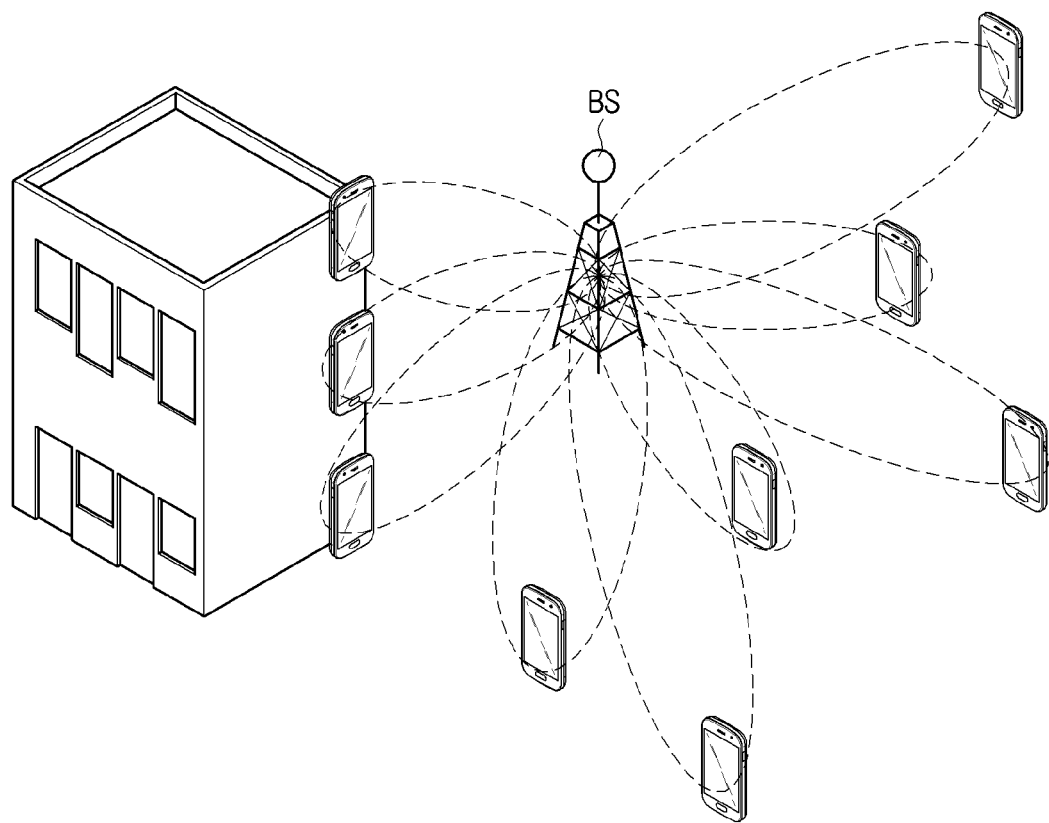
FIG. 2 is a conceptual diagram illustrating a large-scale antenna system of a base station (BS) according to $5^{th}$ Generation (5G) communication.
Figure 3:
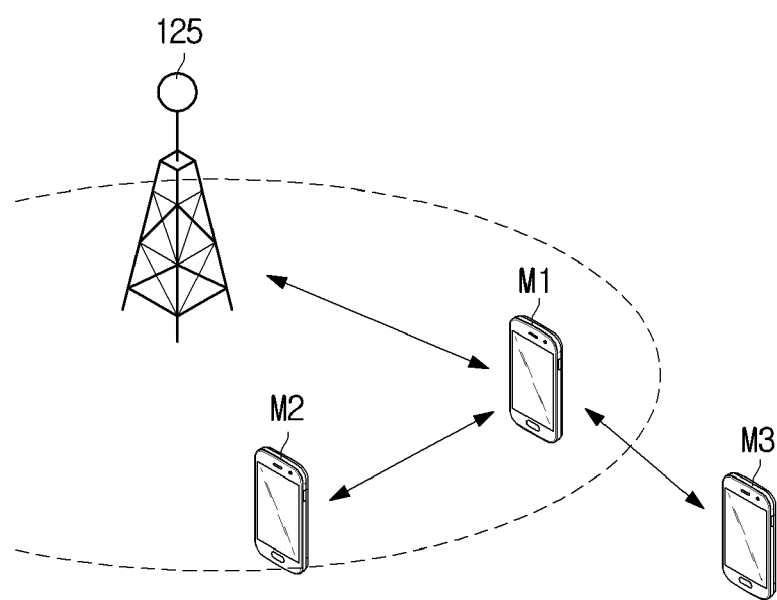
FIGS. 3 to 5 are conceptual diagrams illustrating a 5G communication network.
Figure 4:
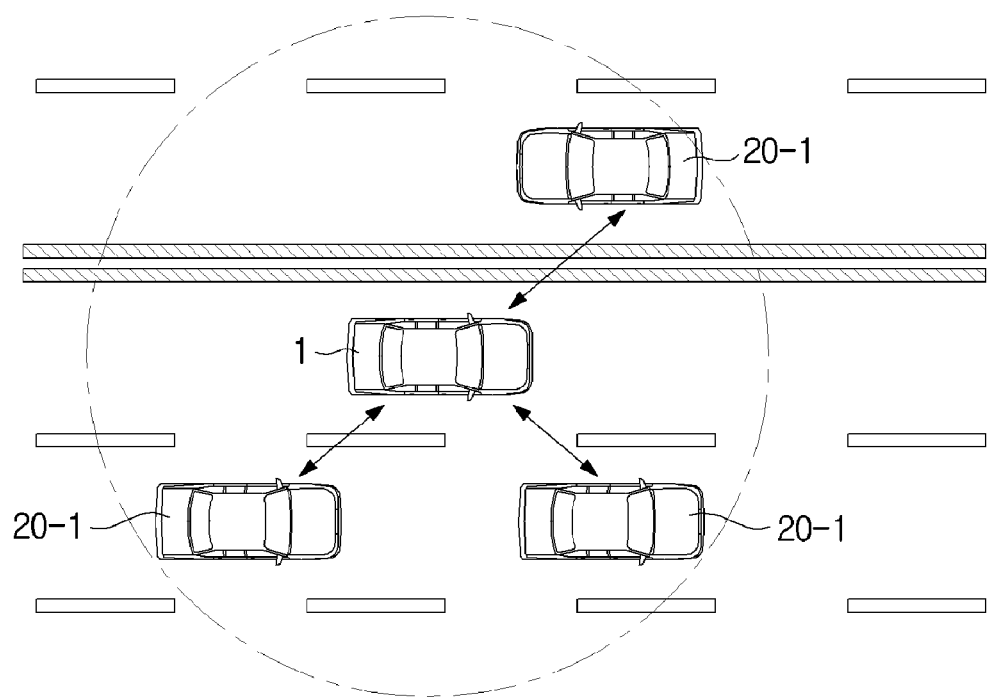
Figure 5:
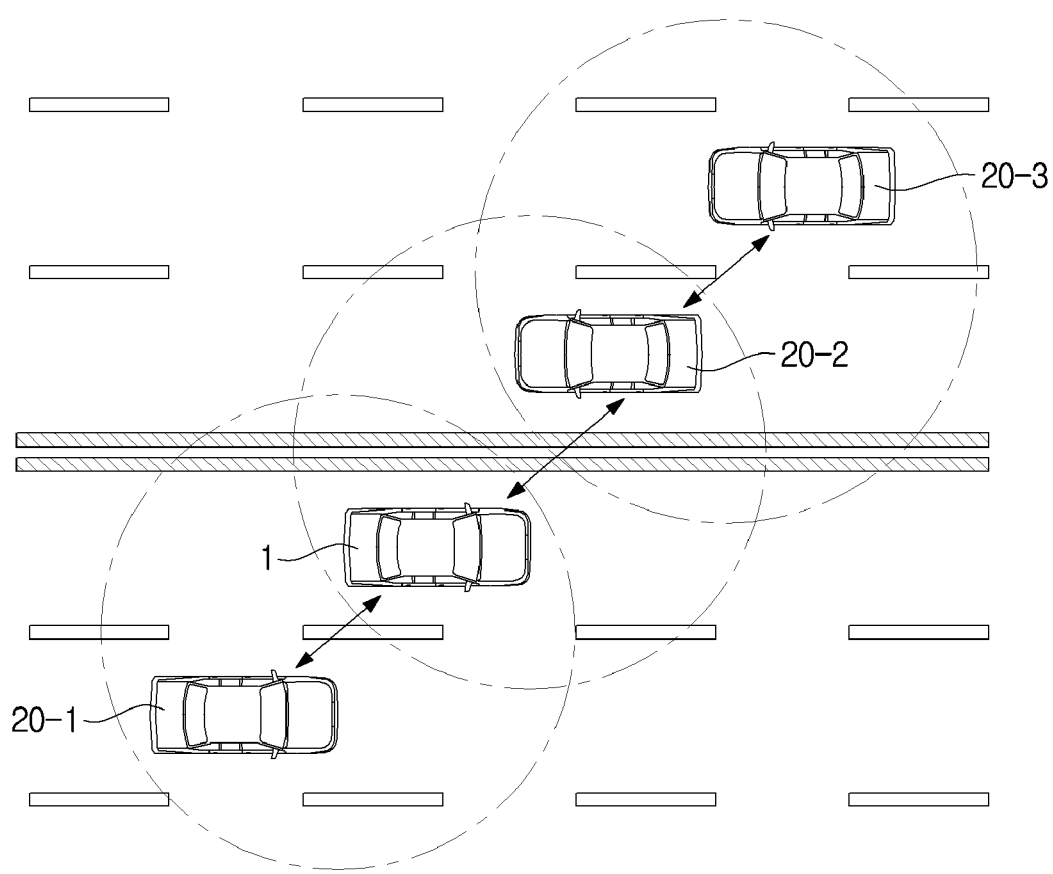

FIG. 2 is a conceptual diagram illustrating a large-scale antenna system of a base station (BS) according to 5$^{th}$ Generation (5G) communication. FIGS. 3 to 5 are conceptual diagrams illustrating a 5G communication network.

Referring to FIG. 2, a base station (BS) may simultaneously communicate with many more devices through the large-scale antenna system. In addition, the large-scale antenna system may reduce noise by minimizing the number of radio waves leaking in the remaining directions other than the transmission direction of radio waves, such that the transmission (Tx) quality can be improved and power consumption can be reduced.

In addition, whereas the conventional communication scheme modulates transmission (Tx) signals through Orthogonal Frequency Division Multiplexing (OFDM), the 5G communication scheme transmits the modulated radio signals through Non-Orthogonal Multiple Access (NOMA), such that the 5G communication scheme can implement multiple access of many more devices and can simultaneously transmit and receive large volumes of data.

For example, the 5G communication scheme can provide a maximum transfer rate of 1 Gbps. The 5G communication scheme can support immersive communication (e.g., UHD (Ultra-HD), 3D, hologram, etc.) through high-capacity transmission. Therefore, a user can more rapidly transmit and receive superhigh-capacity data through the 5G communication scheme. Here, the superhigh-capacity data is more precise and more immersive.

The 5G communication scheme can perform real-time processing with a maximum response time of 1 ms or less. Therefore, the 5G communication scheme can support various real-time services designed to generate reaction before user recognition. For example, a vehicle may receive sensor information from various devices while in motion, may provide an autonomous navigation system through real-time processing, and may provide various remote control methods. In addition, the vehicle may perform real-time processing of sensor information associated with other vehicles located in the vicinity of the vehicle according to the 5G communication scheme, may relay, in real time, the possibility of collision to the user, and may provide, in real time, information regarding traffic situations to be generated on a traveling path.

In addition, the vehicle can provide big data services to passengers who ride in the vehicle, through real-time processing and high-capacity transmission services provided through 5G communication. For example, the vehicle can analyze various web information, SNS information, etc. and can provide customized information appropriate for various situations of vehicle passengers. In accordance with one embodiment, the vehicle collects not only various famous restaurants located in the vicinity of a traveling path through big data mining, but also spectacle information, provides the collected information in real time, and can enable the passengers to immediately confirm various kinds of information existing in the vicinity of the traveling region.

Meanwhile, the 5G communication network can perform subdivision of cell, and can support high-density networking and large-capacity transmission. In this case, the cell may be achieved by subdividing a large region into a plurality of smaller regions in such a manner that the cell can efficiently use the frequency through mobile communication. In this case, a low-output base station (BS) is installed in each cell, such that UE-to-UE communication can be supported. For example, the 5G communication network implements subdivision of the cell by reducing cell size, resulting in formation of a two-stage structure composed of macrocell BS—distributed small BS—communication UE (User Equipment).

In addition, RF relay transmission based on multihop communication may be achieved in the 5G communication network. For example, as shown in FIG. 3, a first UE (or first terminal) ($M_1$) may relay a desired RF signal to be transmitted by a third UE ($M_3$) located outside the BS network, to the BS. In addition, the first UE ($M_1$) may relay a desired RF signal to be transmitted by a second UE ($M_2$) located in the BS network to the BS. As described above, at least one of devices applicable to the 5G communication network can perform relay transmission based on multihop communication. However, the scope or spirit of the present disclosure is not limited thereto. Therefore, the region in which the 5G communication network is supported can be extended in size, and at the same time the buffering problem caused by many users (i.e., UEs) present in the cell can be obviated.

Meanwhile, the 5G communication scheme can implement Device-to-Device (D2D) communication applicable to vehicles, communication devices, etc. D2D communication may indicate that devices directly transmits and receives RF signals without using the BS. During D2D communication, devices need not transmit and receive RF signals through the BS. RF signals are directly communicated between devices, preventing unnecessary energy consumption. In this case, the antenna(s) must be embedded in the corresponding device in such a manner that a vehicle, a communication device, etc. can use the 5G communication scheme.

The vehicle 1 may transmit and receive RF signals to and from peripheral vehicles located in the vicinity of the vehicle 1 according to the D2D communication scheme. For example, as shown in FIG. 4, the vehicle 1 may perform D2D communication with peripheral vehicles (20-1) located in the vicinity of the vehicle 1. In addition, the vehicle may perform D2D communication with a traffic information device (not shown) installed at an intersection or the like.

In another example, as shown in FIG. 5, the vehicle 1 may perform D2D communication with a first peripheral vehicle 1 (20-1) and a second peripheral vehicle 2 (20-2) located in a D2D communication available distance, without passing through the BS. A third peripheral vehicle 3 (20-3) located outside the D2D communication available distance may perform D2D communication with the second peripheral vehicle 2 (20-1) located in the D2D communication available range. As described above, relay transmission of RF signals may be achieved through the multihop scheme, such that transmission signals of the third peripheral vehicle 3 (20-3) may also be transmitted to the vehicle 1 through the second peripheral vehicle 2 (20-2).

Meanwhile, the 5G communication network extends the range of D2D communication support region, such that it is possible to perform D2D communication with another device located at a remote location. In addition, real-time processing with a response time of 1 ms or less and high-capacity communication of 1 Gbps or higher are supported, such that signals having desired data can be communicated between vehicles.

For example, the vehicle 1 while in motion can access, in real time, other vehicles, various servers, systems, etc. located in the vicinity of the vehicle 1 according to the 5G communication scheme, can transmit and receive data to and from other peripheral vehicles, and can process the data communication result, such that the vehicle 1 can provide a variety of services (such as a navigation service) through augmented reality.

Besides, the vehicle 1 can transmit and receive RF signals to and from peripheral vehicles through the BS or through D2D communication, using the remaining bands other than the above-mentioned frequency band. However, the scope or spirit of the present disclosure is not limited to the above-mentioned communication schemes based on the frequency band.

The communication unit 120 of the vehicle 1 and the communication unit 22 of the peripheral vehicle 20 may achieve D2D communication without using the BS. The communication unit 120 of the vehicle or the communication unit 22 of the peripheral vehicle 20 may communicate with each other through the BS. The two communication units (120, 22) are mounted to the vehicles, such that the vehicles can perform D2D communication without using the BS. Assuming that a communication subject is a vehicle, communication between two communication units (120, 22) may also be referred to as Vehicle to Vehicle (V2V) communication. In addition, each communication unit or the vehicle may correspond to a kind of machine and, as such, communication between the vehicle and the communication unit may also be referred as Machine to Machine (M2M) communication. For convenience of description and better understanding of the present disclosure, the above-mentioned embodiment assumes that the two communication units have only to perform direct communication without passing through the BS, and the "communication units" may also be referred to by other terms as necessary.

Figure 6:
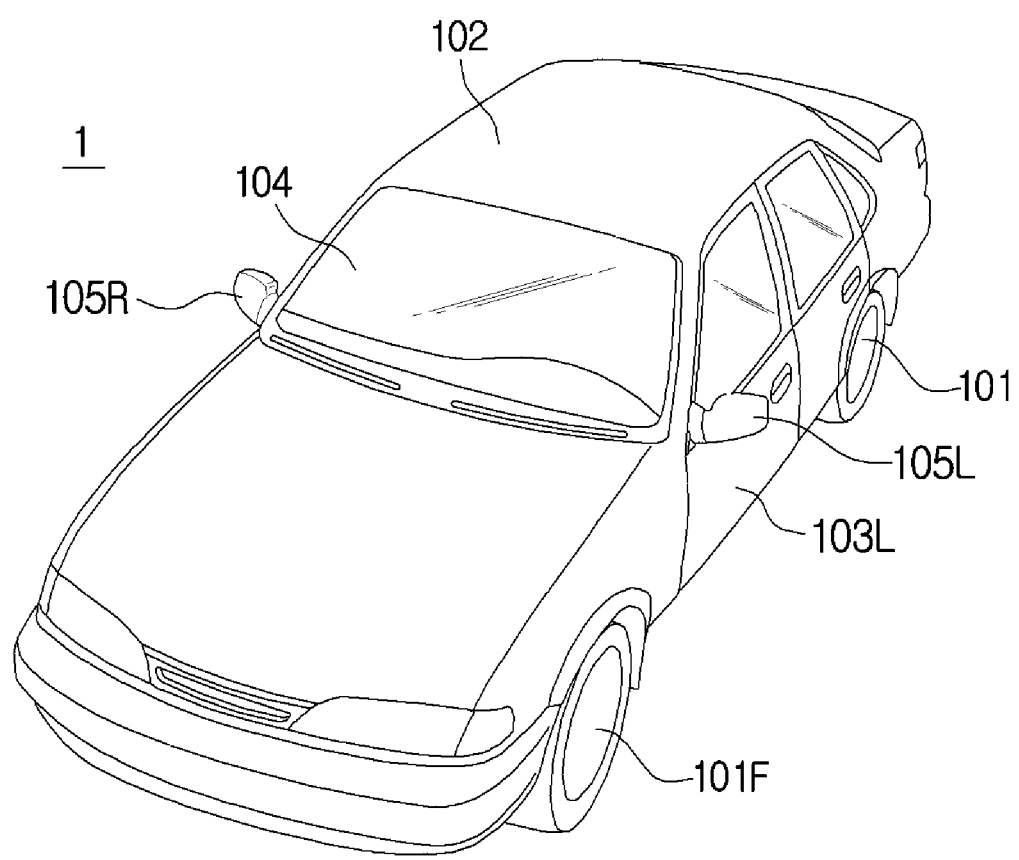
FIG. 6 is a perspective view illustrating the appearance of a vehicle according to an embodiment of the present disclosure.

FIG. 6 is a perspective view illustrating the appearance of a vehicle according to an embodiment of the present disclosure.

Referring to FIG. 6, the vehicle 1 according to the embodiment includes vehicle wheels (101F, 101R) to move the vehicle 1 from place to place; a main body 102 forming the appearance of the vehicle 1; a drive unit (not shown) to rotate the vehicle wheels (101F, 101R); doors 103 to shield an indoor space of the vehicle 1 from the outside; a windshield 104 to provide a forward view of the vehicle 1 to a vehicle driver who rides in the vehicle 1; and side-view mirrors (105L, 105R) to provide a rear view of the vehicle 1 to the vehicle driver.

The wheels (101F, 101R) may include front wheels 101F provided at the front of the vehicle 1 and rear wheels 101R provided at the rear of the vehicle 1. The drive unit may provide rotational force to the front wheels 101F or the rear wheels 101R in a manner that the vehicle 1 moves forward or backward. The drive unit may include an engine to generate rotational force by burning fossil fuels or a motor to generate rotational force upon receiving power from a condenser (not shown).

The doors 103 are rotatably provided at the right and left sides of the main body 102 so that a vehicle driver can ride in the vehicle 1 when any of the doors 103 is open and an indoor space of the vehicle 1 can be shielded from the outside when the doors 103 are closed.

The windshield 104 is provided at a front upper portion of the main body 102 so that a vehicle driver who rides in the vehicle 1 can obtain visual information of a forward direction of the vehicle 1. The windshield 104 may also be referred to as a windshield glass.

The side-view mirrors (105L, 105R) may include a left side-view mirror 105L provided at the left of the main body 102 and a right side-view mirror 105R provided at the right of the main body 102, so that the driver who rides in the vehicle 1 can obtain visual information of the lateral and rear directions of the main body 102.

Detailed operations of the vehicle according to one embodiment will hereinafter be described on the basis of the schematic diagram shown in FIG. 6.

Figure 7:
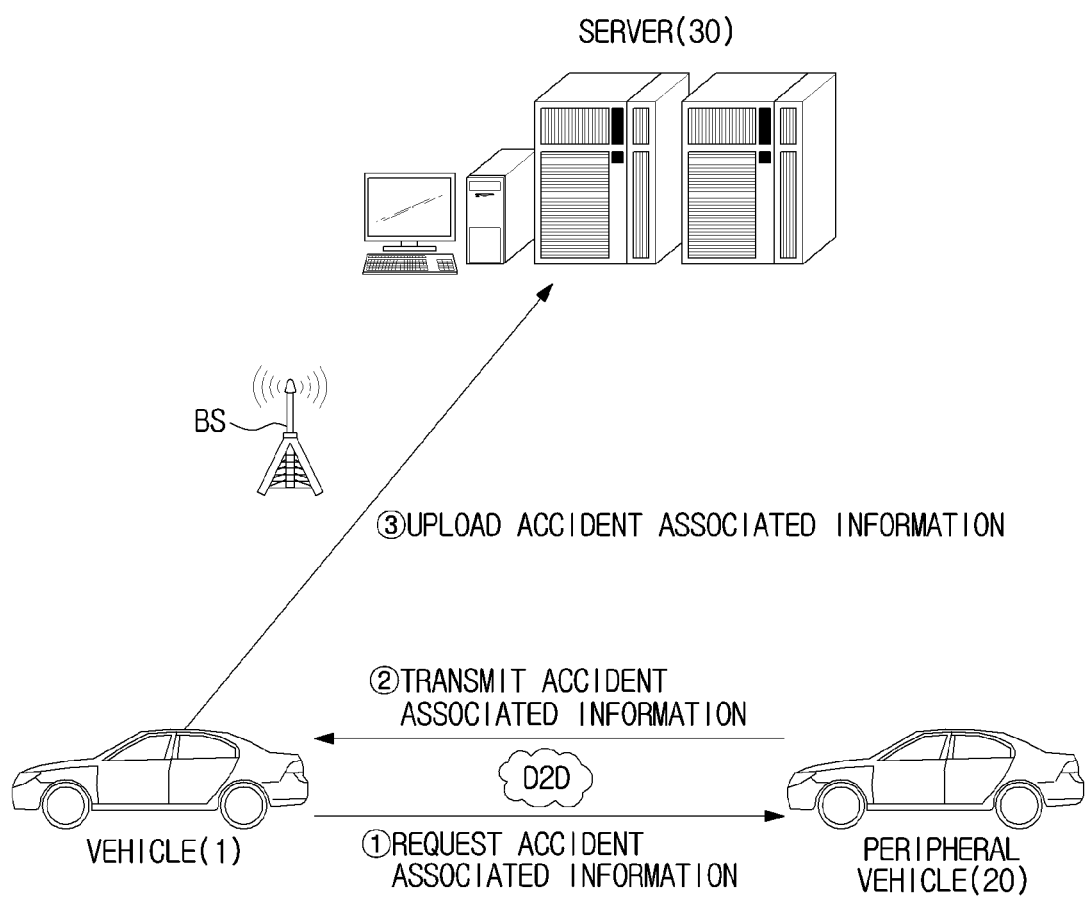
FIGS. 7 and 8 are conceptual diagrams illustrating exemplary signal flow among server, a vehicle, and a peripheral vehicle.
Figure 8:
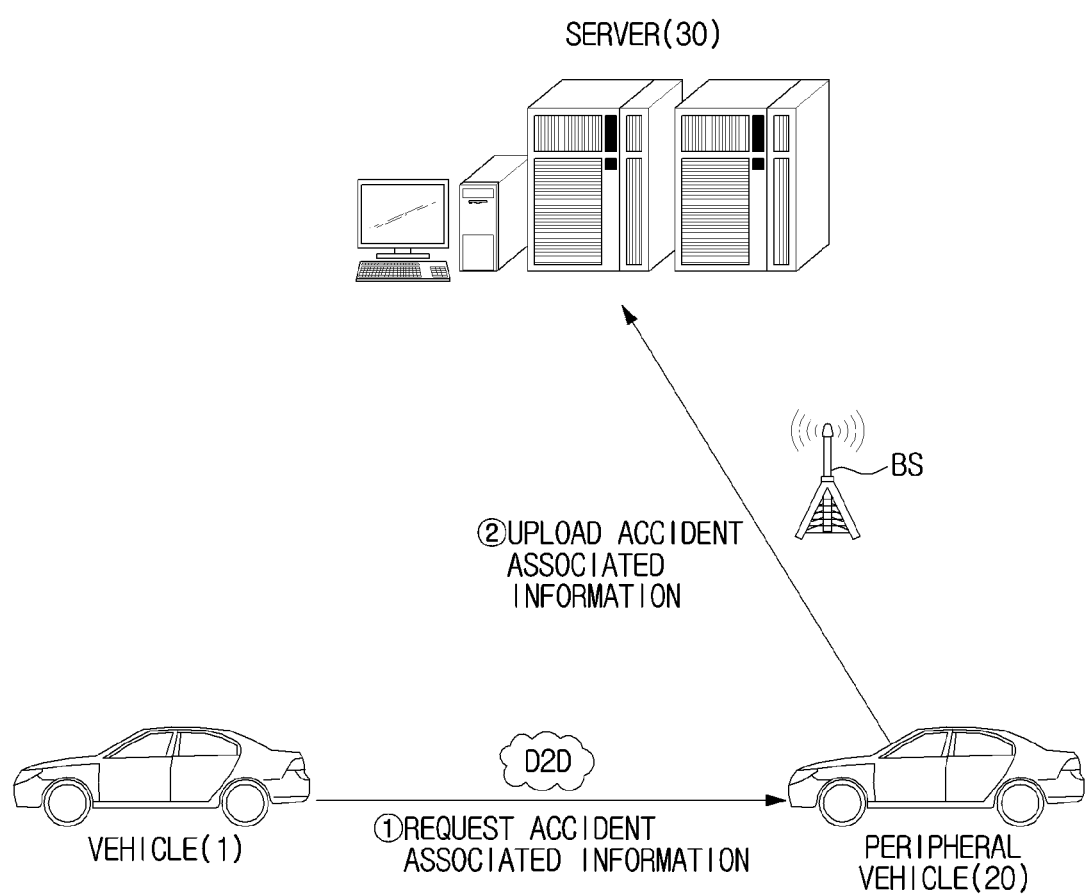

FIGS. 7 and 8 are conceptual diagrams illustrating exemplary signal flow among server, a vehicle, and a peripheral vehicle.

Referring to FIG. 7, the vehicle can directly communicate with the peripheral vehicles 20 without passing through a base station (BS) according to D2D communication. The vehicle 1 may request accident associated information from the peripheral vehicles 20 according to D2D communication. The peripheral vehicles 20 having requested accident associated information may search for the corresponding accident associated information, and may transmit the searched information to the vehicle 1 using D2D communication.

The vehicle 1 having received accident associated information from the peripheral vehicles 20 may upload accident associated information to the server 30. In this case, communication between the vehicle 1 and the server 30 may be communication through the BS.

Alternatively, as shown in FIG. 8, the peripheral vehicles 20 having received accident associated information from the vehicle may also transmit the accident associated information to the server 30 instead of the vehicle 1. Likewise, communication between the peripheral vehicles 20 and the server 30 may be communication through the BS.

In accordance with the embodiment, the peripheral vehicles 20 may be located in the vicinity of the vehicle 1, and may be an arbitrary vehicle located within a predetermined radius of the vehicle 1. In addition, each peripheral vehicle 20 may be a vehicle selected according to a specific reference, and may be located closest to the vehicle 1. The peripheral vehicle 20 may be located at any place without limitation, and the communication unit 22 of the peripheral vehicle 20 may include a communication module configured to perform D2D communication.

In addition, as will be described later, one vehicle 1 may be used as the peripheral vehicle 20, and the peripheral vehicle 20 may also be used as the vehicle 1. That is, the vehicle 1 capable of requesting accident associated information from the peripheral vehicle 20 may receive accident associated information from the peripheral vehicle 20, and may also transmit the received information to the peripheral vehicle 20. The peripheral vehicle 20 configured to receive accident associated information from the vehicle 1 as well as to transmit the received information to the vehicle 1, may request accident associated information from the vehicle 1 when an accident occurs in the peripheral vehicle 20, and may also receive the requested information from the vehicle 1.

Figure 9:
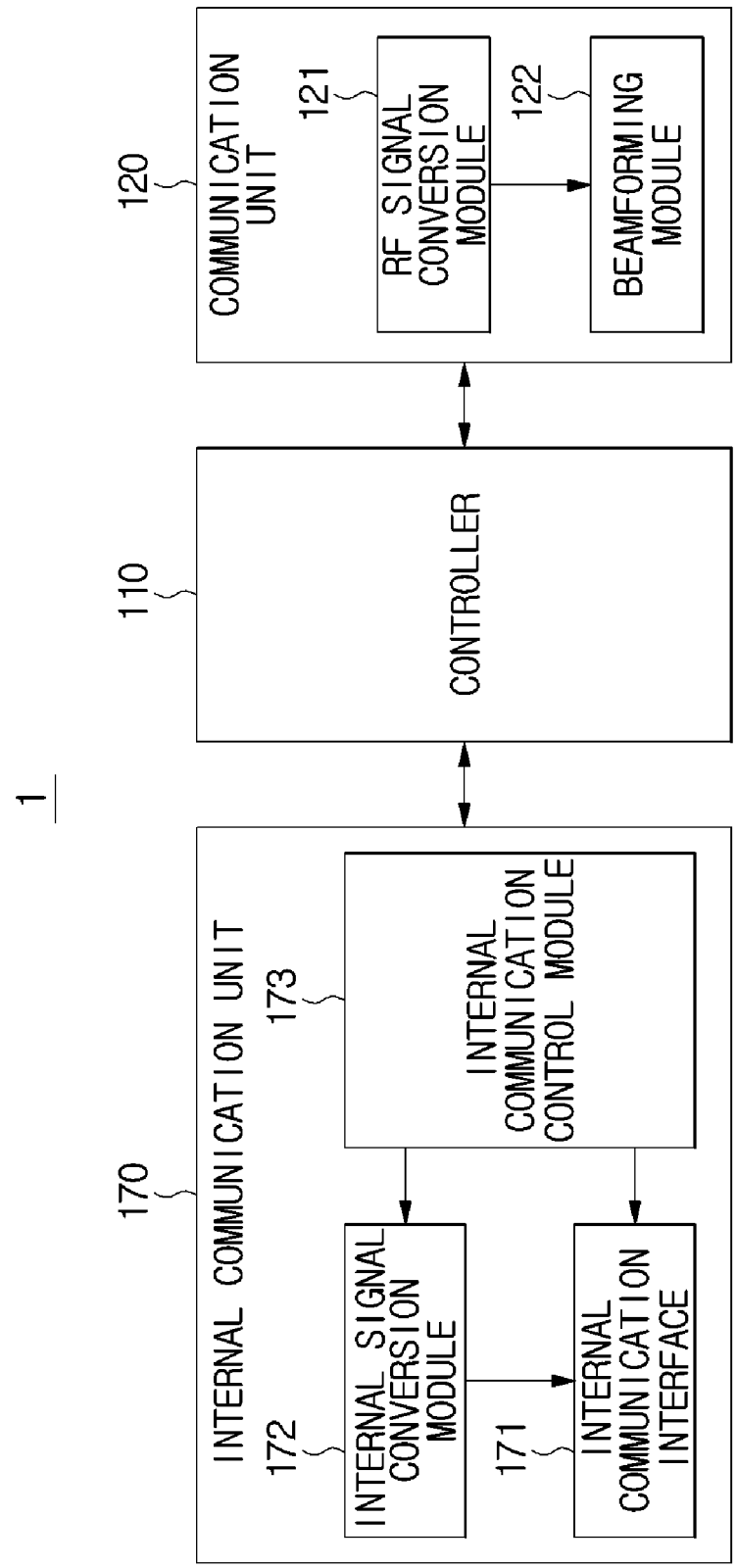
FIG. 9 is a block diagram illustrating a communication unit embedded in the vehicle according to an embodiment of the present disclosure.
Figure 10:
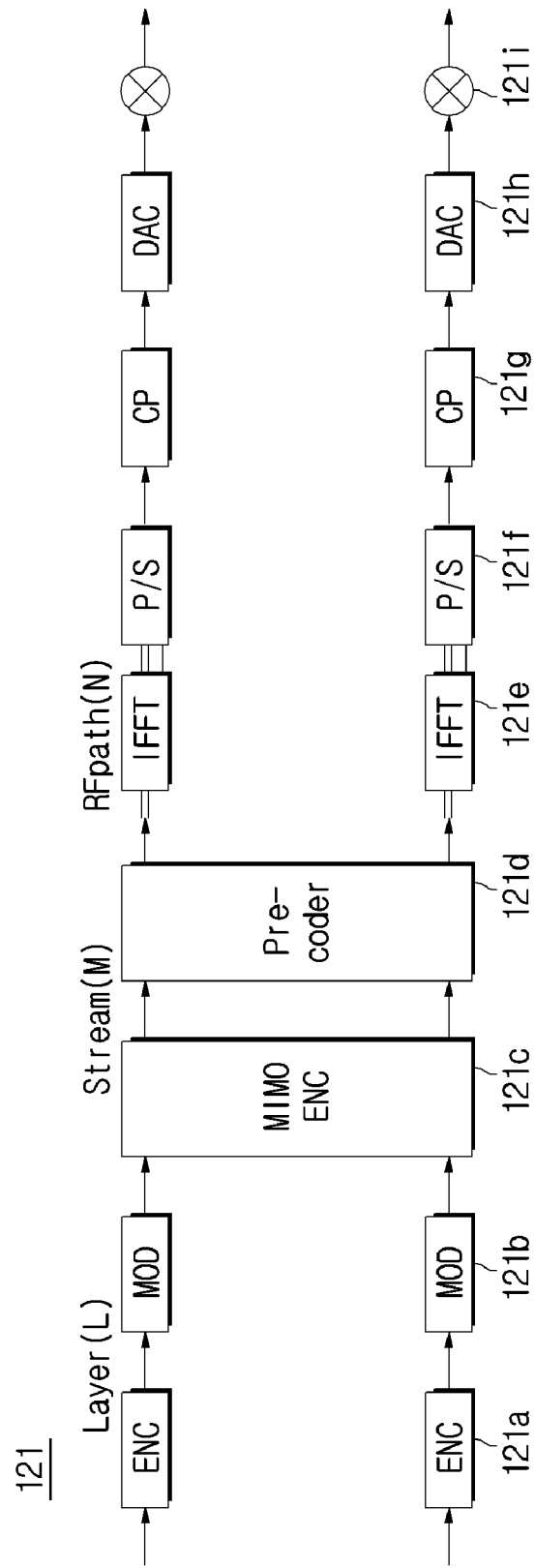
FIG. 10 is a block diagram illustrating a radio frequency (RF) conversion module contained in the communication unit.
Figure 11:
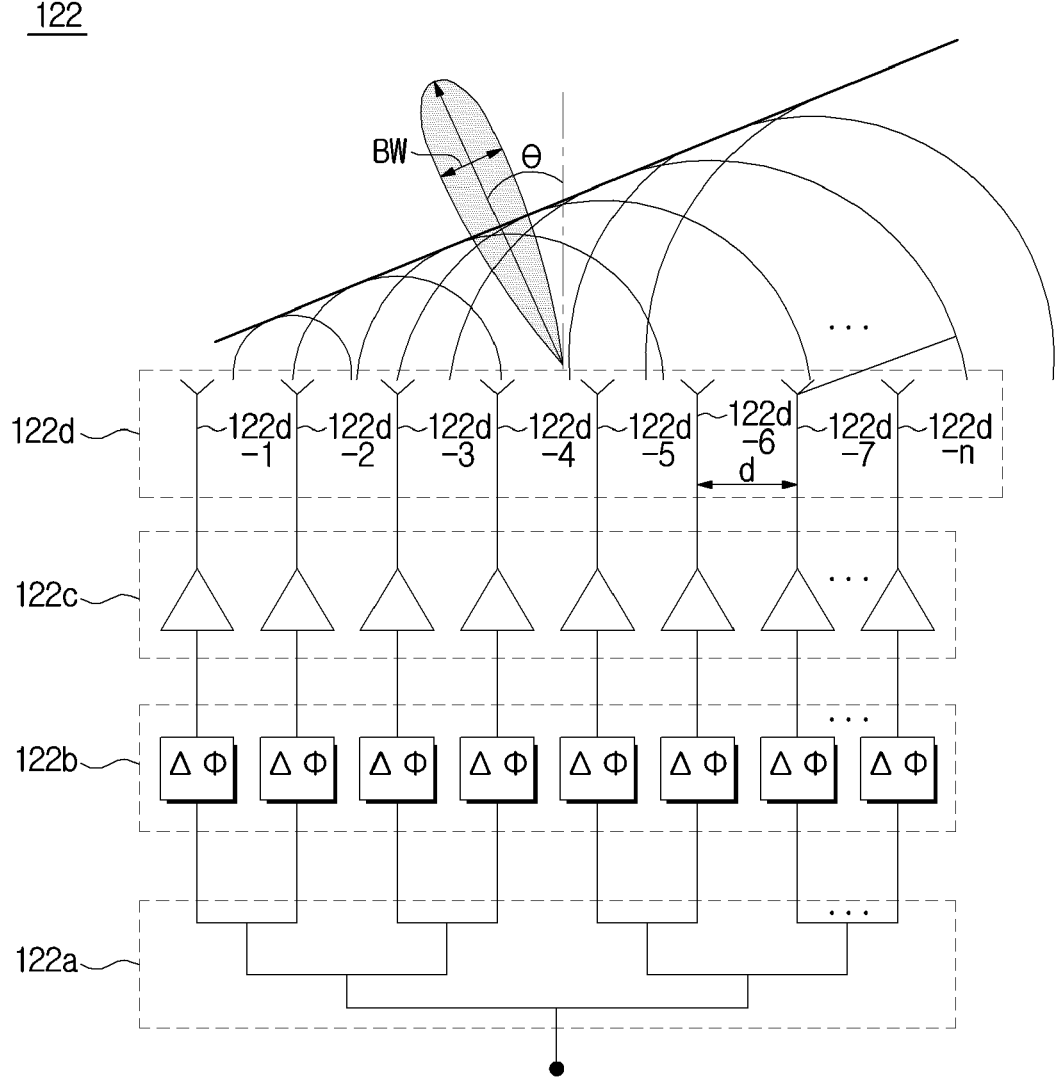
FIG. 11 is a block diagram illustrating a beamforming module and an antenna array.

FIG. 9 is a block diagram illustrating a communication unit embedded in the vehicle according to an embodiment of the present disclosure. FIG. 10 is a block diagram illustrating a radio frequency (RF) conversion module contained in the communication unit. FIG. 11 is a block diagram illustrating a beamforming module and an antenna array.

Referring to FIG. 9, the vehicle 1 may further include an internal communication unit 170 configured to communicate with various electronic devices installed in the vehicle 1 through the vehicle communication network installed in the vehicle 1.

The internal communication unit 170 may include an internal communication interface 171 connected to the vehicle communication network; an internal signal conversion module 172 configured to modulate/demodulate a signal; and an internal communication control module 173 configured to control a communication through the vehicle communication network (NT).

The internal communication interface 171 may receive a communication signal from various electronic devices contained in the vehicle 1 through the vehicle communication network, and may transmit the communication signal to various electronic devices contained in the vehicle 1 through the vehicle communication network. In this case, the communication signal may be transmitted and received through the vehicle communication network.

The internal communication interface 171 may include a communication port to interconnect the vehicle communication network and the communication unit 120 of the accident information management apparatus 100; and a transceiver configured to perform transmission and reception of signals.

Meanwhile, the controller 110 may control not only the communication unit 120 configured to perform RF communication between the vehicle 1 and the external device, but also the internal communication unit 170. Alternatively, an additional controller to control the internal communication unit 170 may also be provided as necessary.

The internal signal conversion module 172 may demodulate the communication signal received through the internal communication interface 171 into a control signal upon receiving a control signal from the internal communication control module 173, and may modulate the control signal generated by the controller 110 into an analog communication signal such that the analog communication signal can be transmitted through the internal communication interface 171.

The internal signal conversion module 172 may modulate the control signal generated from the controller 110 into a communication signal according to a communication protocol of the vehicle network, and may demodulate the communication signal based on the vehicle network communication protocol into a control signal capable of being recognized by the controller 110.

The internal signal conversion module 172 may include a memory configured to store a program and data needed for modulating/demodulating a communication signal; and a processor configured to modulate/demodulate a communication signal according to the program and data stored in the memory.

The internal communication control module 173 may control the internal signal conversion module 172 and the communication interface 171. For example, if the communication signal is transmitted, the internal communication control module 173 may determine whether the communication network is occupied by another electronic device through the communication interface 171. If the communication network is empty, the internal communication control module 173 may control the internal communication interface 171 and the internal signal conversion module 172 to transmit the communication signal. In addition, if the communication signal is received, the internal communication control module 173 may control the internal communication interface 171 and the signal conversion module 172 to demodulate the communication signal received through the communication interface 171.

The internal communication control module 173 may include a memory configured to store a program and data needed to control the internal signal conversion module 172 and the communication interface 171; and a processor configured to generate a control signal according to the program and data stored in the memory.

In accordance with the embodiment, the internal signal conversion module 172 and the internal communication control module 173 may be implemented as separate memories or processors, or may also be implemented as a single memory and a single processor.

In accordance with the embodiment, the internal communication control module 173 may be omitted as necessary. For example, the internal communication control module 173 may be incorporated into the controller 110 or another controller configured to control the internal communication unit 170.

In accordance with the embodiment, the vehicle 1 may selectively transmit a signal to a specific vehicle through beamforming by which a propagation signal is focused in a specific direction. To this end, the communication unit 120 may include an RF signal conversion module 121 configured to modulate/demodulate a signal; and a beamforming module 122 configured to form a beam pattern for wireless communication as well as to transmit/receive RF signals through propagation of a beam pattern.

Upon receiving a control signal from the controller 110, the RF signal conversion module 121 may demodulate a wireless communication signal (i.e., RF signal) received through the beamforming module 122 into a control signal, and may modulate the control signal generated from the controller 110 into a wireless communication signal to be transmitted through the beamforming module 122.

The wireless communication signal transmitted and received through wireless communication may have a different format from the control signal so as to guarantee reliability of such wireless communication. Especially, the wireless communication signal may be an analog signal, and the control signal may be a digital signal.

In addition, the wireless communication signal may include a desired signal into a high-frequency carrier (for example, about 28 GHz in case of 5G communication) such that the desired signal can be transmitted through the high-frequency carrier. To this end, the RF signal conversion module 121 may modulate the carrier upon receiving the control signal from the controller 110, may generate a communication signal, may demodulate the received communication signal through the antenna array 122$d$, and may reconstruct the control signal.

For example, as shown in FIG. 10, the RF signal conversion module 121 may include an encoder (ENC) 121$a$, a modulator (MOD) 121$b$, a multiple input multiple output encoder (MIMO ENC) 121$c$, a precoder 121$d$, an Inverse Fast Fourier Transformer (IFFT) 121$e$, a Parallel to Serial (P/S) converter 121$f$, a cyclic prefix (CP) insertion unit 121$g$, a Digital to Analog Converter (DAC) 121$h$, and a frequency conversion unit 121$i$.

In addition, L control signals may be input to the MIMO ENC 121$c$ through the encoder (ENC) 121$a$ and the modulator (MOD) 121$b$. M streams generated from the MIMO ENC 121$c$ may be precoded by the precoder 121$d$, such that the M streams are converted into N precoded signals. The precoded signals may be converted into analog signals after passing through the IFFT 121$e$, the P/S converter 121$f$, the cyclic prefix (CP) insertion unit 121$g$, and the DAC 121$h$. The analog signals generated from the DAC 121$h$ may be converted into a radio frequency (RF) band through the frequency conversion unit 121$i$.

The RF signal conversion module 121 may include a memory configured to store a program and data needed for modulating/demodulating a communication signal; and a processor configured to modulate/demodulate a communication signal according to the program and data stored in the memory.

However, the scope or spirit of the RF signal conversion module 121 is not limited to the example of FIG. 10, and may be implemented in various ways according to a variety of communication schemes.

The analog signal converted into the RF band may be input to the beamforming module 122. The beamforming module 122 may form a beam pattern for wireless communication upon receiving a control signal from the controller 110, and may transmit or receive the RF signal using the beam pattern.

Although the 5G communication scheme can transmit the RF signal in the radial direction, the RF signal may also be transmitted to a specific region or a specific device through beamforming according to the 5G communication scheme. In this case, the 5G communication scheme may transmit the RF signal through beamforming using millimeter-wave band. In this case, although the millimeter-wave band may indicate a band ranging from about 30 GHz to about 300 GHz, it should be noted that the scope or spirit of the present disclosure is not limited thereto.

The beamforming module 122 may form the beam pattern using the antenna array 122$d$. In this case, the beam pattern may be formed by intensity of the RF signal when the RF signals are focused in a specific direction. In other words, the beam pattern may be a power convergence pattern of the RF signal. Therefore, the vehicle 1 may transmit the RF signal having sufficient intensity to a communication object (e.g., external vehicle, external UE or BS) located in the beam pattern, or may receive the RF signal having sufficient intensity from the communication object.

Alternatively, the longer the distance between the communication object and the center point of the beam pattern, the lower the intensity of RF signal transferred from the vehicle 1 to the communication object. As a result, the intensity of RF signal transferred from the communication object to the vehicle 1 may also be reduced.

In addition, the antenna elements of the antenna array 122d may be regularly arranged, and may control a phase difference between the RF signals generated from the individual antenna elements, such that the antenna array 122d may be implemented as a phased antenna array capable of controlling the beam pattern of the entire antenna array. The antenna elements may be arranged in one dimension, and may also be arranged in two dimensions. However, the number of the antenna elements is not limited thereto.

For example, as shown in FIG. 11, the beamforming module 122 may include a power distribution unit 122a configured to distribute the power of an analog signal generated by the RF signal conversion module 121; a phase converter 122b configured to convert the phase of an analog signal; a variable gain amplifier 122c configured to amplify the power of the analog signal; and an antenna array 122d configured to transmit and receive the analog signal.

The beamforming module 122 may distribute the analog signal power to respective antenna elements (122d-1, 122d-2, . . . , 122d-n) through the power distribution unit 122a, and may control power applied to the respective antenna elements (122d-1, 122d-2, . . . , 122d-n) through the phase converter 122b and the variable gain amplifier 122c, resulting in formation of various beam patterns (BP). Meanwhile, the power distribution unit 122a, the phase conversion unit 122b, and the variable gain amplifier 122c may be commonly referred to as a beamformer.

In this case, assuming that the main direction of the beam pattern (BP) of propagation waves desired to be generated from the antenna array 122d is denoted by θ, the phase difference (Δφ) through the phase converter 122b may be represented by the following Equation 1.

$$\Delta \phi = -\frac{2\pi d}{\lambda} \cos\theta. \quad \text{[Equation 1]}$$

In Equation 1, Δφ is a phase difference, 'd' is a distance between antenna elements, λ is a wavelength of a carrier, and θ is the main direction of the beam pattern.

In Equation 1, the main direction (θ) of the beam pattern (BP) may be determined not only by the phase difference (Δφ) between the antenna elements (122d-1, 122d-2, . . . , 122d-n), but also by the distance (d) between the antenna elements (122d-1, 122d-2, . . . , 122d-n).

In addition, 3 dB Beam Width (BW) of the beam pattern (BP) to be generated from the antenna array 122d may be represented by the following equation 2.

$$BW \simeq \sin^{-1}\left(\frac{2 \times 1.391\lambda}{\pi d N}\right). \quad \text{[Equation 2]}$$

In Equation 2, BW is a beam width (BW) of the beam pattern, d is the distance between the antenna elements, λ is a wavelength of a carrier, and N is the number of antenna arrays.

In Equation 2, the beam width (BW) of the beam pattern (BP) may be determined not only by the distance (d) among the antenna elements (122d-1, 122d-2, . . . , 122d-n) but also by the number N of the antenna elements (122d-1, 122d-2, . . . , 122d-n).

The controller 110 may control the RF signal conversion module 121 and the beamforming module 122. For example, if communication between the vehicle 1 and any one of the external vehicle, the external UE or the external BS is established, the controller 110 may control the RF signal conversion module 121 and the beamforming module 122 to estimate an optimum wireless communication channel (i.e., an optimum RF channel). In more detail, the controller 110 may estimate the RF channel according to the beam pattern (BP), and may generate an optimum RF channel on the basis of the estimated result.

In addition, if the communication signal is transmitted, the controller 110 may control the beamforming module 122 so as to form the beam pattern BP needed to transmit the communication signal. In more detail, the controller 110 may adjust the phase difference (Δφ) among the antenna elements (122d-1, 122d-2, . . . , 122d-n) so as to control the main direction (θ) of the beam pattern formed by the beamforming module 122. In addition, during reception of the communication signal, the controller 110 may control the beamforming module 122 so as to form the beam pattern (BP) needed to receive the communication signal.

Upon receiving a data transmission request from other electronic devices contained in the vehicle 1 through the internal communication unit 170, the controller 110 may control the communication unit 120 to transmit the corresponding data to the external vehicle, the external UE or the external BS.

In addition, upon receiving data from the external vehicle, the external UE or the external BS, the controller 110 may determine a target device of data by analyzing the received data, and may control the internal communication unit 170 in such a manner that the received data can be transmitted to the target device.

Figure 12:
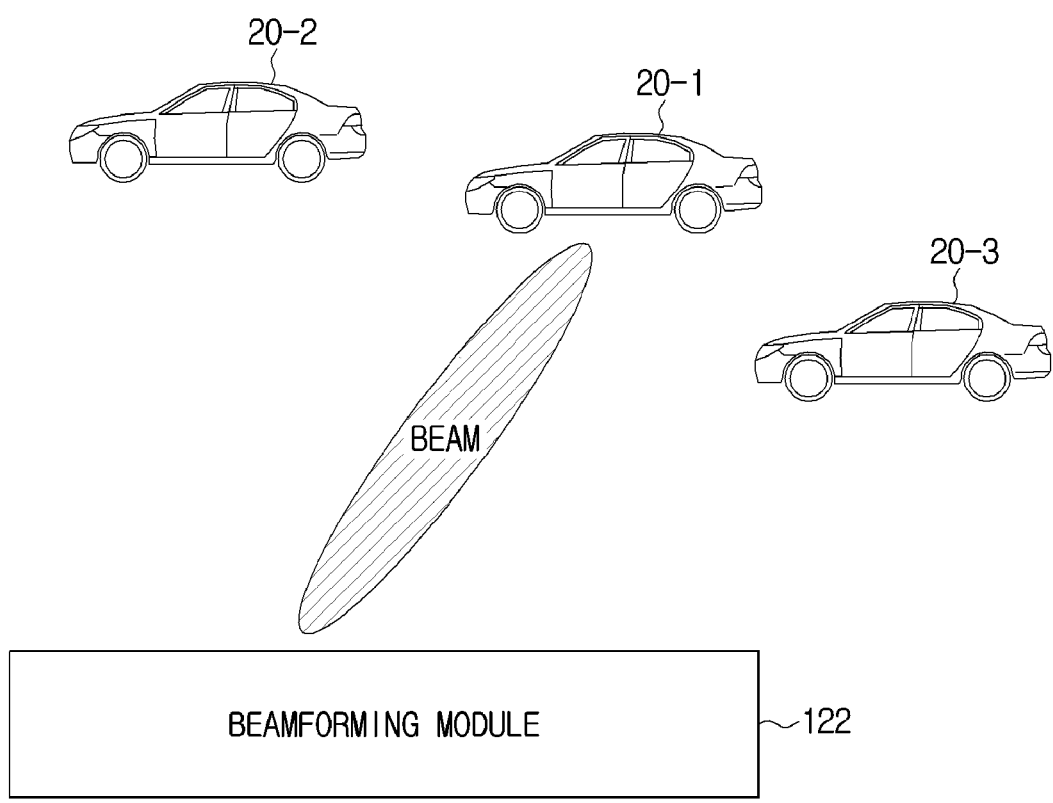
FIGS. 12 and 13 are conceptual diagrams illustrating beam patterns of an output signal of a beamforming module of a vehicle according to an embodiment of the present disclosure.
Figure 13:
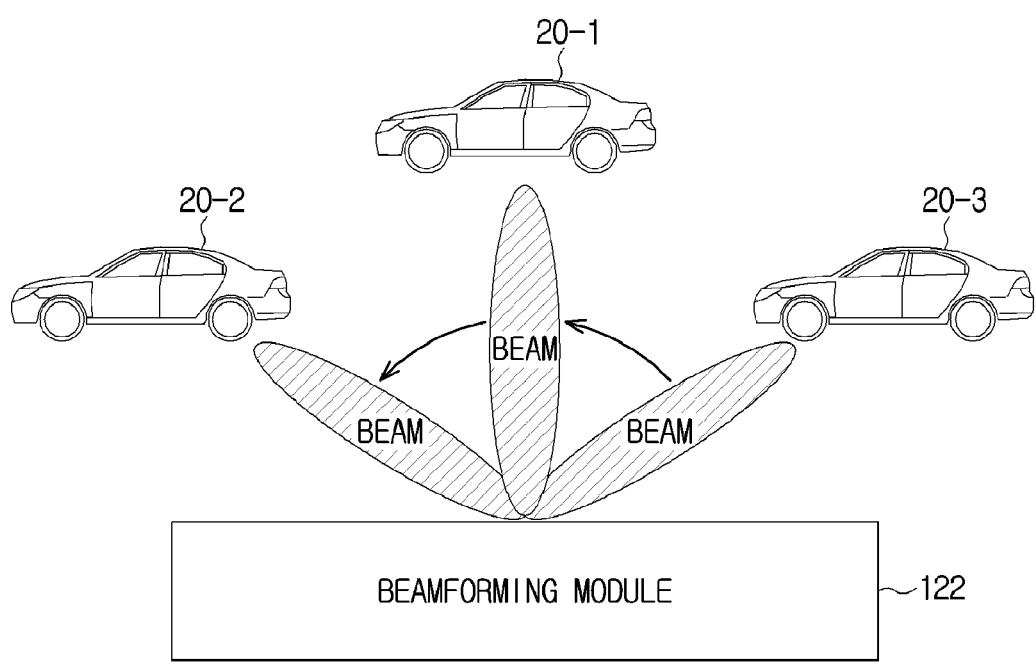

FIGS. 12 and 13 are conceptual diagrams illustrating beam patterns of an output signal of a beamforming module of a vehicle according to an embodiment of the present disclosure.

Referring to FIG. 12, the communication unit 120 may form the beam pattern focused toward the peripheral vehicle (20-1) corresponding to a destination of the transmission signal according to the structure and operation of the above-mentioned beamforming module 122.

In addition, as shown in FIG. 13, the communication unit 120 may transmit the signal to a plurality of peripheral vehicles (20-1, 20-2, 20-3). In this case, the phase difference between the antenna elements is adjusted to change the direction of the beam pattern, such that the signal can be sequentially transmitted to the first peripheral vehicle (20-1), the second peripheral vehicle (20-2), and the third peripheral vehicle (20-3). That is, unicast communication may be sequentially performed at intervals of a short time. Alternatively, if the same content signal is transmitted to the peripheral vehicles (20-1, 20-2, 20-3), the plurality of antenna elements constructing the antenna array 122d may be divided and grouped into a plurality of sub-arrays. Different directions are allocated to respective grouped sub-arrays, such that the beam pattern may also be formed to have directivity in the allocated direction. Alternatively, the beam pattern may be formed in a large size so as to cover the peripheral vehicles (20-1, 20-2, 20-3), such that the signal may also be transmitted to the peripheral vehicles (20-1, 20-2, 20-3) through one beam pattern.

The antenna array 122d may be mounted to at least one of the front surface, the rear surface, and the side surface of the vehicle, and may also be mounted to the top (i.e., roof) of the vehicle as necessary. In addition, a plurality of antenna arrays 122d may also be mounted to the vehicle as necessary, and the installation position of the antenna arrays 122d or the number of the antenna arrays 122d may be adjusted in consideration of the signal transmission direction or the signal linearity.

Figure 14:
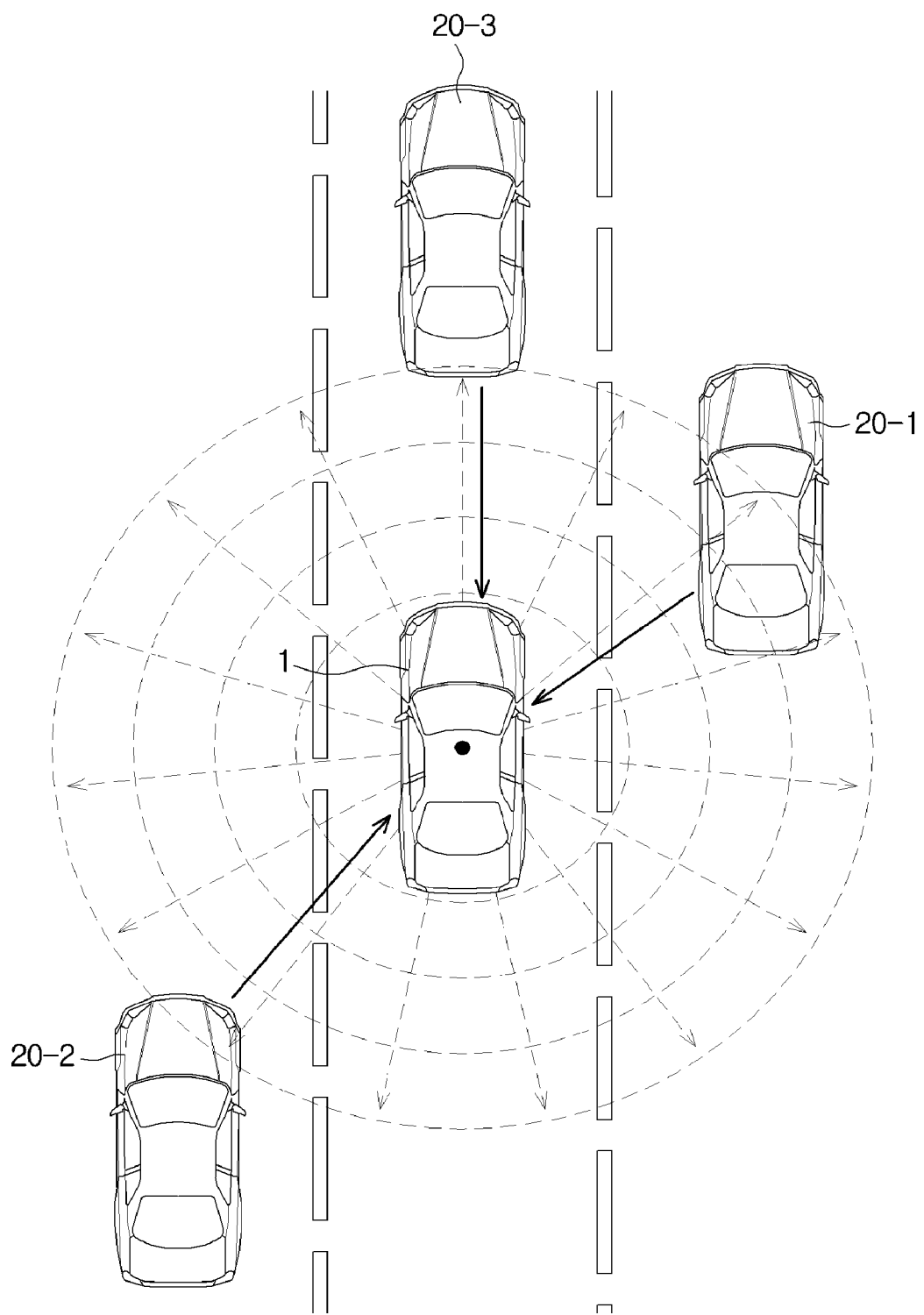
FIG. 14 is a conceptual diagram illustrating an exemplary method for allowing a vehicle to determine the position of peripheral vehicles.

FIG. 14 is a conceptual diagram illustrating an exemplary method for allowing a vehicle to determine the position of peripheral vehicles.

In order to form the beam pattern focused onto the peripheral vehicles 20, the vehicle 1 may determine the position of the peripheral vehicles 20. For example, as shown in FIG. 13, the beam is radiated or emitted in all directions or in various directions, such that it may be determined that the peripheral vehicles 20 are located in a return direction of the response. In more detail, the vehicle 1 may transmit a request signal in all directions through the communication unit 120. If the vehicle 1 receives an acknowledgement (ACK) signal from the peripheral vehicles 20 located in the vicinity of the vehicle 1, it may be determined that the peripheral vehicles 20 are located in the return direction of the ACK signal. In order to more correctly determine the position of the peripheral vehicles 20, GPS information (i.e., location information) may also be contained in the ACK signal transmitted from the peripheral vehicles 20, such that the resultant ACK signal including the GPS information may also be transmitted to a destination. In this case, although a plurality of peripheral vehicles are located to overlap in the same direction on the basis of the position of the vehicle 1, the respective peripheral vehicles can be distinguished from each other.

In another example, the controller 110 may determine the position of peripheral vehicles 20 on the basis of output data of various sensors mounted in the vehicle 1, and a detailed description thereof will be given later.

Meanwhile, the vehicle 1 may also determine one peripheral vehicle 20 located at a specific position from among the plurality of peripheral vehicles 20 having the recognized positions, to be a witness vehicle to which a request for requesting accident associated information will be sent from the vehicle 1.

If the position of each peripheral vehicle 20 to be used as a communication object is determined according to a given scheme, the beamforming module 122 may form the beam pattern focused in the direction of the peripheral vehicles 20. The signal emitted from the antenna array 122d may be emitted only to the designated peripheral vehicle, such that signal interference can be minimized.

Meanwhile, assuming that the vehicle 1 and the peripheral vehicles 20 are located within a communication coverage within which D2D communication can be implemented, the vehicle 1 may be directly connected to the peripheral vehicles 20 without receiving an additional agreement of the vehicle driver according to the predetermined protocol. For example, if the vehicle 1 transmits a request signal to the peripheral vehicle 20 and the peripheral vehicle 20 feeds back the ACK signal as a response to the request signal, the vehicle 1 may immediately communicate with the peripheral vehicles 20. Alternatively, if the peripheral vehicles 20 enter the communication coverage of the vehicle 1, the vehicle 1 may additionally transmit a request signal for asking the peripheral vehicles 20 to agree to communication connection. When the peripheral vehicles 20 agree to the communication connection request from the vehicle 1, the vehicle 1 may communicate with the peripheral vehicles 20. In the embodiment, the communication connection between the vehicle 1 and the peripheral vehicles 20 may indicate that signals can be directly communicated between different devices or different machines. That is, the communication connection state may indicate a communication available state between devices or machines.

A communication connection time between the vehicle 1 and the peripheral vehicles 20 may be located before or after the accident occurrence time. If the communication connection time is located before the accident occurrence time, the communication connection time may be located before or after the accident prediction time. In addition, although the communication connection is achieved, before the accident associated information request and the accident associated information transmission are achieved, the vehicle 1 and the peripheral vehicles 20 may be in a standby mode without communication therebetween. In addition, before requesting the accident associated information, other information may also be communicated between the vehicle 1 and the peripheral vehicles 20.

Figure 15:
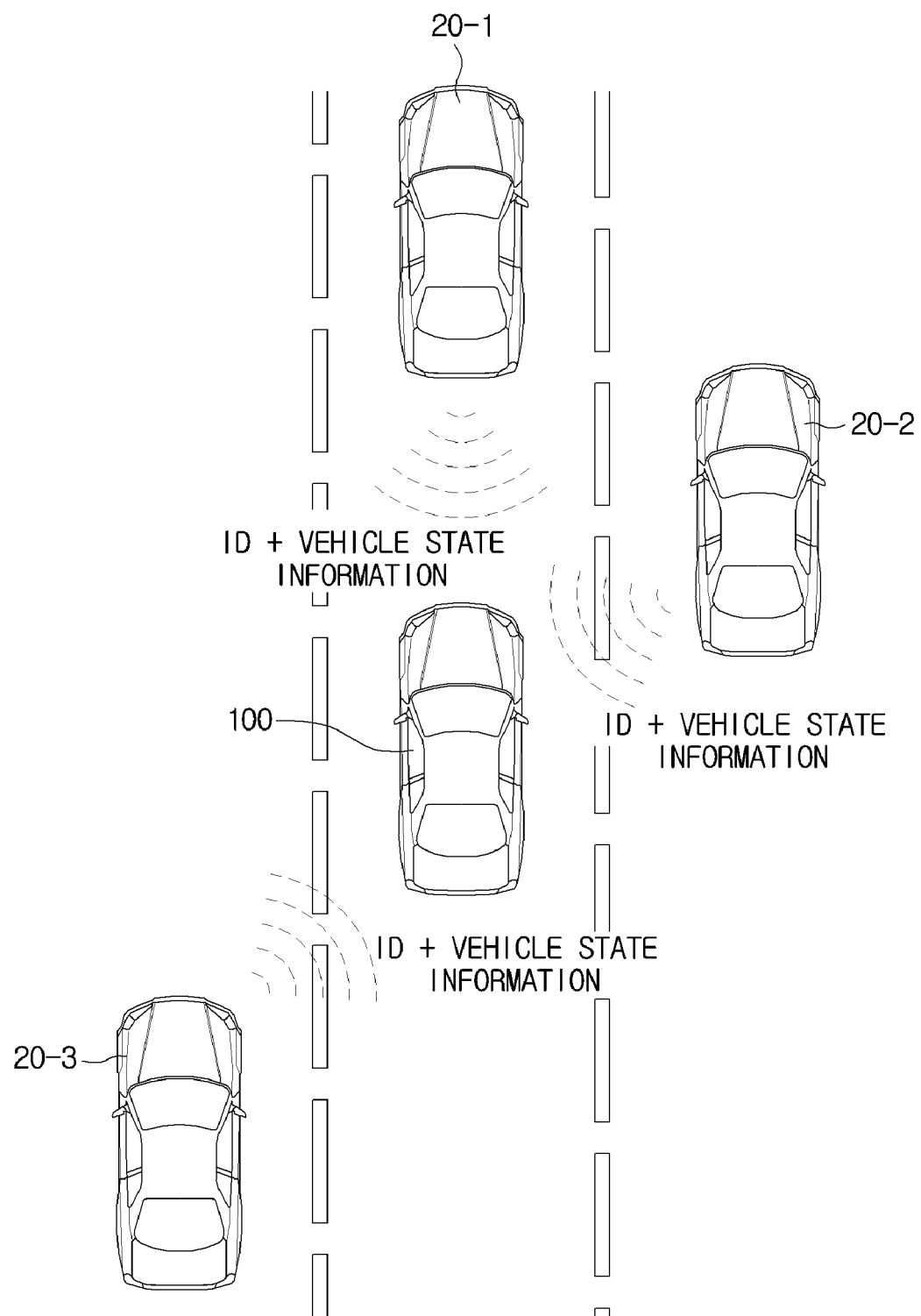
FIG. 15 is a conceptual diagram illustrating exemplary information communicated between the vehicle and peripheral vehicles according to an embodiment of the present disclosure.

FIG. 15 is a conceptual diagram illustrating exemplary information communicated between the vehicle and peripheral vehicles according to an embodiment of the present disclosure.

Referring to FIG. 15, if the vehicle 1 communicates with the peripheral vehicles (20-1, 20-2, 20-3) prior to accident occurrence, vehicle associated information may be shared between the respective vehicles. The vehicle associated information may include vehicle identification (ID) information and vehicle state information.

The vehicle ID information may be a vehicle registration number, each vehicle acting as a communication medium, or an Internet Protocol (IP) or medium access control (MAC) address assigned to a communication unit of each vehicle.

The vehicle state information may include information regarding location, speed, attitude, etc.

The vehicle 1 may receive necessary information from the peripheral vehicle 20, and may also transmit its own ID information and its own state information to the peripheral vehicles 20.

If an accident occurs in the peripheral vehicles 20, the accident associated information may also be transmitted from the vehicle 1 to the peripheral vehicles 20. That is, prior to accident occurrence or accident prediction, it is impossible to determine whether the accident will occur in the vehicle 1 or in the peripheral vehicles 20, such that the vehicle 1 may share necessary information with the peripheral vehicles 20, and the vehicle not having had an accident may transmit the accident associated information to the other vehicle having had an accident.

Figure 16:
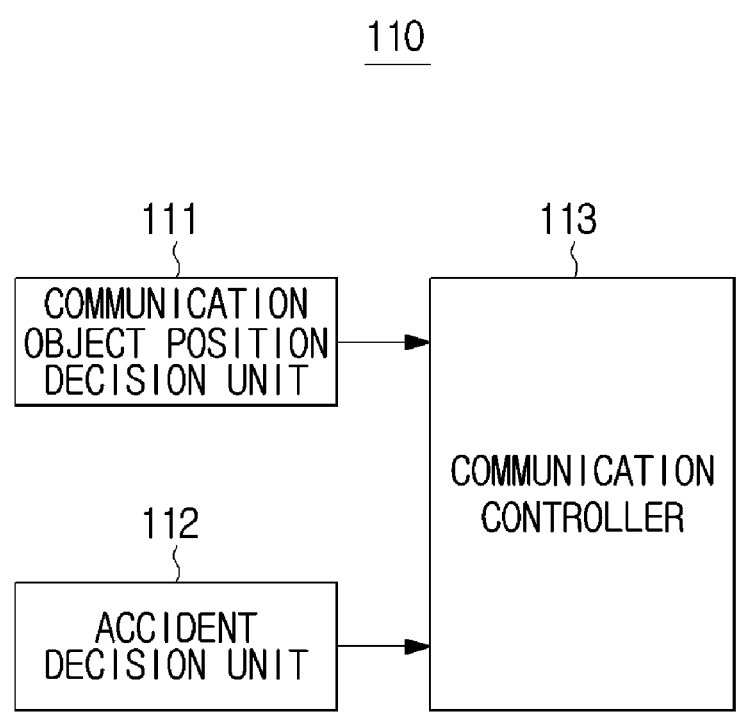
FIG. 16 is a block diagram illustrating a controller mounted to the vehicle according to an embodiment of the present disclosure.
Figure 17:
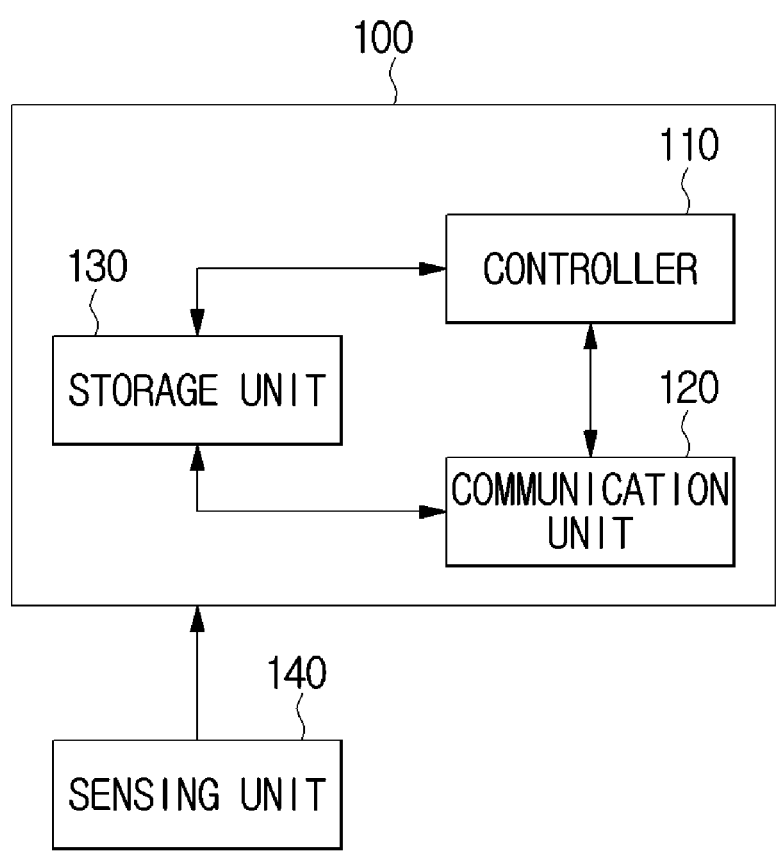
FIG. 17 is a block diagram illustrating a vehicle further including a sensing unit.
Figure 18:
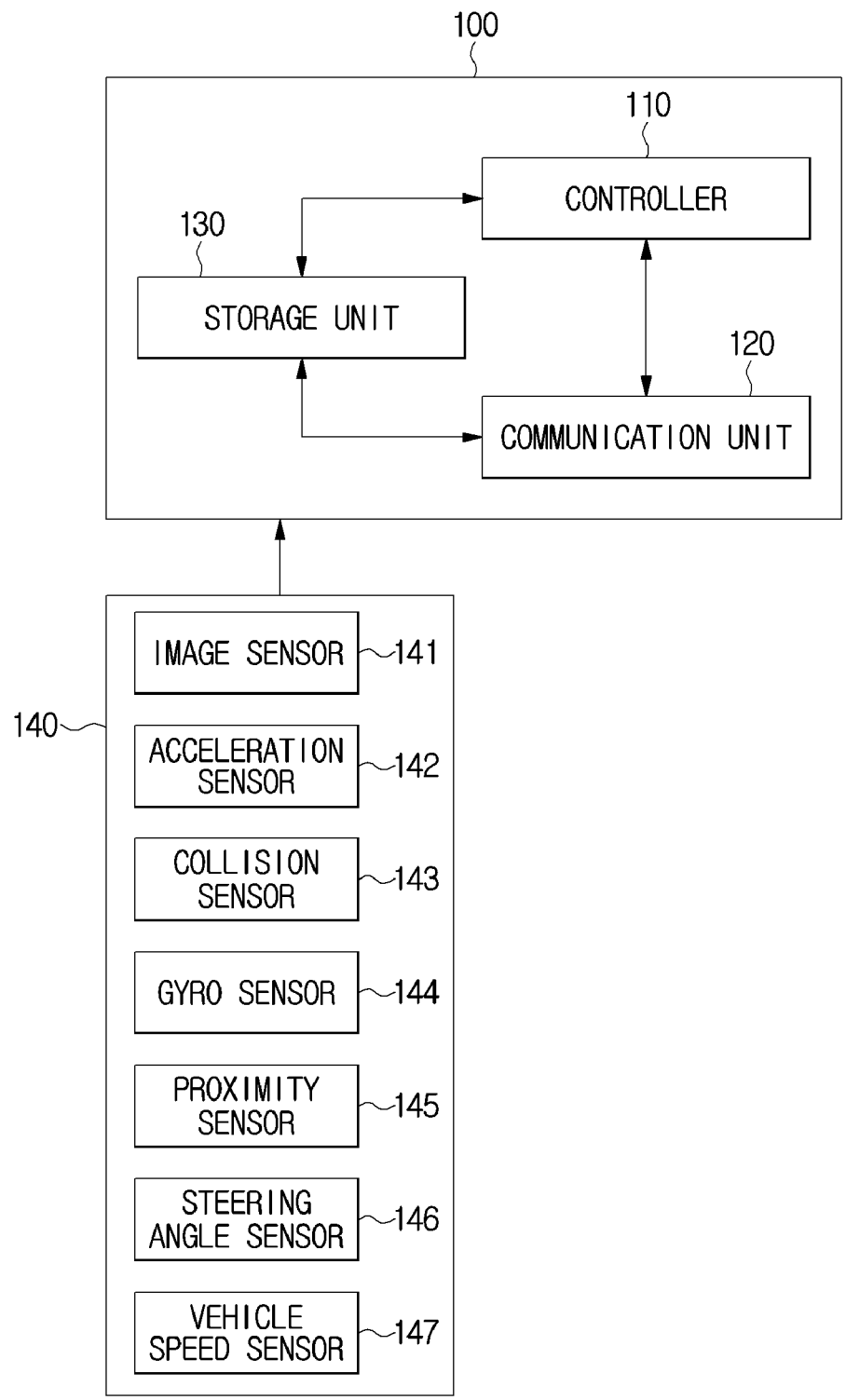
FIG. 18 is a block diagram illustrating exemplary sensors capable of being installed in the sensing unit.

FIG. 16 is a block diagram illustrating a controller mounted to the vehicle according to an embodiment of the present disclosure. FIG. 17 is a block diagram illustrating a vehicle further including a sensing unit. FIG. 18 is a block diagram illustrating exemplary sensors capable of being installed in the sensing unit.

Referring to FIG. 16, the controller 110 may include a communication object position decision unit 111 configured to determine the position of each peripheral vehicle scheduled to enter a communication state; an accident decision unit 112 configured to predict or determine accident occurrence; and a communication controller 113 configured to control the communication unit 120 in such a manner that an appropriate signal can be transmitted to the peripheral vehicle according to the peripheral vehicle position, the accident occurrence, or the accident prediction.

As described above, the communication object position decision unit 111 may emit the beam in all directions or in various directions, and may determine that each peripheral vehicle 20 may be located in the return direction of the response. As will be described later, it may also be possible to determine the position of the peripheral vehicle 20 on the basis of output data of the sensing unit 140. In addition, the communication object position decision unit 111 may also select a specific object (scheduled to request accident associated information) from among the peripheral vehicles 20 having the recognized positions.

Referring to FIG. 17, the vehicle 1 may further include the sensing unit 140 configured to detect the vehicle state information or the peripheral environment.

The detection result (i.e., output data) of the sensing unit 140 may be transmitted to the communication object position decision unit 111. The communication object position decision unit 111 may determine the position of each peripheral vehicle 20 on the basis of the output data of the sensing unit 140, and may designate the peripheral vehicle 20 scheduled to transmit signals. In this case, the peripheral vehicles scheduled to transmit signals may be all the peripheral vehicles, or may be selected from among a plurality of peripheral vehicles having the recognized positions according to a predetermined reference.

The communication controller 113 may generate a control signal including not only the position information of the peripheral vehicle to be used for signal transmission but also a command needed to transmit a certain signal to each peripheral vehicle, such that the communication controller 113 may transmit the control signal to the communication unit 120. That is, the communication unit 120 may generate a control signal for requesting vehicle state information or accident associated information from the designated peripheral vehicle, and may then transmit the control signal to the designated peripheral vehicle. In addition, although the same command is used, the detailed control signals may have different contents according to the structure of the communication unit 120.

Referring to FIG. 18, the sensing unit 140 may include an image sensor 141 configured to capture a peripheral image of the vehicle 1; an acceleration sensor 142 configured to sense acceleration of the vehicle 1; a collision sensor 143 configured to detect impact applied to the vehicle 1; a proximity sensor 144 configured to detect either the presence of an object located in the vicinity of the vehicle 1 or the distance to the object; a gyro sensor 145 configured to detect an attitude of the vehicle 1; a steering angle sensor 146 configured to detect the steering angle of the steering wheel; and a vehicle speed sensor 147 configured to detect the vehicle speed. However, the scope or spirit of the vehicle 1 of the present disclosure is not limited thereto, and the vehicle 1 may further include other sensors other than the above-mentioned sensors. If necessary, the vehicle 1 may not include some parts of the sensors.

The image sensor 141 may be contained in a black box mounted to the vehicle 1, may acquire at least one of a front-view image, a rear-view image, and a side-view image of the vehicle 1, or may also acquire an around-view image as necessary.

The acceleration sensor 142, the collision sensor 143, and the vehicle speed sensor 147 may be provided separately from each other, and it may also be possible to calculate the impact applied to the vehicle 1 or the vehicle speed on the basis of the output signal of the acceleration sensor 142.

The gyro sensor 144 may be configured to measure the attitude of the object. The gyro sensor 144 may measure a variation in the orthogonal pitch axis, the yaw axis, and the roll axis. The gyro sensor mounted to the vehicle may measure the rotation speed of the vehicle with respect to each axis, and may determine the attitude of a vehicle on the basis of output data of the gyro sensor 144.

The proximity sensor 145 may detect the presence of an object adjacent to the sensor, the distance to the corresponding object, or the speed of the corresponding object using at least one of an infrared (IR) sensor, an ultrasonic sensor, and a radar. In this case, the radar may be a radar based on signal propagation, or may be a laser radar based on a pulsed laser.

The IR sensor may be used to guarantee a night visual field as well as to detect a pedestrian. The ultrasonic sensor may be used to detect the object present in the range of a short distance of about 150 cm or less.

The laser radar may emit the laser beam, may measure the transit time of the emitted laser beam, and may measure the distance to the object located in the vicinity of the vehicle 1. The laser radar may also be referred to as Light Detection And Ranging (LIDAR).

The radar based on signal propagation (or based on electric waves) may be classified into a microwave radar, a millimeter wave radar, etc. according to the band of a wavelength of electric waves. The radar may be used to measure the distance between the vehicle 1 and the object as well as to measure the speed of the object.

The output data of the sensing unit 140 may be temporarily or non-temporarily stored in the storage unit 130. After the output data of the sensing unit 140 has been stored for a predetermined time, the stored data may be automatically deleted or may be automatically selected according to a First In First Out (FIFO) scheme when the stored data exceeds a predetermined storage capacity.

When the output data of the sensing unit 140 is stored in the storage unit 130, the output data may also be stored together with at least one of visual information and position information obtained by such sensing. Therefore, when the accident associated information is uploaded to the server 30, when the accident associated information is requested from the peripheral vehicle 20, or when information associated with the accident of the peripheral vehicle 20 is searched for, necessary information from among the information stored in the storage unit 130 may be searched for and then used as necessary. If the peripheral vehicle 20 receives a request signal for requesting the accident associated information from the vehicle 1, the peripheral vehicle 20 may search for necessary information in the storage unit 23 by referring to the accident prediction time, the accident prediction location, the accident occurrence time, and the accident occurrence location.

In more detail, the communication object location decision unit 111 may designate the peripheral vehicle 20 to be used as a communication object on the basis of at least one sensing result of the image sensor 141 and the proximity sensor 145. For example, all or some vehicles located within a predetermined radius from among the peripheral vehicles detected by the image sensor 141 or the proximity sensor 145 may be set to a communication object. Some vehicles located in a specific direction from among vehicles located in a predetermined radius may be set to communication objects. Only some vehicles, each of which has an absolute or relative speed that is equal to or less than a predetermined reference speed, from among a plurality of vehicles located in a predetermined radius may also be set to communication objects.

In addition, since the vehicle 1 and the peripheral vehicle 20 are running, relative positions of the vehicle 1 and the peripheral vehicle 20 may be changed. The communication object position decision unit 111 may track the peripheral vehicle 20 on the basis of the sensed result of the sensing unit 140, and may synchronize the position variation of the peripheral vehicle 20 with formation of the beam pattern. Tracking of the peripheral vehicle 20 may be achieved in real time, and the position variation of the peripheral vehicle 20 and the beam-pattern formation of the peripheral vehicle 20 may be synchronized with each other. As a result, although the relative position of the designated peripheral vehicle 20 is changed, the vehicle 1 may persistently communicate with the designated peripheral vehicle 20.

As described above, requesting of the accident associated information may be achieved when accident occurrence is predicted, and may also be achieved when the accident occurs. The accident decision unit 112 may predict whether the accident occurs on the basis of the sensed result of the sensing unit 140, or may determine whether the accident occurs.

In more detail, the accident decision unit 112 may analyze at least one of the object position detected by the proximity sensor 145 or the image sensor 141, a reduction speed of the distance between the vehicle and the object, the vehicle speed detected by the vehicle speed sensor 147, vehicle acceleration detected by the acceleration sensor 142, and a steering angle detected by the steering angle sensor 146, may determine the possibility of collision occurrence, and may predict accident occurrence on the basis of the determined possibility.

In addition, the accident decision unit 112 may analyze output data of at least one of the proximity sensor 145, the image sensor 141, the acceleration sensor 142, the collision sensor 143, and the gyro sensor 144, and may determine the possibility of accident occurrence. Although not shown in the drawing, the vehicle 1 may further include a sound sensor configured to detect sound, may simultaneously or separately analyze the output data of the sound sensor and the output data of other sensors, and may determine whether an accident occurs. For example, according to the analysis result of the output data of at least one of the proximity sensor 145, the image sensor 141, the acceleration sensor 142, the collision sensor 143, and the gyro sensor 144, if the distance between the vehicle 1 and another vehicle or an external object is rapidly reduced, if the speed of the vehicle 1 is rapidly reduce, if the attitude of the vehicle 1 is rapidly changed, or if the collision sensor 143 detects collision of the vehicle 1, assuming that the sound sensor detects a sound equal to or higher than a predetermined reference level, the accident occurrence may be determined.

However, the above-mentioned description is merely an example applicable to the vehicle 1 and the accident information management apparatus 100. In addition, the accident may also be predicted using other schemes excluding the above-mentioned example, and the presence or absence of the accident may also be determined.

If the accident decision unit 112 predicts an accident or determines accident occurrence, the communication object position decision unit 111 may determine the position of a peripheral vehicle, the communication controller 113 may generate a control signal for enabling the communication unit 120 to request accident associated information or vehicle state information from the peripheral vehicle, and may transmit the control signal to the communication unit 120. Alternatively, prior to accident prediction, if the vehicle 1 transmits and receives vehicle state information to and from the peripheral vehicle according to previous communication, although the accident decision unit 112 does not perform accident prediction or does not determine accident occurrence, the communication object position decision unit 111 may determine the position of the peripheral vehicle, and the communication controller 113 generates a control signal and transmits the control signal to the communication unit 120.

The communication object position decision unit 111, the accident decision unit 112, and the communication controller 113 may be implemented as a separate processor and memory, and all or some thereof may share the processor and the memory as necessary.

The controller 110 may automatically request the accident associated information from the peripheral vehicle 20 through the communication unit 120. Alternatively, the controller 110 may receive a confirmation message indicating the presence or absence of a user request, and then request the accident associated information from the peripheral vehicle 20. A detailed description thereof will hereinafter be given with reference to FIGS. 18 to 20.

Figure 19:
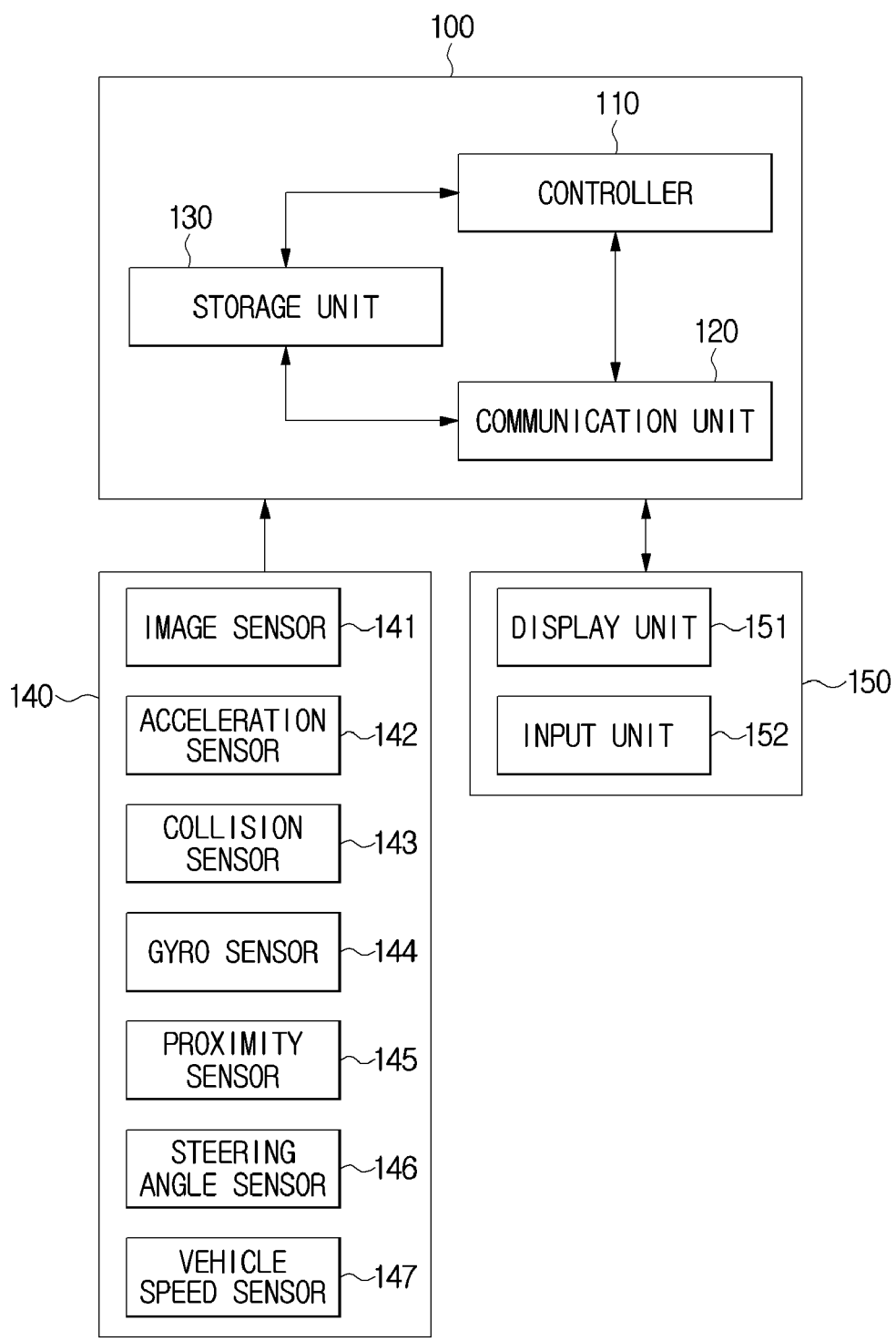
FIG. 19 is a block diagram illustrating a vehicle including a user interface (UI).
Figure 20:
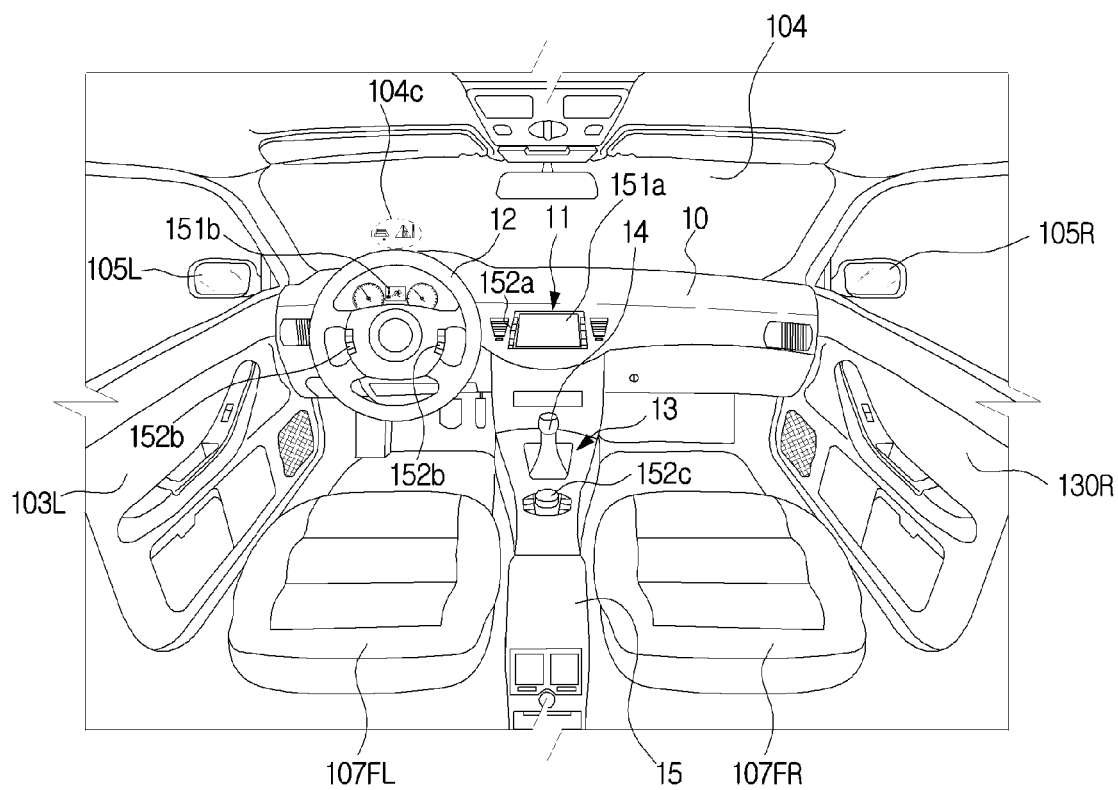
FIG. 20 is a view illustrating the internal structure of the vehicle including the user interface (UI) according to an embodiment of the present disclosure.
Figure 21:
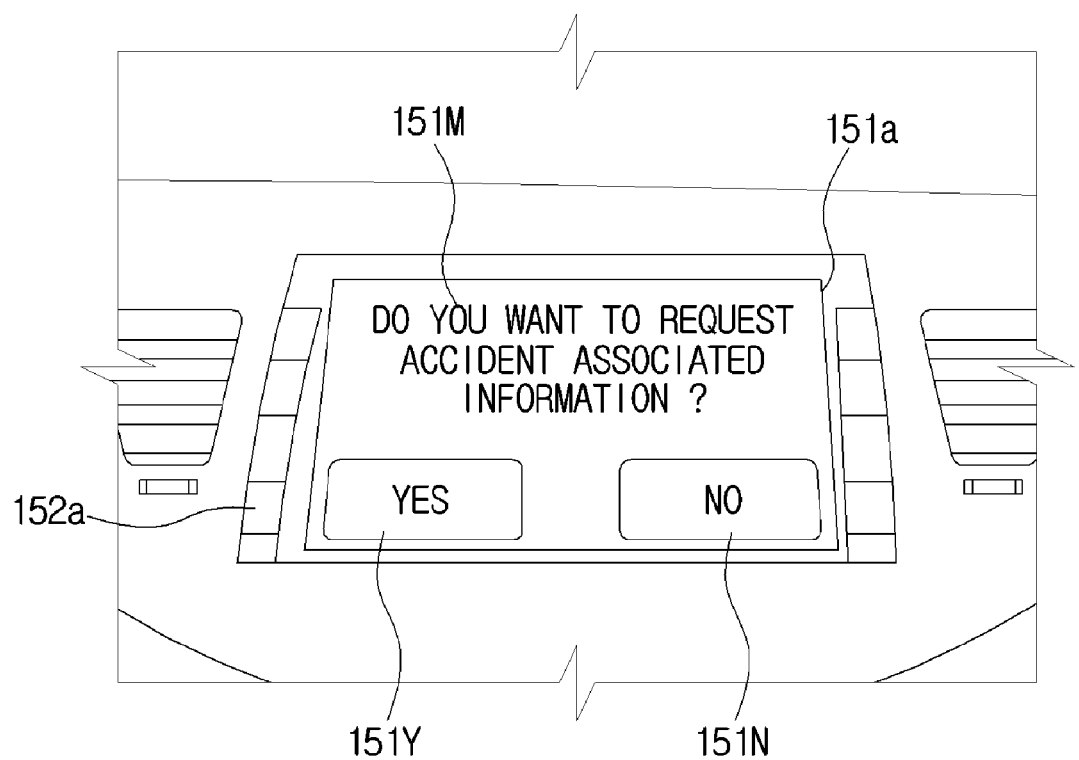
FIG. 21 exemplarily illustrates a screen image, through which a user selects whether to request accident associated information, such that the user selection result is received.

FIG. 19 is a block diagram illustrating a vehicle including a user interface (UI). FIG. 20 is a view illustrating the internal structure of the vehicle including the user interface (UI) according to an embodiment of the present disclosure. FIG. 21 exemplarily illustrates a screen image, through which a user selects whether to request accident associated information, such that the user selection result is received.

A user interface (UI) 150 through which content or information is provided to the user or a user command or user selection is received may be mounted to the vehicle 1. Referring to FIG. 18, the vehicle 1 may include a display unit 151 configured to provide the user with visual content or information; and an input unit 152 configured to receive a command or selection signal from the user.

Referring to FIG. 20, the display unit may include an Audio Video Navigation (AVN) display 151a, a cluster display 151b, and a head-up display (not shown). The input unit 152 may include an AVN input unit 152a, a steering wheel input unit 152b, and a center input unit 152c. The AVN display 151a may be mounted to a center fascia 11 of a dashboard 10, and the cluster display 151b may be mounted to a region facing the steering wheel 3 from among a plurality of regions of the dashboard 2. The head-up display may not directly provide the user with visual information, and may reflect the visual information and display the reflected visual information on the windshield 104. Although the user views the image displayed on the display region 104 of the windshield 30 as shown in FIG. 5, the image viewed by the user's eyes is a virtual image formed at the outside of the windshield 104.

The AVN display 151a, the cluster display 151b, and the head-up display may display content or information related to functions executed by the AVN terminal. That is, the AVN display 151a, the cluster display 151b, and the head-up display may display content or information related to audio, video, and navigation functions. In addition, the AVN display 151a, the cluster display 151b, and the head-up display may also display traveling associated information, for example, remaining fuel quantity, mileage, fuel efficiency, etc. In addition, the AVN display 151a, the cluster display 151b, and the head-up display may also display content or information related to overall control of the vehicle 1.

The AVN display 151a or the cluster display 151b may be implemented by any one of a Liquid Crystal Display (LCD), a Light Emitting Diode (LED), a Plasma Display Panel (PDP), an Organic Light Emitting Diode (OLED), a Cathode Ray Tube (CRT), etc.

The AVN input unit 152a, the cluster input unit 152b, and the center input unit 152c may be distinguished from one another according to their locations. The AVN input unit 152a may be implemented by a hard key or touch panel, at a side surface of the AVN display 151a. If the AVN display 151a is implemented as a touch panel, the touch panel is mounted to the front surface of the AVN display 151a, resulting in formation of a touchscreen.

The cluster input unit 152b formed in a hard key shape is mounted to one region of the steering wheel 12, so that a vehicle driver who grasps the steering wheel 12 can manipulate the cluster input unit 152b.

The center input unit 152c may be implemented as a jog-shuttle or a joystick. If necessary, the center input unit 152c may also be implemented as a touch pad. If the center input unit 152c is implemented as the jog-shuttle, the user may control the jog-shuttle by moving the jog-shuttle forward or backward and to the left or right or by pressing or turning the jog-shuttle.

The AVN input unit 152a, the cluster input unit 152b, and the center input unit 152c may receive a command or selection related to the AVN function. In addition, the AVN input unit 152a, the cluster input unit 152b, and the center input unit 152c may also receive a command or selection related to overall control of the vehicle 1.

For example, as shown in FIG. 21, the AVN display 151a may display a message 151M for querying whether the accident associated information will be requested; and a plurality of buttons (151Y, 151N) for receiving user selection. The user may confirm the message 151M, and may select the first button 151Y for requesting accident associated information using the input unit 152; and the second button 151N for rejecting the request of the accident associated information. In this case, the controller 110 may request the accident associated information from the peripheral vehicle 20 only when the user selects the YES button 151Y.

In addition, the analysis result of the accident associated information may be displayed on the display unit 151, and a detailed description thereof will hereinafter be given.

The vehicle 1 may also transmit the accident occurrence information to the peripheral vehicle 20 when the request for requesting the accident associated information is transmitted to the peripheral vehicle 20. The accident occurrence information may include at least one of the accident occurrence time and the accident occurrence position. Alternatively, only the signal for requesting the accident occurrence information without using the accident occurrence information may also be transmitted to the peripheral vehicle 20.

FIG. 22 is a block diagram illustrating a vehicle further including a GPS receiver.

Referring to FIG. 22, the vehicle 1 may further include a GPS receiver 160 configured to receive the position information of the vehicle 1 from a GPS satellite. The vehicle position information received by the GPS receiver 160 may be used to execute the navigation function. In addition, the vehicle position information may also be transmitted to the peripheral vehicle 20 when the vehicle 1 requests the accident associated information from the peripheral vehicle 20, or may be transmitted as the vehicle state information. Alternatively, the vehicle position information may also be transmitted as the accident occurrence information to the server 30.

The vehicle position information may be GPS coordinates. In addition, if map data is stored in the storage unit so as to perform the navigation function, address information obtained by matching the GPS coordinates to the map data may also be used as vehicle position information.

If the controller 110 requests accident associated information when the accident occurrence is predicted, the controller 110 may transmit the vehicle position information (i.e., the accident prediction position) at the accident prediction time and the corresponding requested time. If the accident associated information is requested when the accident occurs, the vehicle position information (i.e., the accident occurrence position) may be transmitted at the accident occurrence time and the corresponding requested time.

The peripheral vehicle 20 may include the sensing unit configured to detect vehicle state information or a peripheral environment in the same manner as in the vehicle 1; a GPS receiver 26 configured to receive position information of the peripheral vehicle 20 from the GPS satellite; and a storage unit 23 configured to store the sensed result of the sensing unit 24 and position information of the peripheral vehicle 20.

The sensing unit 24 may include an image sensor configured to capture a peripheral vehicle image of the peripheral vehicle 20; an acceleration sensor configured to detect acceleration of the peripheral vehicle 20; a collision sensor configured to detect impact applied to the peripheral vehicle 20; a proximity sensor configured to detect either the presence of an object located in the vicinity of the peripheral vehicle 20 or the distance to the object; a gyro sensor configured to detect the attitude of the peripheral vehicle 20; a steering angle sensor configured to detect a steering angle of the steering wheel; and a vehicle speed sensor configured to detect a vehicle speed.

All or some of the sensed results of the sensing unit 24 may be temporarily or non-temporarily stored in the storage unit 23. Assuming that the sensed results are temporarily stored in the storage unit 23, after the sensed results are stored during a predetermined time, the stored data may be automatically deleted, or may be automatically selectively overwritten by new data according to the First In First Out (FIFO) scheme when the stored data exceeds a predetermined storage capacity.

When the detection result of the sensing unit 24 is stored in the storage unit 23, at least one of the detection time information and the detection position information may also be stored in the storage unit 23. Therefore, if the peripheral vehicle 20 receives the accident associated information from the vehicle 1, necessary information is searched for in the storage unit 23 by referring to the accident prediction time, the accident prediction position, the accident occurrence time, and the accident occurrence position.

For example, information detected 5 minutes before or after the accident occurrence time is searched for in the storage unit 23, and the detected information may be transmitted to the vehicle 1 or the server 30. In addition, the information detected in the range of the radius of 100 m or less from the accident occurrence time from among all information detected 5 minutes before or after the accident occurrence time may also be transmitted to the vehicle 1 or the server 30. In this case, the 5 minutes or the radius of 100 m is disclosed only for illustrative purposes, and an appropriate time and distance may be selected in such a manner that the detection result including information associated with the accident of the vehicle 1 can be searched for. In this case, the search range including the time and distance may be pre-negotiated between a driver of the vehicle 1 and a driver of the peripheral vehicle 20. When the vehicle 1 requests the accident associated information from the peripheral vehicle 20, the search range may be designated and may be transmitted together with the request information. If necessary, the search range may also be established by the peripheral vehicle 20 at random.

The accident associated information transmitted from the peripheral vehicle 20 to either the vehicle 1 or the server 30 may include black-box images, i.e., images captured by the image sensor. In addition, vehicle state information including at least one of the peripheral vehicle (20) position information received by the GPS receiver, the peripheral vehicle (20) speed detected by the vehicle speed sensor, the peripheral vehicle (20) attitude detected by the gyro sensor, and the peripheral vehicle (20) steering-wheel's steering angle detected by the steering angle sensor may also be transmitted along with the accident associated information.

Figure 23:
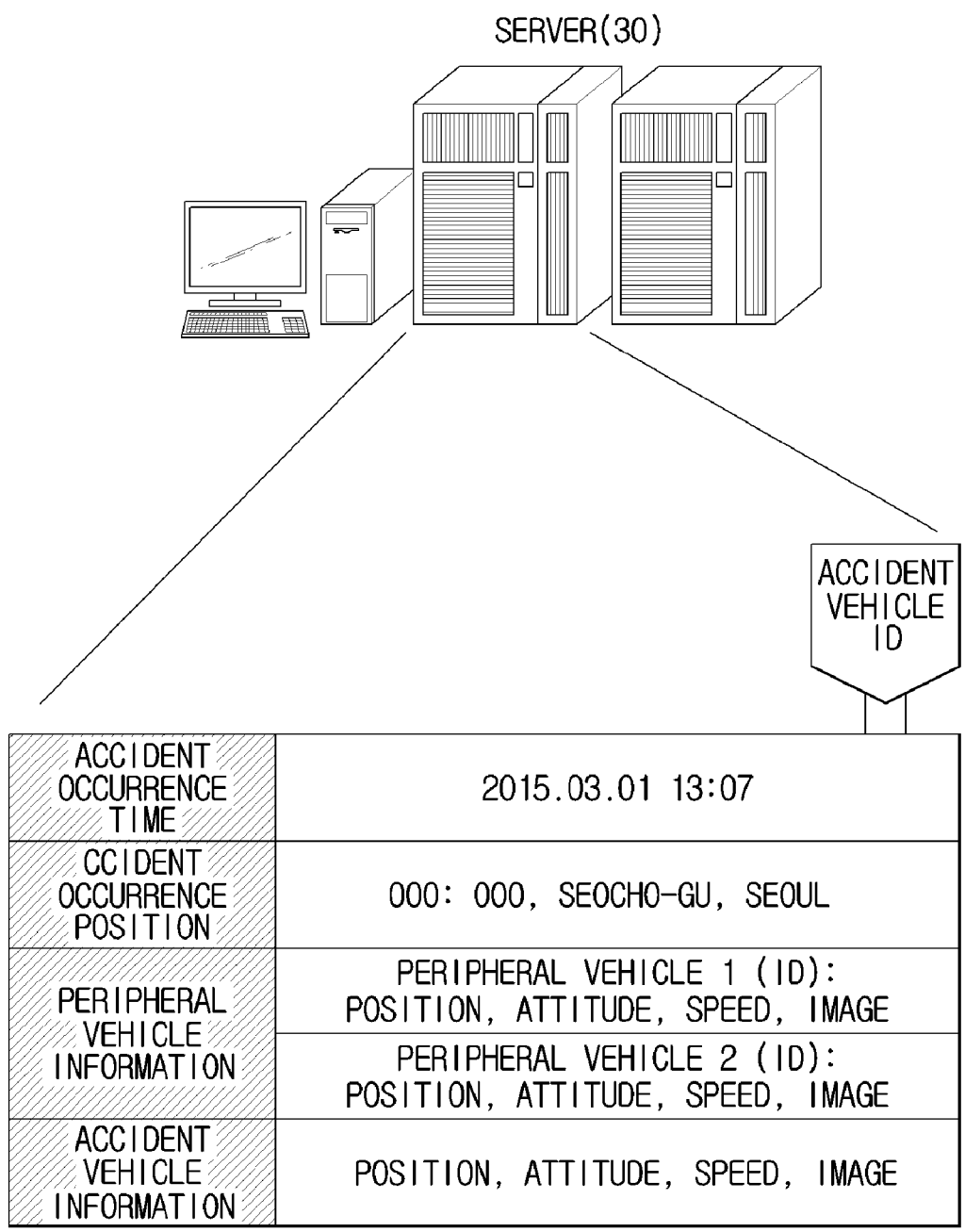
FIGS. 23 and 24 exemplarily illustrate information associated with a traffic accident and stored in a server.
Figure 24:
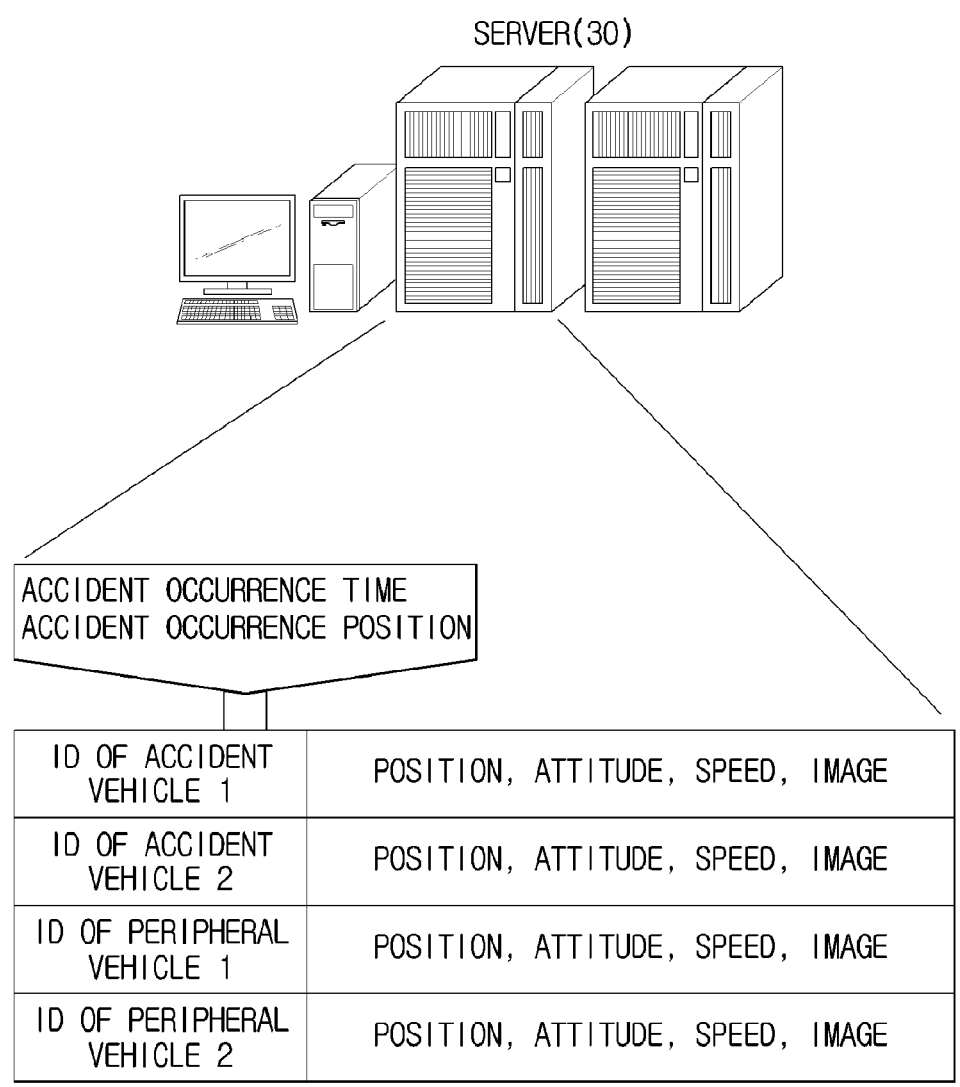

FIGS. 23 and 24 exemplarily illustrate information associated with a traffic accident and stored in a server.

As described above, the vehicle 1 or the peripheral vehicle 20 may upload the accident associated information of the vehicle to the server 30. During uploading of the accident associated information, the ID information of the vehicle 1 and the accident occurrence information of the vehicle 1 may simultaneously be uploaded.

Referring to FIG. 23, the server 30 may use the ID information of the vehicle 1 as a tag, such that it may store the accident associated information and the accident occurrence information therein. In addition, information obtained by the vehicle 1 may be stored as the accident vehicle information. The accident vehicle information may include the speed, the attitude, and the captured images of the vehicle 1 when the accident of the vehicle 1 occurs.

If a traffic accident occurs, two or more vehicles may be associated with the traffic accident. Therefore, the server 30 compares accident occurrence information uploaded from several vehicles 1, such that it can detect some vehicles associated with the same accident. The accident associated information uploaded from vehicles associated with the same accident may be grouped, stored, and managed, as shown in FIG. 24. As can be seen from FIG. 24, ID information of the vehicle 1 is not used as the tag and the accident occurrence information is used as the tag, such that the accident associated information and the accident vehicle information may be stored as necessary. In this case, at least two vehicles (e.g., the accident vehicle 1 and the accident vehicle 2) may be associated with the same accident, and the accident vehicle information (e.g., speed, attitude, images, etc. for each accident vehicle) may be stored. In addition, the peripheral vehicle 20 configured to provide the accident associated information may include the first peripheral vehicle (peripheral vehicle 1) having received the accident associated information from the accident vehicle 1 and the second peripheral vehicle (peripheral vehicle 2) having received the accident associated information from the accident vehicle 2.

Meanwhile, the vehicle 1 may upload the accident occurrence information and the accident associated information to the server 30. If the accident occurs, the accident occurrence information may be uploaded to the server 30 irrespective of the accident associated information, and the vehicle 1 or the peripheral vehicle 20 may also upload the accident associated information to the server 30. In the former case, if the accident associated information is not obtained, only the accident occurrence information may be uploaded to the server 30.

In the above two cases, although the peripheral vehicle 20 having provided the accident associated information is not present in the vicinity of the vehicle 1, or although the peripheral vehicle 20 does not search for the accident associated information, the server 30 may be notified of the accident occurrence situation. As shown in FIG. 24, assuming that the server 30 stores and manages the accident associated information associated with the same accident, the problem in which any one concerned with the accident does not receive necessary information can be prevented from occurring, and different analysis results associated with the same accident can be prevented from being acquired.

Figure 25:
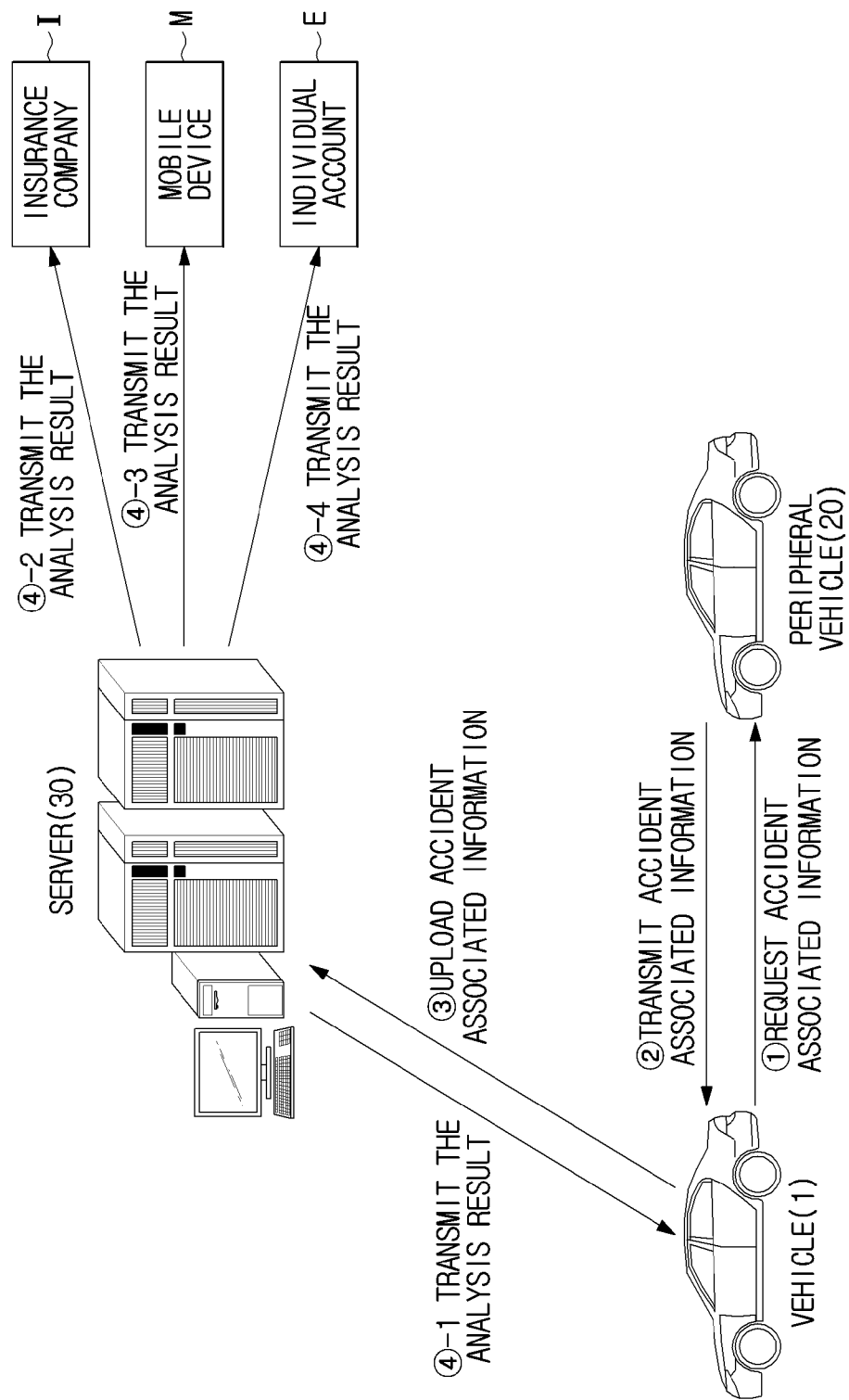
FIG. 25 is a flowchart illustrating signals associated with the accident analysis result obtained from a server.
Figure 26:
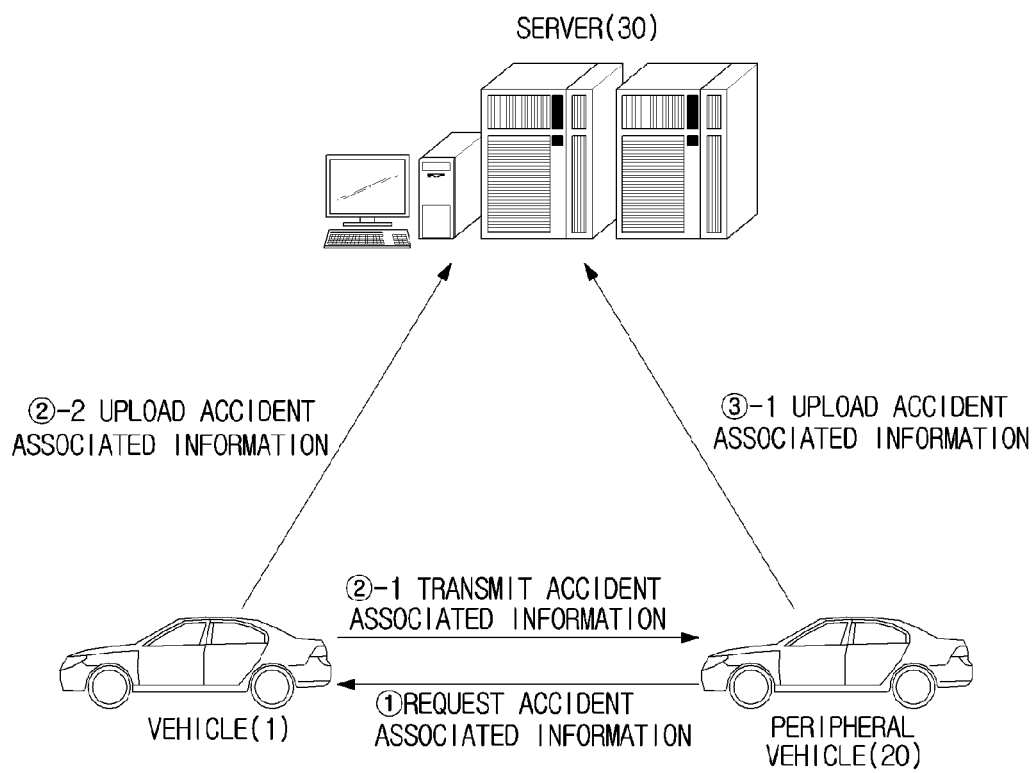
FIG. 26 is a flowchart illustrating an exemplary case in which a vehicle transmits accident associated information.

FIG. 25 is a flowchart illustrating signals associated with the accident analysis result obtained from a server.

Referring to FIG. 25, the vehicle 1 may request the accident associated information from the peripheral vehicle 20 in operation ①. The peripheral vehicle 20 may transmit the accident associated information to the vehicle 1 in operation ②. If the vehicle 1 uploads the accident associated information to the server 30 in operation ③, the server 30 may analyze the cause of the accident using the accident associated information and the accident vehicle information. In addition, it may also be possible to analyze the fault ratio between a plurality of vehicles concerned with the same accident. Although the above-mentioned example has disclosed that the accident associated information is uploaded from the vehicle 1, the scope or spirit of the present disclosure is not limited thereto, and it should be noted that the peripheral vehicle 20 may directly upload the accident associated information to the server 30 as necessary.

The analysis result of the server 30 may be transmitted to the vehicle 1 in operation ④-1. The analysis result of the server 30 may also be transmitted to the insurance company (I) in operation ④-2. The analysis result of the server 30 may be transmitted to the mobile device (M) such as a mobile phone in operation ④-3. The analysis result of the server 30 may also be transmitted to the individual account (E) such as an email address in operation ④-4. The analysis result of the server 30 may be transmitted to any one of the vehicle 1, the insurance company (I), the mobile device (M), and the individual account (E), and may be transmitted to all or some of the vehicle 1, the insurance company (I), the mobile device (M), and the individual account (E).

Information regarding the insurance company (I), the mobile device (M) and the individual account (E) configured to receive the analysis result may be transmitted when the vehicle 1 uploads the accident occurrence information or the accident associated information to the server 30, or may be pre-stored in the server 30 prior to accident occurrence. If the analysis result is pre-stored in the server 30, the target object to which the analysis result will be transmitted may be pre-designated when the accident for each vehicle 1 occurs.

FIG. 25 is a conceptual diagram illustrating the case in which the vehicle 1 transmits the accident associated information to the peripheral vehicle.

As described above, if the accident occurs in the peripheral vehicle, the vehicle 1 may transmit information associated with the accident of the peripheral vehicle may be transmitted. The peripheral vehicle 20 in which the accident occurs may request the accident associated information from the vehicle 1 located in the vicinity of the peripheral vehicle 20 in operation ①. The controller 110 of the vehicle 1 may search for the accident associated information requested by the peripheral vehicle 20 in information stored in the storage unit 130 in operation ②. The vehicle 1 may also transmit the accident associated information to the peripheral vehicle 20 in operation ③-1. The vehicle 1 may also immediately upload the accident associated information to the server 30 in operation ③-2 as necessary. In the former case, the peripheral vehicle 20 may upload the received accident associated information to the server 30 in operation ④-1. In this case, the peripheral vehicle 20 may be the vehicle 1 according to the embodiment, or may not be the vehicle 1. That is, the peripheral vehicle 20 may request the accident associated information, and the peripheral vehicle 20 having transmitted the accident associated information requested by the vehicle 1 may not always be identical in structure to the vehicle 1.

The accident information management apparatus and the vehicle including the same according to another embodiment of the present disclosure will hereinafter be described with reference to the attached drawings.

Figure 27:
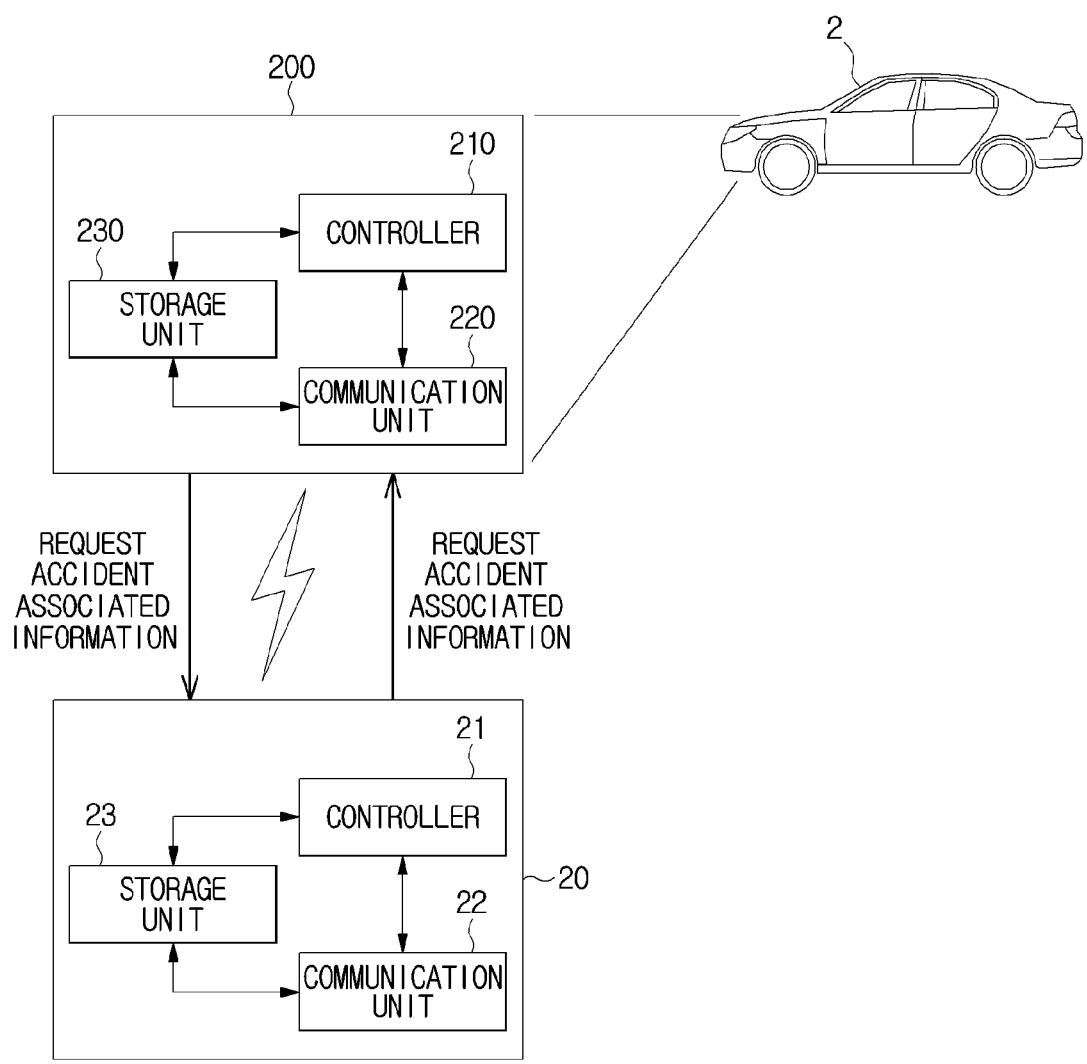
FIG. 27 is a block diagram illustrating an accident information management apparatus according to another embodiment of the present disclosure.

FIG. 27 is a block diagram illustrating an accident information management apparatus according to another embodiment of the present disclosure.

Referring to FIG. 27, the accident information management apparatus 200 according to another embodiment may include a communication unit 220 configured to communicate with the peripheral vehicle 20; a controller 210 configured to request accident associated information from the peripheral vehicle 20 through the communication unit 220; and a storage unit 230 configured to store information received from an external part.

The accident information management apparatus 200 is mounted to the vehicle 2, such that it may request information concerned with the accident of the vehicle 2 from the peripheral vehicle 20, may transmit information received from the peripheral vehicle 20 or may directly analyze the received information.

If the communication unit 22 of the peripheral vehicle 20 receives the request signal of the accident associated information from the vehicle 1 including the accident information management apparatus 200, the controller 21 may search for the corresponding accident associated information in the storage unit 23, and may transmit the corresponding information to the vehicle 2 through the communication unit 22.

In this case, the communication unit 220 of the vehicle 2 may communicate with the communication unit 22 of the peripheral vehicle 20 according to D2D communication without using the base station (BS). In addition, assuming that the communication subject is recognized as a vehicle, communication between two communication units 120 and 22 may also be referred to as V2V (Vehicle to Vehicle) communication as necessary.

The communication unit 220 may implement a 2G communication scheme, a 3G communication scheme, and/or a 4G communication scheme in the same manner as in the above-mentioned communication unit 120. For example, the 2G communication scheme may be Time Division Multiple Access (TDMA), Code Division Multiple Access (CDMA), etc. For example, the 3G communication scheme may be Wideband Code Division Multiple Access (WCDMA), CDMA2000 (Code Division Multiple Access 2000), Wireless Broadband (WiBro), World Interoperability for Microwave Access (WiMAX), etc. For example, the 4G communication scheme may be Long Term Evolution (LTE), Wireless Broadband Evolution, etc. In addition, the communication unit 220 may also implement a 5G communication scheme as necessary. The communication unit 220 may wirelessly communicate with other devices using the base station (BS) according to the above-mentioned communication schemes, or may wirelessly communicate with other devices without using the BS.

Additionally, the communication unit 220 may transmit and receive radio frequency (RF) signals to and from other devices located within a predetermined distance using various communication schemes, for example, Wireless LAN, Wi-Fi, Bluetooth, ZigBee, Wi-Fi Direct (WFD), Ultra wideband (UWB), Infrared Data Association (IrDA), Bluetooth Low Energy (BLE), Near Field Communication (NFC), etc.

For convenience of description and better understanding of the present disclosure, the following embodiment will assume that the communication unit 220 is configured to use the 5G communication scheme, and a detailed description thereof will hereinafter be given in detail.

Meanwhile, during V2V (Vehicle to Vehicle) communication, the communication unit 220 may transmit a signal to a specific peripheral vehicle through beamforming based on the antenna array and the beamformer in the same manner as in the communication unit 120. However, the scope and spirit of the accident information management apparatus 200 and the vehicle 2 including the same according to this embodiment are not limited thereto, and it should be noted that the accident information management apparatus 200 and the vehicle 2 including the same may also directly communicate with the peripheral vehicle as necessary.

The controller 210 may include a memory for temporarily or non-temporarily storing a program and data needed to execute operations to be described later; and a microprocessor for executing the program stored in the memory and processing the stored data. For example, the controller 210 may be contained in an Electronic Control Unit (ECU) or Micro Control Unit (MCU) embedded in the vehicle, or may be implemented as ECU or MCU. The storage unit 220 may include a storage medium, for example, a Random Access Memory (RAM), a Read Only Memory (ROM), a Hard Disk Drive (HDD), a magnetic disc, an optical disc, a solid state drive (SDD), etc. The memory configured to store the program and data of the controller 210 may be contained in the storage unit 230 or may be located independently of the storage unit 230, such that the scope and spirit of the memory and the storage unit 230 are not limited thereto, and can also be applied to other examples without difficulty.

The controller 210 may request the accident associated information from the peripheral vehicle 20 when accident occurrence is predicted or when the accident occurs. In this case, the controller 210 may determine the range of the peripheral vehicle 20 scheduled to request the accident associated information, and a detailed description thereof will hereinafter be given with reference to FIGS. 28 to 31.

FIGS. 28 to 31 are conceptual diagrams illustrating methods for allowing the vehicle to transmit signals to peripheral vehicles located within a predetermined radius according to another embodiment of the present disclosure.

Figure 28:
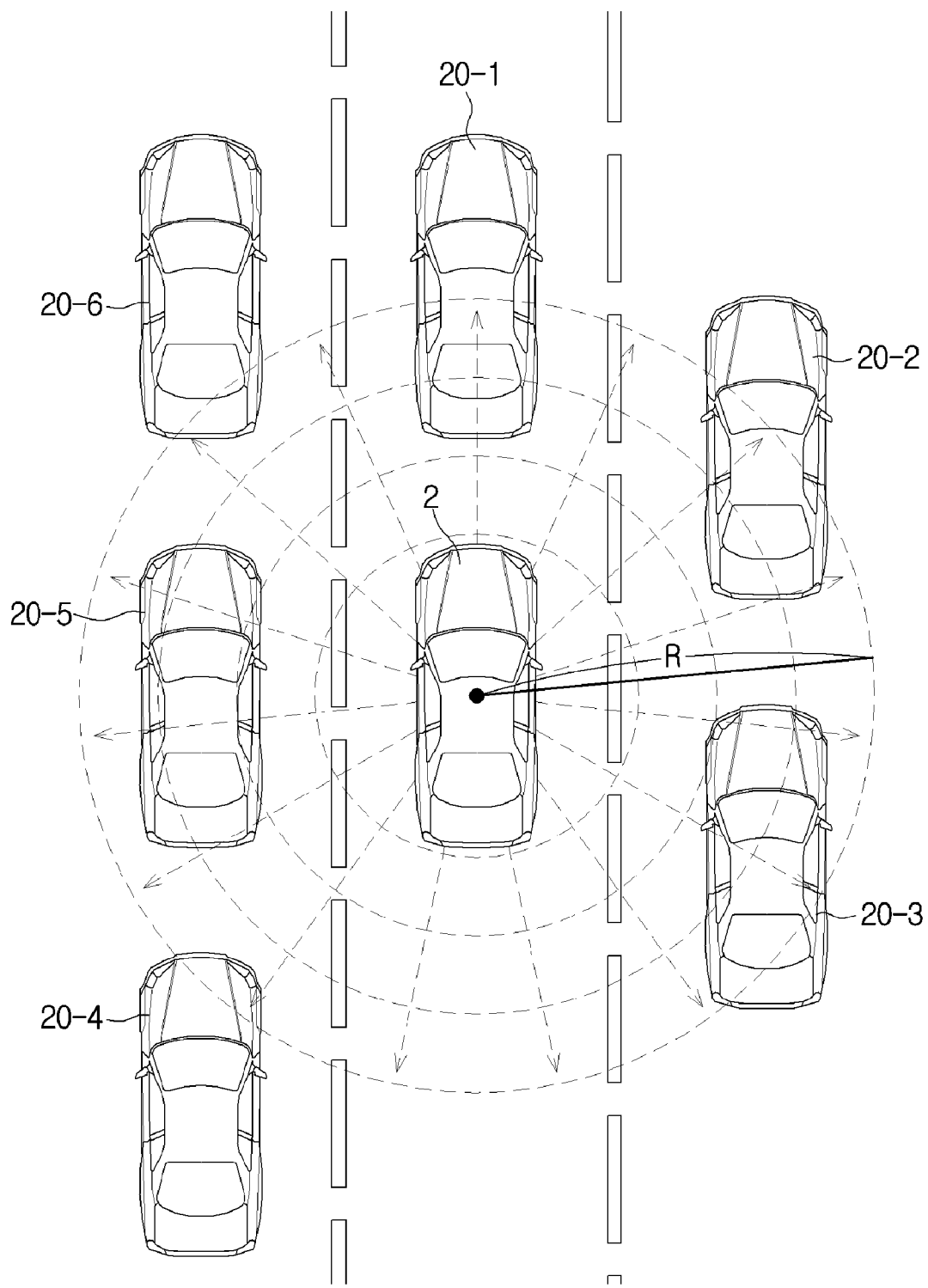
FIGS. 28 to 31 are conceptual diagrams illustrating methods for allowing the vehicle to transmit signals to peripheral vehicles located within a predetermined radius according to another embodiment of the present disclosure.

Referring to FIG. 28, the controller 210 may communicate with all the peripheral vehicles (20-1, 20-2, 20-3, 20-4, 20-5, 20-6) located within the predetermined radius (R) on the basis of the position of the vehicle 2.

The predetermined radius (R) may be determined in consideration of Field Of View (FOV) or resolution, etc. of the black box mounted to the vehicle, or may be determined by communication coverage. In addition, the determined radius may also be changed by the user as necessary.

In this case, the communication unit 220 may include the beamforming module configured to focus signals in a specific direction as described above, such that the communication unit 220 may focus signals onto respective peripheral vehicles and unitcast or multicast the focused signals to the respective peripheral vehicles. However, the communication unit 220 may not include the beamforming module, and may scatter signals within the predetermined radius when broadcasting the same. Alternatively, the communication unit 220 may also transmit a signal to a specific peripheral vehicle using ID information of the peripheral vehicle according to the multicast scheme.

Information applied to the peripheral vehicles may include at least one of ID information of the vehicle 2 and vehicle state information of the vehicle 2. The information received from the peripheral vehicles may include at least one of ID information of the peripheral vehicle, vehicle state information, and the accident associated information. As described above, the vehicle ID information may be a vehicle registration number, each vehicle acting as a communication medium, or an Internet Protocol (IP) or media access control (MAC) address assigned to a communication unit of each vehicle. The vehicle state information may include various information, for example, position, speed, attitude, a steering angle, etc. The accident associated information may include images captured by the black box mounted to the peripheral vehicle.

Figure 29:
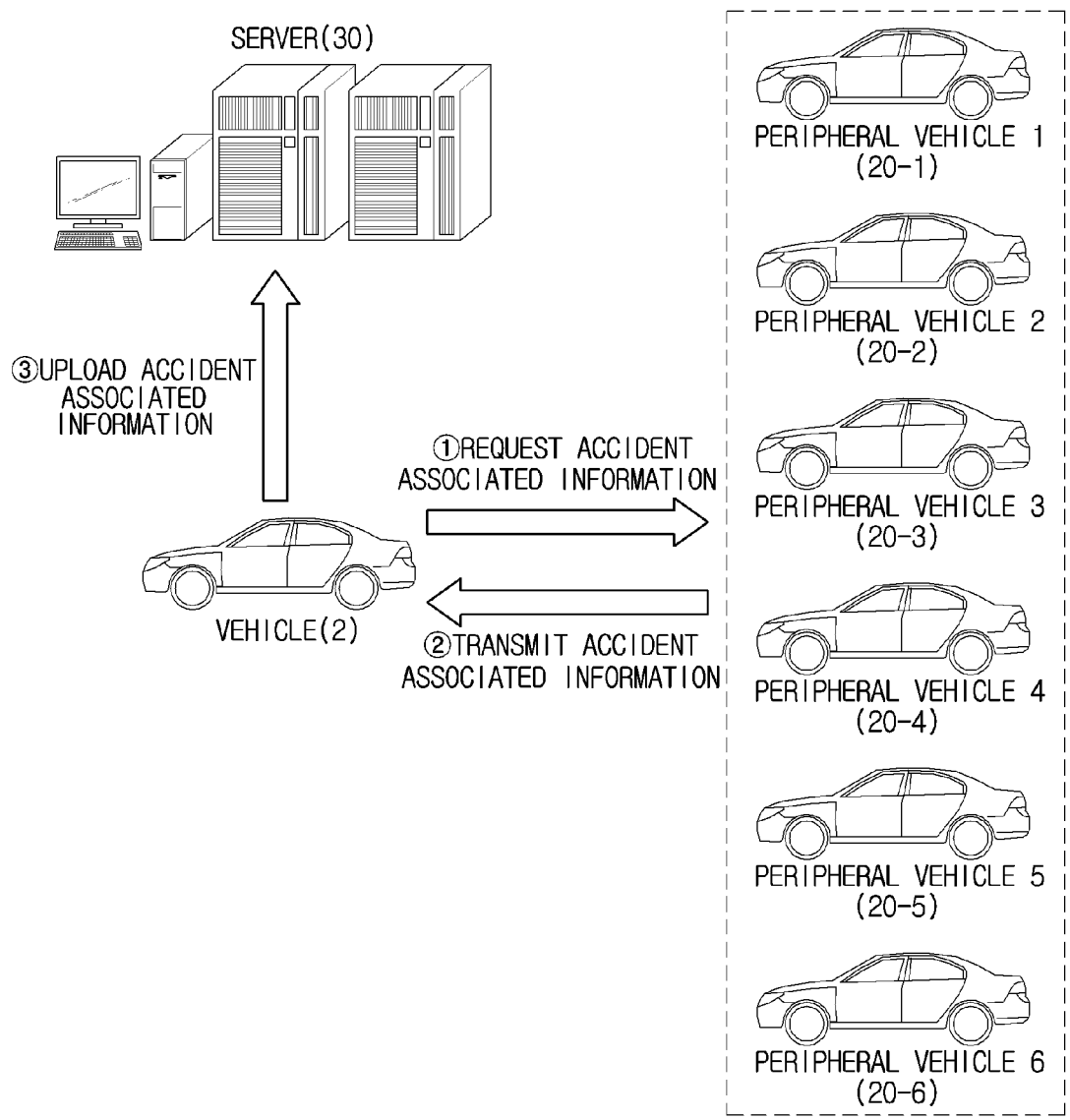

Referring to FIG. 29, the vehicle 2 may request the accident associated information from all the peripheral vehicles (20-1, 20-2, 20-3, 20-4, 20-5, 20-6) located within the predetermined radius (R) in operation ①, may receive the accident associated information from all the peripheral vehicles in operation ②, and may upload the received information to the server 30 in operation ③.

Figure 30:
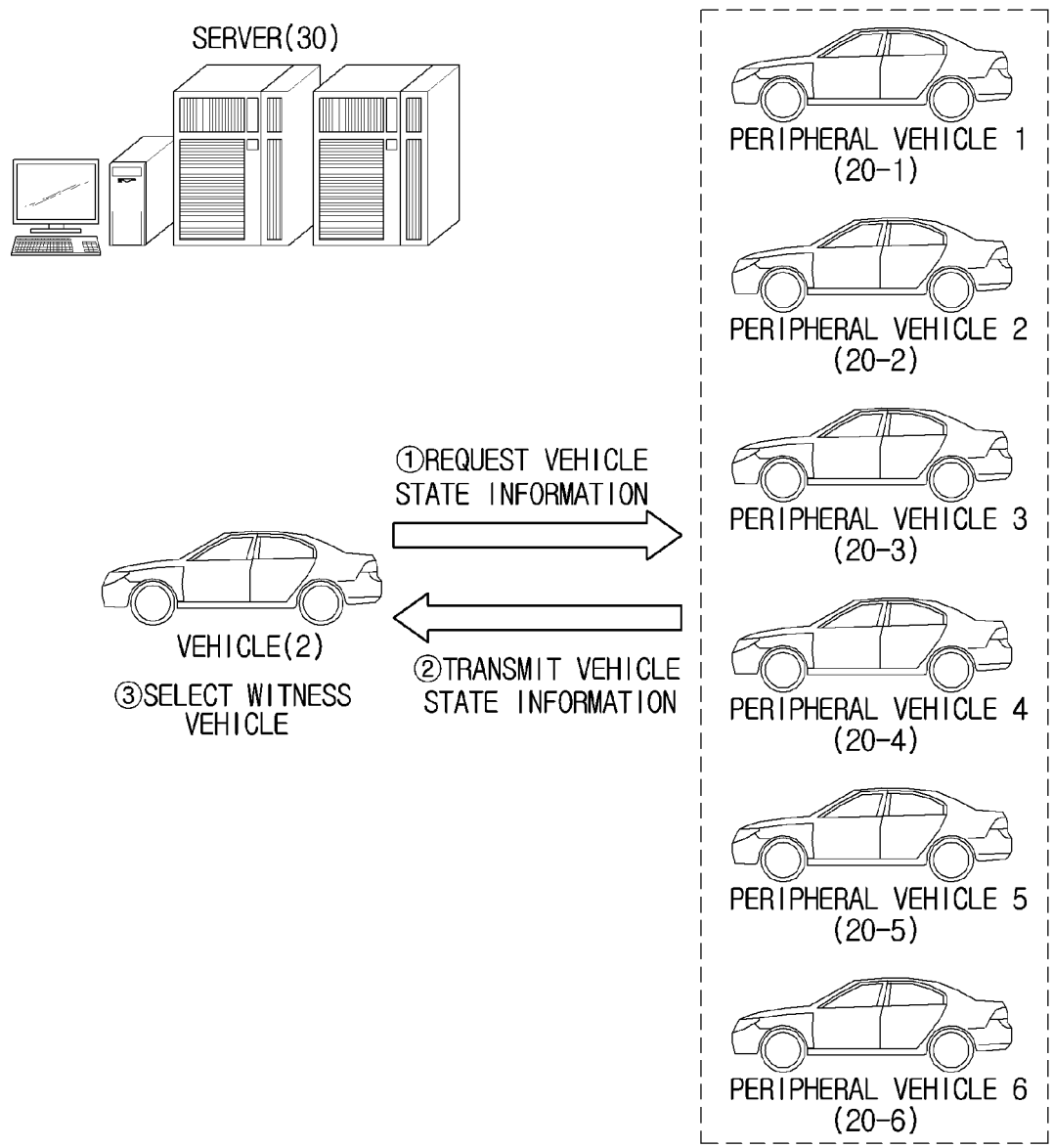
Figure 31:
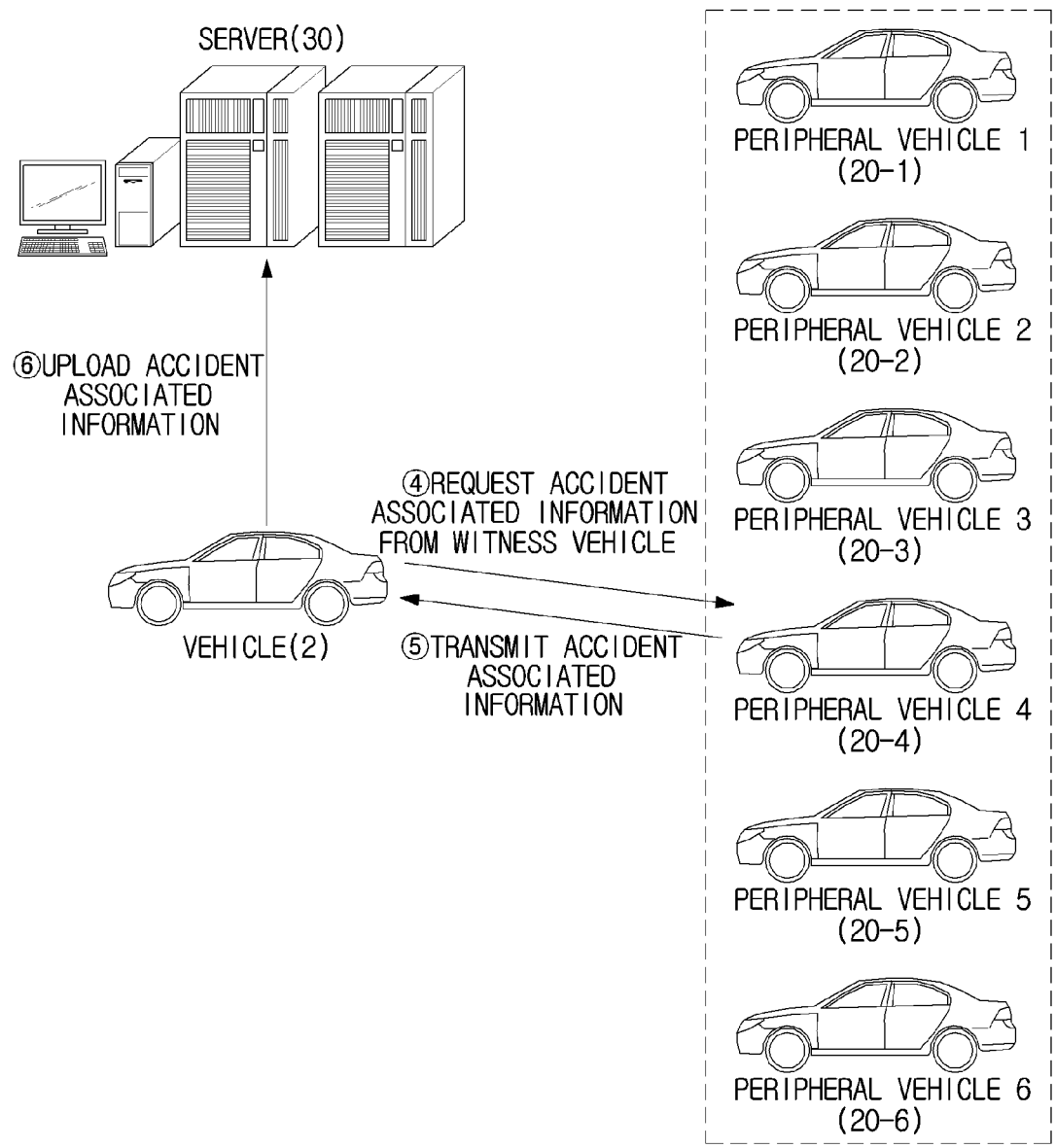

Alternatively, as shown in FIGS. 30 and 31, the vehicle 2 may request vehicle state information from the peripheral vehicles in operation ①, may receive vehicle state information from all the peripheral vehicles in operation ②, may analyze the received vehicle state information in operation ③, and may select a target object scheduled to request the accident associated information. For convenience of description and better understanding of the present disclosure, a vehicle to be used as a target object scheduled to request the accident associated information will hereinafter be referred to as a witness vehicle. The vehicle 2 may request the accident associated information from only the peripheral vehicle 20-4 selected as a witness vehicle in operation ④, may receive the accident associated information from the selected peripheral vehicle 20-4 in operation ⑤, and may upload the received information to the server 30 in operation ⑥. For convenience of description and better understanding of the present disclosure, although it is assumed that only one witness vehicle is selected in FIGS. 30 and 31, it should be noted that two or more witness vehicles may also be selected as necessary.

When the vehicle 2 transmits a signal to only the selected peripheral vehicle 20-4, the beamforming scheme based on the beamforming module may be used, and ID information of the selected peripheral vehicle 20-4 may also be used.

In addition, as can be seen from FIGS. 29 to 31, all the peripheral vehicles or a specific peripheral vehicle selected as a witness vehicle may directly upload the accident associated information to the server 30.

As described above, if the accident occurs, the vehicle 2 uploads accident occurrence information including the accident occurrence time and the accident occurrence position to the server 30, such that the vehicle 2 may inform the server 30 of the accident occurrence fact and may collect the accident associated information. Alternatively, when the vehicle 2 uploads the accident associated information to the server 30, the vehicle 2 may also upload the accident occurrence information to the server 30 as necessary.

In addition, the vehicle 2 and the peripheral vehicle 20 may communicate with each other prior to accident occurrence, such that the vehicle 2 may continuously transmit and receive vehicle ID information or vehicle state information to and from the peripheral vehicle 20 after lapse of the accident occurrence time. The communication time between the vehicle 2 and the peripheral vehicle 20 may be located before or after the accident occurrence time.

FIG. 32 is a block diagram illustrating the vehicle further including a unit for acquiring vehicle state information according to another embodiment of the present disclosure.

Referring to FIG. 32, the vehicle 2 may further include a sensing unit 240 configured to detect vehicle state information or peripheral environment information; and a GPS receiver 260 configured to receive position information of the vehicle 2 from the GPS satellite.

For example, the sensing unit 240 may include an image sensor configured to capture a peripheral image of the vehicle 2; an acceleration sensor configured to sense acceleration of the vehicle 2; a collision sensor configured to detect impact applied to the vehicle 2; a proximity sensor configured to detect either the presence of an object located in the vicinity of the vehicle 2 or the distance to the object; a gyro sensor configured to detect an attitude of the vehicle 2; a steering angle sensor configured to detect the steering angle of the steering wheel; and a vehicle speed sensor configured to detect the vehicle speed. However, the scope or spirit of the vehicle 2 of the present disclosure is not limited thereto, and the vehicle 2 may further include other sensors other than the above-mentioned sensors. If necessary, the vehicle 1 may not include some parts of the sensors. A detailed description of the respective sensors is identical to that of the embodiment of the vehicle 1, and as such a detailed description thereof will herein be omitted for convenience of description.

The vehicle (2) position information received by the GPS receiver 260 may be used to perform the navigation function. In addition, when the vehicle 2 requests the accident associated information from the peripheral vehicle 20, the position information of the vehicle 2 may also be transmitted, or may be transmitted as vehicle state information. Alternatively, the position information of the vehicle 2 may also be transmitted, as the accident occurrence time, to the server 30.

The vehicle position information may be GPS coordinates. In addition, if map data is stored in the storage unit 230 so as to perform the navigation function, address information obtained by matching the GPS coordinates to the map data may also be used as vehicle position information as necessary.

When the controller 210 selects a witness vehicle by analyzing the vehicle state information received from the peripheral vehicle 20, vehicle (2) state information obtained from the sensing unit 240 or the GPS receiver 260 may also be used. A detailed description thereof will hereinafter be given with reference to FIG. 33.

Figure 33:
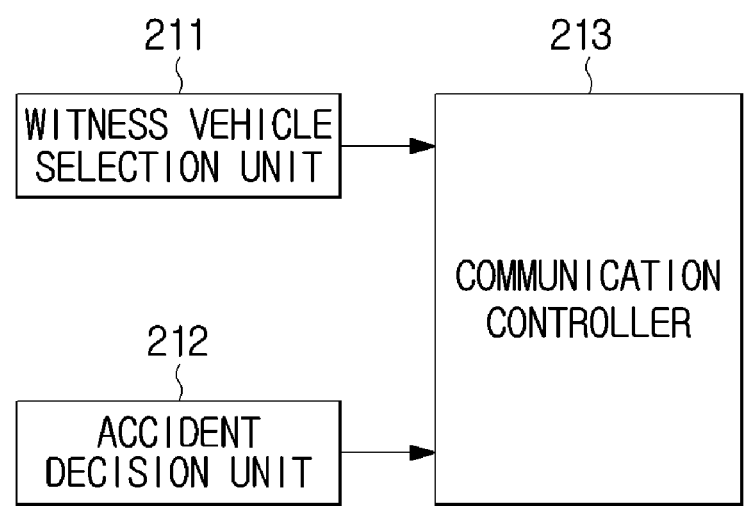
FIG. 33 is a block diagram illustrating a controller according to another embodiment of the present disclosure.

FIG. 33 is a block diagram illustrating a controller according to another embodiment of the present disclosure.

Referring to FIG. 33, the controller 210 may include a witness vehicle selection unit 211 configured to select a witness vehicle on the basis of the vehicle state information received from the peripheral vehicle 20; an accident decision unit 212 configured to predict or decide the accident occurrence; and a communication controller 213 configured to control the communication unit 220 in such a manner that a suitable signal can be transmitted to the peripheral vehicle or the witness vehicle according to the accident occurrence or the accident prediction.

For example, when the accident occurs, or during a predetermined time located before or after the accident occurrence time, the controller 210 receives the position and attitude of the peripheral vehicle 20 and the position, attitude, and speed of the vehicle 2, such that the controller 210 may select a specific peripheral vehicle 20 as a witness vehicle. Here, the specific peripheral vehicle 20 will be used to capture the event generated in the vehicle 2 either at the accident occurrence time or before or after the accident occurrence time. In this case, the accident occurrence part, and the FOV or position of the black box mounted to the peripheral vehicle 20 may be considered. When the peripheral vehicle 20 transmits vehicle state information to the vehicle 2, the FOV or position of the black box may also be transmitted to the vehicle 2. In more detail, if the rear part of the vehicle 2 collides with another vehicle, a specific peripheral vehicle from among peripheral vehicles located to the rear of the vehicle 2 may be selected as a witness vehicle. Here, the selected peripheral vehicle is provided with the black box capable of capturing images in front of the selected peripheral vehicle, and the relative position and attitude of the selected peripheral vehicle with respect to the vehicle 2 indicate that the collision part of the vehicle 2 can be captured.

Meanwhile, if the communication unit 220 directly communicates with the peripheral vehicle according to the beamforming scheme, the witness vehicle selection unit 211 may also determine the position of the peripheral vehicle, and a detailed description of the position decision of the peripheral vehicle is identical to those of the above-mentioned embodiment.

Detailed description of the accident decision unit 212 is identical to those of the accident decision unit 112 according to the embodiment, and as such a detailed description thereof will herein be omitted for convenience of description and better understanding of the present disclosure.

The communication controller 213 may command the communication unit 220 to generate a control signal through which the communication unit 220 can request the accident associated information or the vehicle state information from the peripheral vehicle, and may transmit the control signal to the communication unit 220. Alternatively, assuming that the communication controller 213 transmits and receives the vehicle state information to and from the peripheral vehicle through previous communication prior to accident occurrence prediction, although the accident decision unit 122 does not predict accident occurrence or does not determine the accident occurrence, the communication controller 213 may generate a control signal and then transmit the control signal to the communication unit 120.

The witness vehicle selection unit 211, the accident decision unit 212, and the communication controller 213 may be implemented as a separate processor and memory, and all or some of thereof may share the processor and the memory as necessary.

As described above, if the witness vehicle is selected and the accident associated information is requested and received from the witness vehicle, transmission/reception of unnecessary signals can be prevented from occurring, and communication traffic caused by transmission/reception of unnecessary signals can be reduced, such that the problem in which storage capacity of the vehicle 2 and the server 30 is unnecessarily consumed can be prevented from occurring.

Meanwhile, in the case of using the vehicle 2 according to another embodiment, the vehicle 2 may analyze the accident associated information received from the peripheral vehicle such that it may additionally select a new witness vehicle. In this case, even when the witness vehicle is located outside the communication coverage of the vehicle 2, the vehicle 2 may receive the accident associated information from the corresponding witness vehicle. A detailed description thereof will hereinafter be given with reference to FIGS. 34 and 35.

Figure 34:
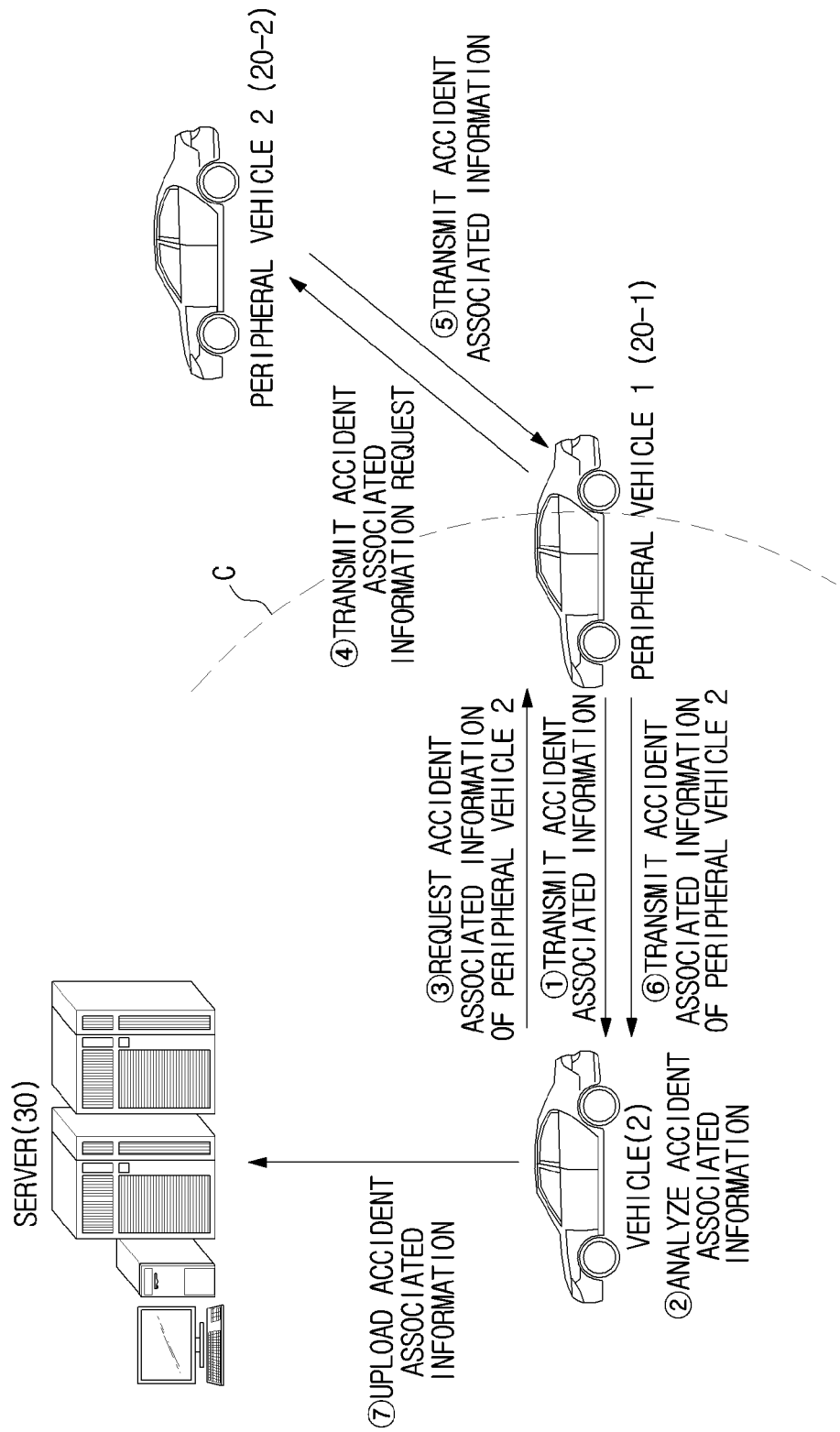
FIG. 34 is a flowchart illustrating flow of signals acquired when the vehicle selects a witness vehicle on the basis of images received from peripheral vehicles according to another embodiment of the present disclosure.
Figure 35:
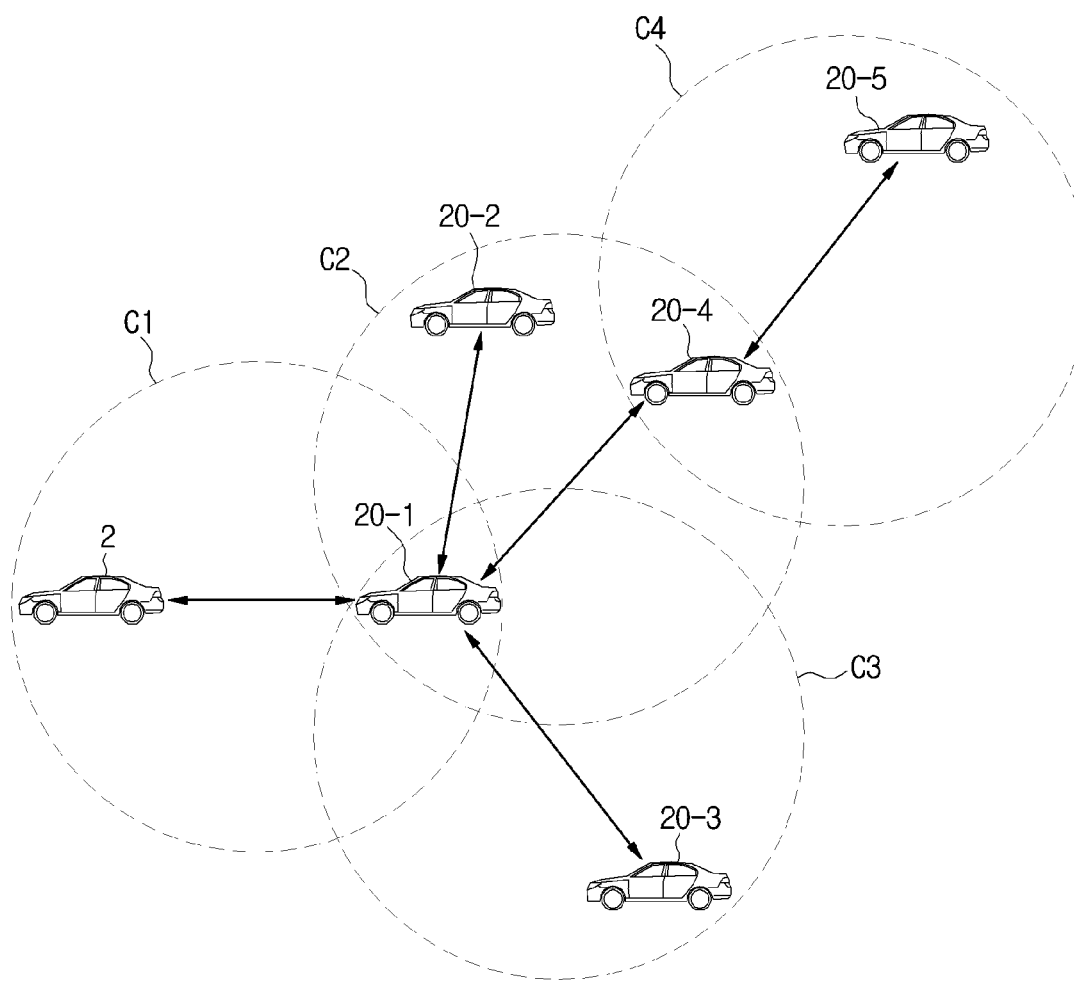
FIG. 35 is a conceptual diagram illustrating a multi-hop communication scheme.

FIG. 34 is a flowchart illustrating flow of signals acquired when the vehicle selects a witness vehicle on the basis of images received from peripheral vehicles according to another embodiment of the present disclosure. FIG. 35 is a conceptual diagram illustrating a multi-hop communication scheme.

Referring to FIG. 34, if the peripheral vehicle 1 (20-1) transmits accident associated information to the vehicle 2 in operation ①, the vehicle 2 analyzes the accident associated information received from the peripheral vehicle 1 (20-1) such that it can determine the presence or absence of another witness vehicle according to the analysis result. The peripheral vehicle 1 (20-1) having transmitted the accident associated information to the vehicle 2 may be an arbitrary vehicle from among some peripheral vehicles located within the communication coverage of the vehicle 2, or may be a witness vehicle selected according to the analysis result of the vehicle state information.

If the images captured by the peripheral vehicle 2 (20-1) are analyzed and the peripheral vehicle 2 (20-2) is determined to be a witness vehicle, the vehicle 2 may request the accident associated information from the peripheral vehicle 2 (20-2) according to the multi-hop communication scheme. In more detail, the vehicle 2 may request accident associated information of the peripheral vehicle 2 (20-2) from the peripheral vehicle 1 (20-1) in operation ③, and the peripheral vehicle 1 (20-1) may transmit a request signal of the accident associated information to the peripheral vehicle 2 (20-2) in operation ④.

In the same manner as in the case of receiving accident associated information, if the peripheral vehicle 2 (20-2) transmits accident associated information to the peripheral vehicle 1 (20-1), the peripheral vehicle 1 (20-1) may transmit accident associated information of the peripheral vehicle 2 (20-2) to the vehicle 2. Although this embodiment has exemplarily disclosed that only one witness vehicle is selected, it should be noted that image information of the peripheral vehicle 1 (20-1) is analyzed so that two or more witness vehicles may also be selected without departing from the scope and spirit of the present disclosure.

The peripheral vehicle 2 (20-2) may be located in the communication coverage of the vehicle 2, or may be located outside the communication coverage of the vehicle 2. However, if the peripheral vehicle 2 (20-2) is located in the communication coverage of the vehicle 2, there may be a possibility that the peripheral vehicle 2 (20-2) directly communicates with the vehicle 2 in a manner that the accident associated information may already be applied to the vehicle 2. If the peripheral vehicle 2 (20-2) is located outside the communication coverage of the vehicle 2, much more information can be obtained than the case in which the collection range of the accident associated information is extended and the accident associated information is collected from only peripheral vehicles located in the communication coverage.

Referring to FIG. 35, it is assumed that the peripheral vehicle 1 (20-1) is contained in the communication coverage ($C_1$) of the vehicle 2, whereas the peripheral vehicle 2 (20-2) is located in the communication coverage ($C_2$) of the peripheral vehicle 1 (20-1) and outside the communication coverage ($C_1$) of the vehicle 2. From the viewpoint of communication, each vehicle may be recognized as a node, the peripheral vehicle 1 (20-1) may be used as a router between the vehicle 2 and the peripheral vehicle 2 (20-2) such that the peripheral vehicle 1 (20-1) can implement signal transmission between the vehicle 2 and the peripheral vehicle 2 (20-2).

In addition, according to the analysis result of the accident associated images of the peripheral vehicle 1 (20-1), if each of the peripheral vehicle 2 (20-2) and the peripheral vehicle 3 (20-3) is selected as a new witness vehicle, the peripheral vehicle 3 (20-3) is located in another communication coverage ($C_3$) of the peripheral vehicle 1 (20-1), such that the peripheral vehicle 1 (20-1) may also implement signal transmission between the peripheral vehicle 3 (20-3) and the vehicle 2. For example, the peripheral vehicle 1 (20-1) may also implement signal transmission between the peripheral vehicle 2 (20-2) and the peripheral vehicle 3 (20-3) at intervals of a predetermined time according to the unicast scheme, and may simultaneously multicast signals to the peripheral vehicle 2 (20-2) and the peripheral vehicle 3 (20-3).

In addition, the vehicle 2 may select the peripheral vehicle 5 (20-5) located outside the communication coverage (C2, C3) of the peripheral vehicle 1 (20-1) as a witness vehicle, or the vehicle 2 may analyze the accident associated information of the peripheral vehicle 2 (20-2) or the peripheral vehicle 3 (20-3) and may also select the peripheral vehicle 5 (20-5) as a new witness vehicle according to the analysis result. That is, the peripheral vehicle 2 (20-2) or the peripheral vehicle 3 (20-3) may be used as a first witness vehicle, and the peripheral vehicle 5 (20-5) may be used as a second witness vehicle. In this case, the peripheral vehicle 1 (20-1) may request accident associated information of the peripheral vehicle 5 (20-5) from the peripheral vehicle 4 (20-4). The peripheral vehicle 4 (20-4) may be located in the communication coverage (C2) of the peripheral vehicle 1 (20-1), and the peripheral vehicle 5 (20-5) may be located in the communication coverage (C4) of the peripheral vehicle 4 (20-4). Therefore, the peripheral vehicle 4 (20-4) may transmit the request of the accident associated information to the peripheral vehicle 5 (20-5). If the peripheral vehicle 5 (20-5) transmits the accident associated information, the peripheral vehicle 4 (20-4) may transmit accident associated information of the peripheral vehicle 5 (20-5) to the vehicle 2 through the peripheral vehicle 1 (20-1). That is, the vehicle 2 and peripheral vehicles (20-1, 20-2, 20-3, 20-4, 20-5) thereof may form a multi-hop relay network such that signals are communicated between the vehicle 2 and the peripheral vehicles (20-1, 20-2, 20-3, 20-4, 20-5), and the range of collectable information can be extended as necessary.

Figure 36:
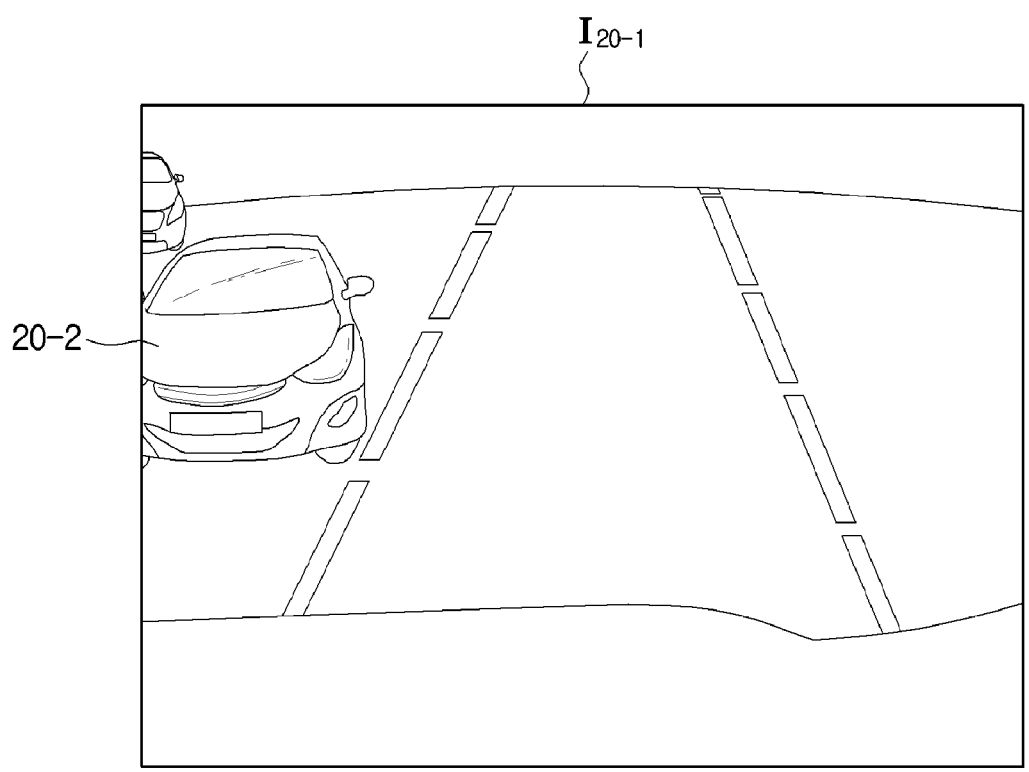
FIG. 36 exemplarily illustrates an accident associated image of a first peripheral vehicle (Peripheral Vehicle 1) analyzed by a vehicle.
Figure 37:
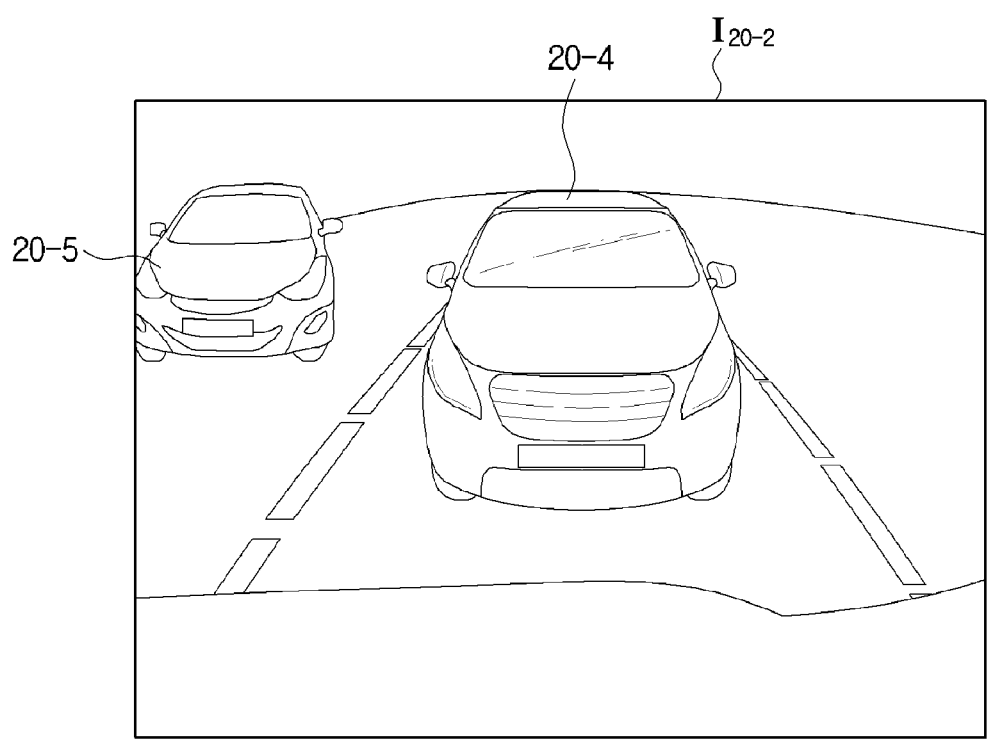
FIG. 37 exemplarily illustrates an accident associated image of a second peripheral vehicle (Peripheral Vehicle 2).

FIG. 36 exemplarily illustrates an accident associated image of a first peripheral vehicle (Peripheral Vehicle 1) analyzed by a vehicle. FIG. 37 exemplarily illustrates an accident associated image of a second peripheral vehicle (Peripheral Vehicle 2).

As described above, the witness vehicle selection unit 211 of the vehicle 2 may analyze the accident associated images from among the accident associated information received from the peripheral vehicle 1 (20-1), such that a new witness vehicle can be selected. Assuming that the images captured by the image sensor mounted to the rear of the peripheral vehicle 1 (20-1) are displayed as shown in FIG. 36, the witness vehicle selection unit 211 may analyze the corresponding image and thus select the peripheral vehicle 2 (20-2) as a witness vehicle. In more detail, the witness vehicle selection unit 211 may recognize the accident occurrence part and the peripheral vehicle 2 (20-2) on the basis of the captured image, and may determine whether the peripheral vehicle 2 (20-2) has captured the situation of accident occurrence time or the other situation obtained for a predetermined time before or after the accident occurrence time on the basis of at least one of the position of the image sensor mounted to the peripheral vehicle 2 (20-2), and the position and attitude of the peripheral vehicle 2 (20-2) shown in the captured image.

In addition, the witness vehicle selection unit 211 may analyze the accident associated information of the peripheral vehicle 2 (20-2), such that it may further select another witness vehicle on the basis of the analysis result. For example, if the image captured by the image sensor mounted to the rear of the peripheral vehicle 2 (20-2) is displayed as shown in FIG. 37, the witness vehicle selection unit 211 analyzes the corresponding image and determines that the peripheral vehicle 5 (20-5) has captured the situation of the accident occurrence time or the other situation obtained for a predetermined time before or after the accident occurrence time, such that the witness vehicle selection unit 211 may select the peripheral vehicle 5 (20-5) as a witness vehicle. In this case, as described above, the multi-hop relay network is formed so that signals can be communicated between the vehicle and the peripheral vehicles.

Meanwhile, the vehicle 2 according to another embodiment may analyze vehicle state information received from the peripheral vehicle, and may select a new witness vehicle according to the analysis result. A detailed description thereof will hereinafter be given with reference to FIG. 38.

Figure 38:
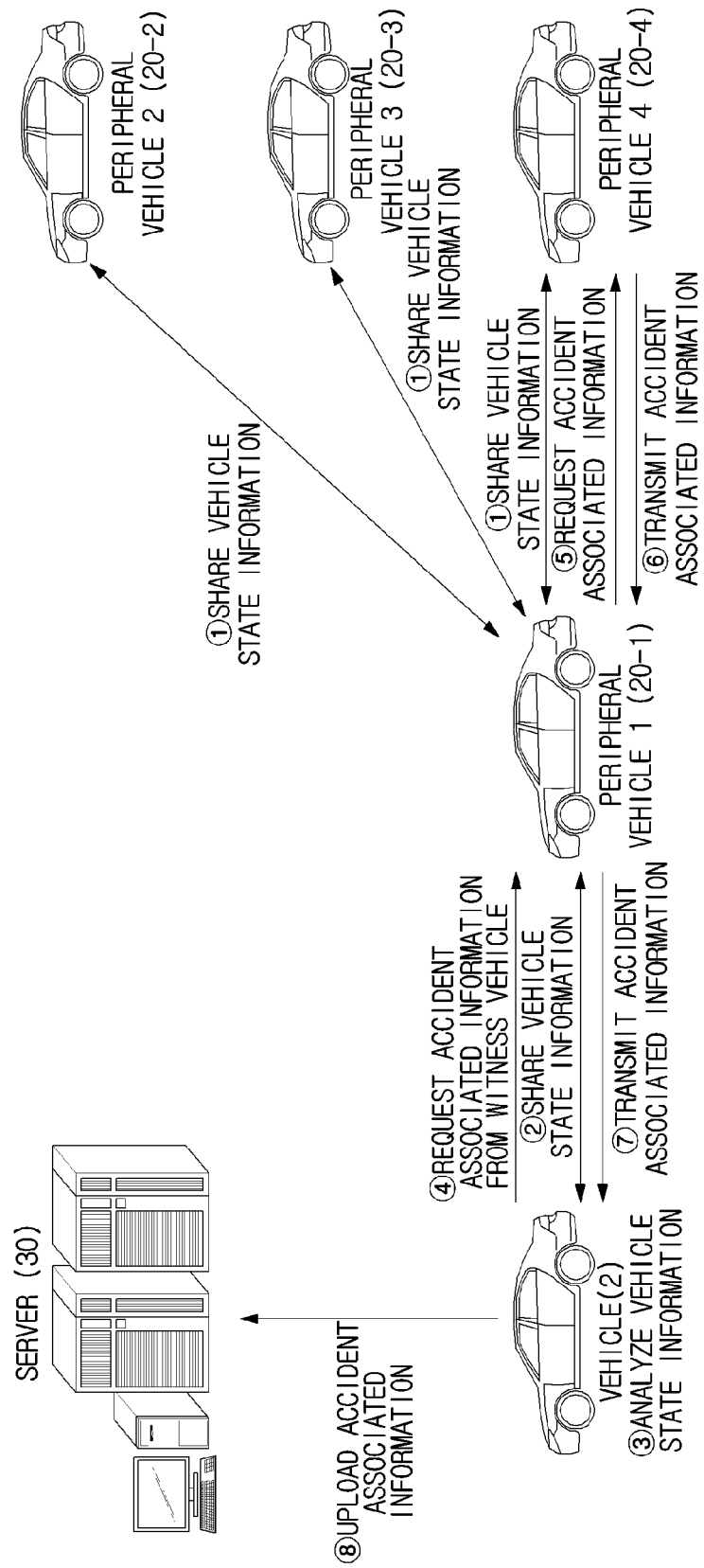
FIG. 38 is a flowchart illustrating a method for selecting a witness vehicle by analyzing vehicle state information received from peripheral vehicles.

FIG. 38 is a flowchart illustrating a method for selecting a witness vehicle by analyzing vehicle state information received from peripheral vehicles.

Referring to FIG. 38, vehicle state information may be shared among the peripheral vehicles (20-1, 20-2, 20-3, 20-4) in operation ①. The vehicle 2 may receive vehicle state information from the peripheral vehicle 1 (20-1) located in the communication coverage (C) in operation ②. The vehicle state information received from the peripheral vehicle 1 (20-1) may include not only vehicle state information of the peripheral vehicle 1 (20-1) but also vehicle state information of other peripheral vehicles (20-2, 20-3, 20-4). Although the other peripheral vehicles (20-2, 20-3, 20-4) are not located in the communication coverage (C) of the vehicle 2, the vehicle 2 may receive vehicle state information of the peripheral vehicles (20-2, 20-3, 20-4) through the peripheral vehicle 1 (20-1).

The witness vehicle selection unit 211 of the vehicle 2 may select a witness vehicle by analyzing the received vehicle state information of the peripheral vehicles in operation ③. For example, the witness vehicle selection unit 211 may determine the peripheral vehicle expected as a witness vehicle having captured the situation of the occurrence time of the accident generated in the vehicle 2 or the other situation obtained for a predetermined time before or after the accident occurrence time, upon receiving the position and attitude of the vehicle 2 and the position, attitude, and speed of the peripheral vehicles (20-1, 20-2, 20-3, 20-4). In this case, the position, attitude, and speed of various peripheral vehicles located in the vicinity of the vehicle 2 are simultaneously analyzed, such that it may also be possible to consider a specific situation in which a vision field of the black box mounted to each peripheral vehicle is covered with other peripheral vehicles.

If the peripheral vehicle 4 (20-4) selected as a witness vehicle is located outside the communication coverage of the vehicle 2, the witness vehicle selection unit 211 uses the peripheral vehicle 1 (20-1) as an intermediate node, such that it can request and receive the accident associated information according to the multi-hop communication scheme. In more detail, if the vehicle 2 requests the accident associated information of the peripheral vehicle 4 (20-4) from the peripheral vehicle 1 (20-1) in operation ④, the peripheral vehicle 1 (20-1) may request the accident associated information from the peripheral vehicle 4 (20-4) in operation ⑤. If the peripheral vehicle 4 (20-4) transmits the accident associated information to the peripheral vehicle 1 (20-1) in operation ⑥, the peripheral vehicle 1 (20-1) may transmit the accident associated information received from the peripheral vehicle 4 (20-4) to the vehicle 2 in operation ⑦. As a result, the vehicle 2 may upload the received accident associated information to the server 30 in operation ⑧.

In contrast, the accident prediction of the vehicle 2 or the occurrence of the accident of the vehicle 2 may be carried out by the peripheral vehicle 20, and the accident associated information may also be actively transmitted as necessary. A detailed description thereof will hereinafter be described with reference to FIG. 39.

Figure 39:
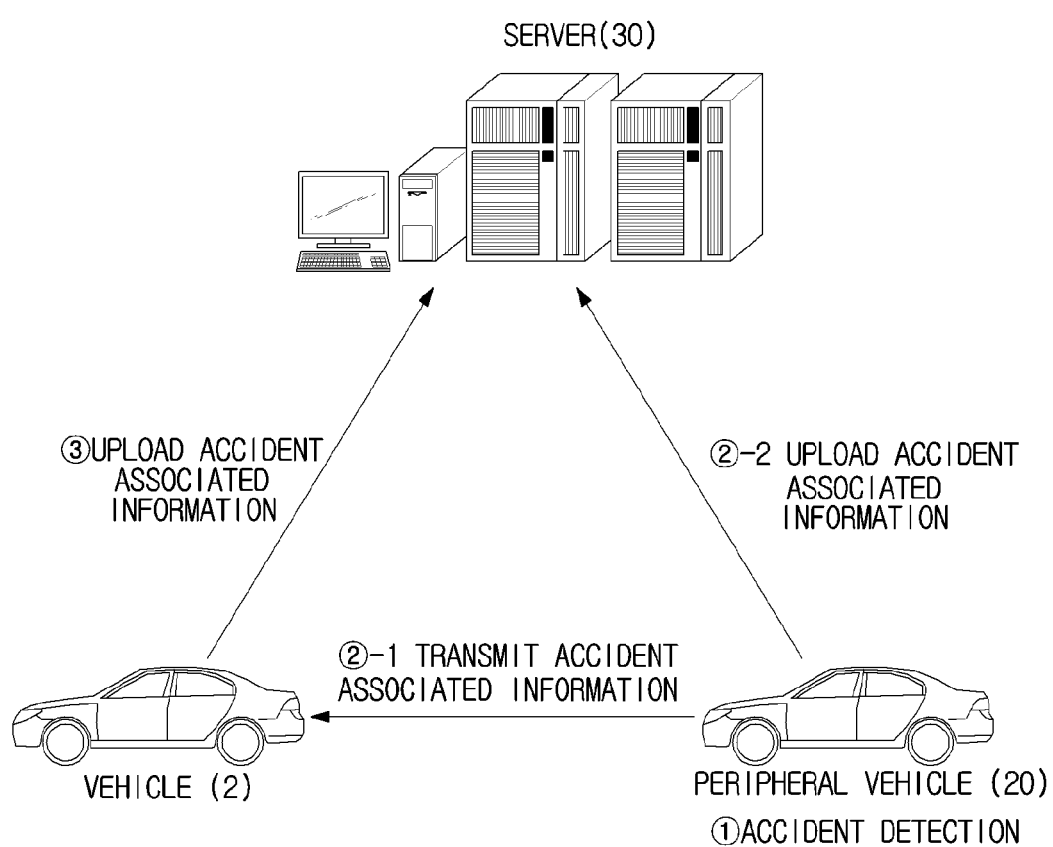
FIG. 39 is a conceptual diagram illustrating a method for allowing peripheral vehicles to detect the presence or absence of an accident in the vehicle occurs so as to determine whether to transmit accident associated information.
Figure 40:
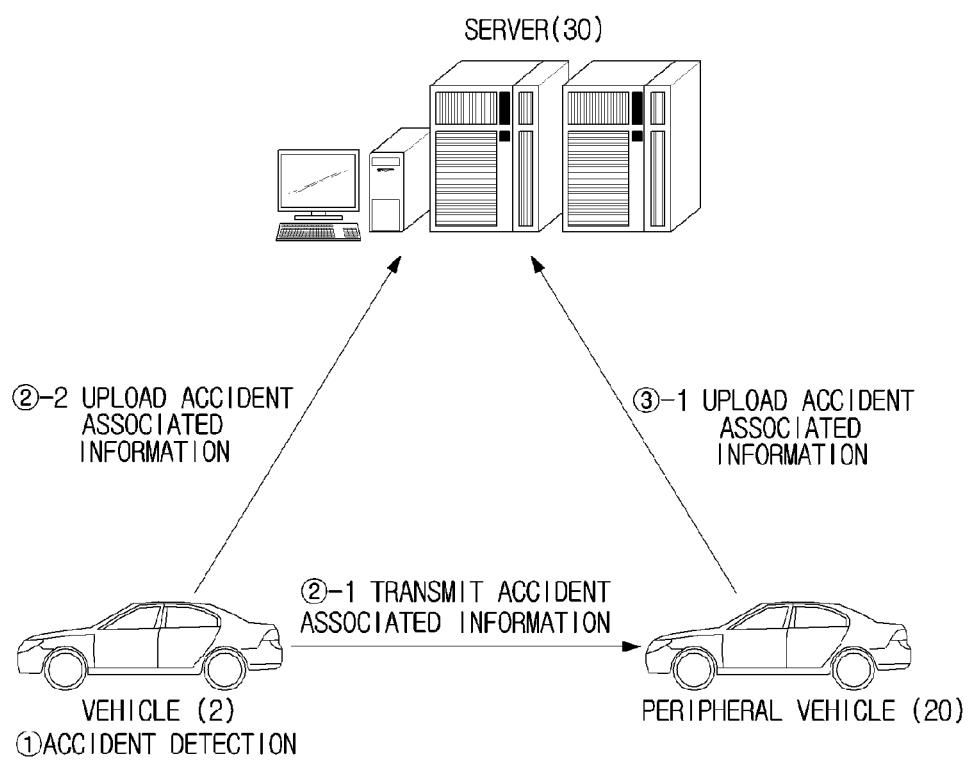
FIG. 40 is a conceptual diagram illustrating a method for allowing the vehicle to detect the presence or absence of accidents in peripheral vehicles so as to determine whether to transmit accident associated information.

FIG. 39 is a conceptual diagram illustrating a method for allowing peripheral vehicles to detect the presence or absence of an accident in the vehicle occurs so as to determine whether to transmit accident associated information. FIG. 40 is a conceptual diagram illustrating a method for allowing the vehicle to detect the presence or absence of accidents in peripheral vehicles so as to determine whether to transmit accident associated information.

Referring to FIG. 39, if the peripheral vehicle 20 detects the accident of the vehicle 2 in operation ①, the peripheral vehicle 20 may automatically transmit the accident associated information to the vehicle 2 in operation ②-1, or the peripheral vehicle 20 may upload the accident associated information of the vehicle 2 to the server 30 in operation ②-2.

The peripheral vehicle 20 may detect the presence or absence of the accident of the vehicle 2 on the basis of the detection result of the sensing unit 23. For example, assuming that the proximity sensor detects that the vehicle 2 is located in a peripheral region, and sound volume detected by the sound sensor of the sensing unit 23 is equal to or higher than a predetermined reference volume, this means that the accident of the vehicle 2 has occurred. Alternatively, the peripheral vehicle 20 analyzes the images captured by the image sensor such that it may determine the occurrence of the accident of the vehicle 2 according to the analysis result. In this case, it may be possible to determine whether the shape of the vehicle 2 is broken using the image processing algorithm. Alternatively, if the vehicle (2) speed measured by the proximity sensor or the image sensor is lower than a predetermined reference value as compared to other peripheral vehicles, this means that the accident of the vehicle 2 has occurred. Alternatively, if light (e.g., flash of light) is detected by the image sensor or the proximity sensor, light brightness or light duration, etc. is compared with a predetermined reference value, such that it may be possible to determine whether the detected light has occurred due to the accident generated in the vehicle 2.

In addition, it may also be possible for the vehicle 2 to provide accident associated information to the peripheral vehicle 20. In this case, although the peripheral vehicle 20 determines the vehicle 2 as a witness vehicle and requests accident associated information, the vehicle 2 may autonomously detect the accident generated in the peripheral vehicle 20 in operation ① as shown in FIG. 40. The operation in which the vehicle 2 detects the accident generated in the peripheral vehicle 20 and transmits the accident associated information is identical to that of the peripheral vehicle 20, and as such a detailed description thereof will herein be omitted for convenience of description.

If the vehicle 2 detects the accident generated in the peripheral vehicle 20, the vehicle 2 may search for information associated with the corresponding accident, and may transmit the accident associated information to the peripheral vehicle 20 in operation ②-1. The accident associated information associated with the accident of the peripheral vehicle may include images captured for a predetermined time before or after the accident occurrence time, from among a plurality of images stored in the storage unit 230. If the vehicle 20 uploads the received accident associated information to the server 30 in operation ③-1, the server 30 may analyze the accident on the basis of the accident associated information. Alternatively, the vehicle 2 may also directly upload the accident associated information of the peripheral vehicle 20 to the server 30 in operation ②-2 as necessary. When the accident associated information is transmitted to the peripheral vehicle 20 or when the accident associated information of the peripheral vehicle 20 is uploaded to the server 30, it may also be possible to upload the accident occurrence information of the peripheral vehicle 20 detected by the vehicle 2 as necessary.

The above-mentioned description has exemplarily disclosed various embodiments in which information associated with the vehicle accident is collected from a plurality of peripheral vehicles for convenience of description and better understanding of the present disclosure. The embodiment in which the collected accident associated information is used to analyze the accident will hereinafter be described with reference to the attached drawings.

Figure 41:
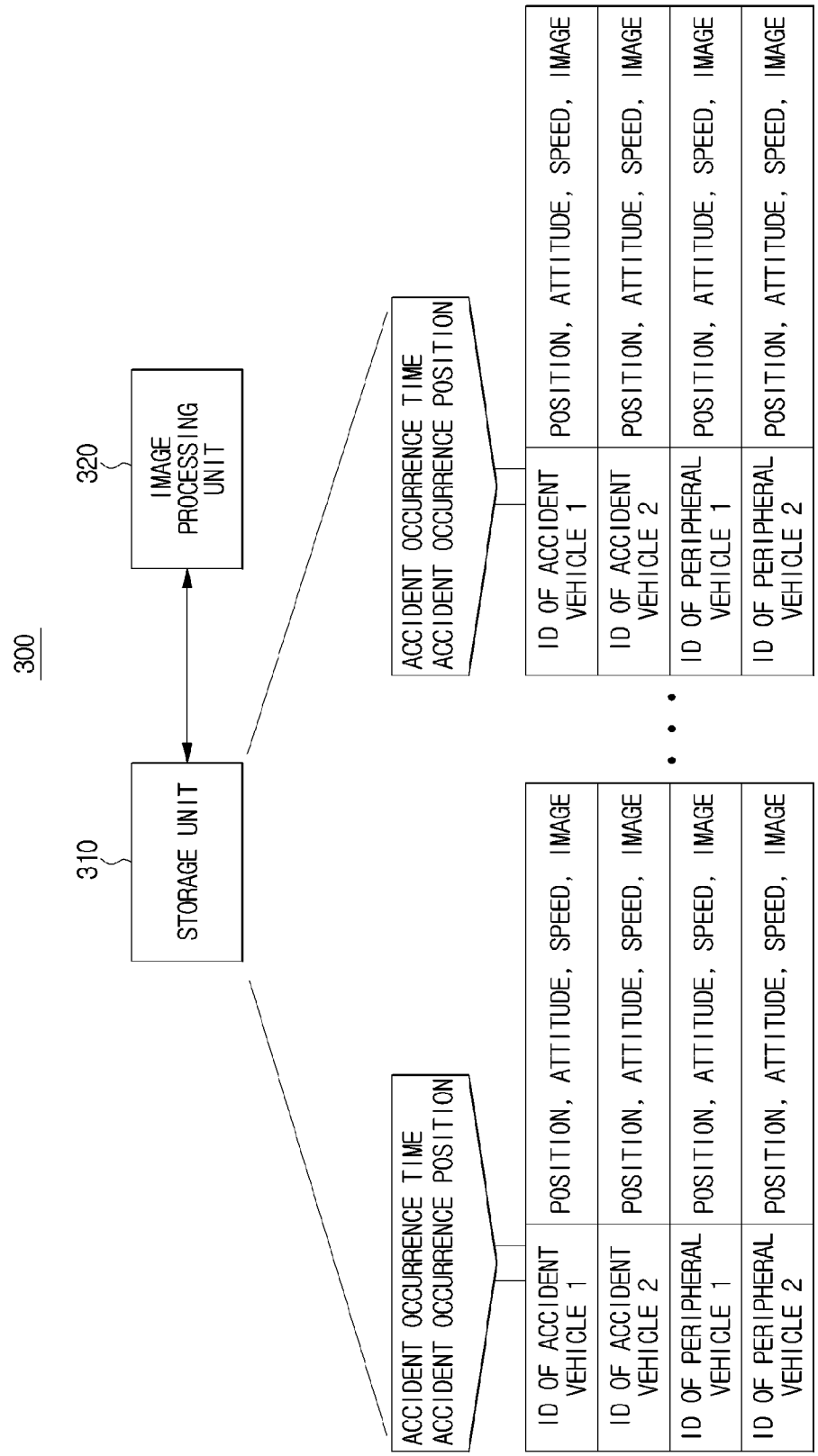
FIG. 41 is a block diagram illustrating an accident analysis device according to an embodiment of the present disclosure.

FIG. 41 is a block diagram illustrating an accident analysis device according to an embodiment of the present disclosure.

Referring to FIG. 41, the accident analysis device 300 may include a storage unit 310 configured to store accident associated information; and an image processing unit 320 configured to generate an accident reenactment image using the accident associated information.

Information associated with the accident of the vehicle may be stored in the storage unit 310. For example, the accident occurrence information including the accident occurrence time and the accident occurrence position is used as a tag, the vehicle state information (such as the position, attitude, and speed of the vehicle) and the accident associated information including the accident associated images directly captured by the image sensor of the vehicle may be stored as the accident vehicle information. In addition, the vehicle state information (such as the position, attitude, and speed of the peripheral vehicle 20) and the accident associated information including accident associated images captured by the black box (i.e., the image sensor) of the peripheral vehicle 20 may be stored as the peripheral vehicle information.

Meanwhile, although the accident associated information, vehicle state information, etc. stored in the storage unit 310 may be collected from the accident information management apparatuses (100, 200) or the vehicles (1, 2) including the accident information management apparatuses (100, 200), the scope or spirit of the accident information analysis device 300 is not limited thereto, and the scope of a storage path of the information stored in the storage unit 310 is not limited thereto.

The image processing unit 320 may process the accident associated image stored in the storage unit 310, such that it can generate an accident reenactment image capable of reenacting the situation of the accident occurrence. A detailed description thereof will hereinafter be given with reference to FIGS. 42 and 43.

Figure 42:
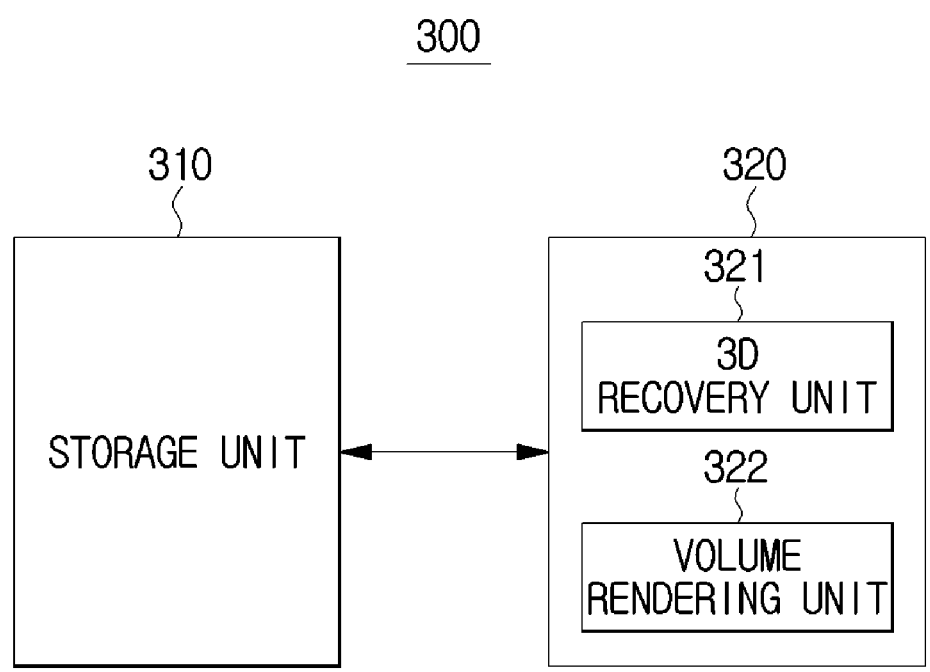
FIG. 42 is a block diagram illustrating an image processing unit.
Figure 43:
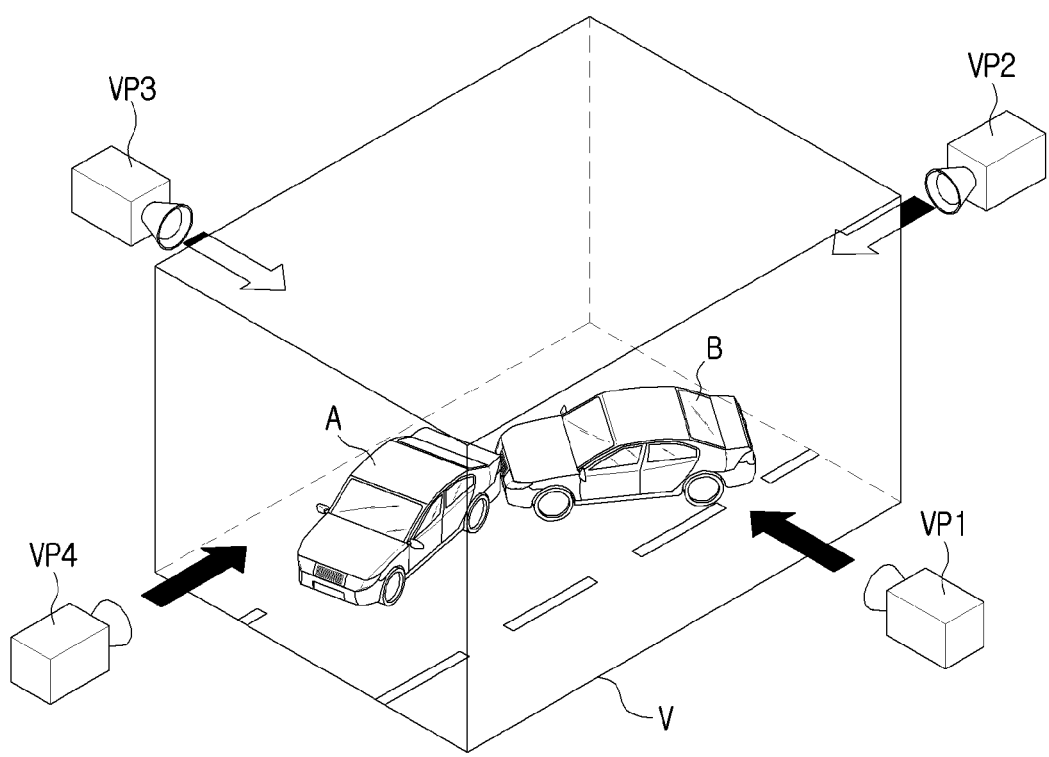
FIG. 43 is a conceptual diagram illustrating a three-dimensional (3D) volume generated by the image processing unit.

FIG. 42 is a block diagram illustrating an image processing unit. FIG. 43 is a conceptual diagram illustrating a three-dimensional (3D) volume generated by the image processing unit.

Referring to FIG. 42, the image processing unit 320 may include a 3D reconstruction unit 321 configured to reconstruct 3D volume using the accident associated images collected from the accident vehicle and the peripheral vehicle; and a volume rendering unit 322 configured to render the 3D volume so as to visualize the rendered 3D volume on a two-dimensional (2D) display. The 3D volume may be composed of voxel data including 3D space information of the accident scene.

If there are 2D images obtained when the same accident scene is captured from different viewpoints, the 3D reconstruction unit 321 may extract the common characteristic points from the plural 2D images so that it can reconstruct the 3D volume. If the moving images are stored in the storage unit 310, it may be possible to reconstruct the 3D volume using frame images corresponding to the same time point from among the plurality of moving images captured from different viewpoints.

For example, after the characteristic points are extracted from two or more images and the extracted characteristic points are matched with each other, trigonometry capable of extracting the depth to the characteristic points using calibration information of the image sensor may be applied to the present disclosure. In this case, the correlation between the characteristic points extracted from plural images may be obtained using the matching algorithm.

Alternatively, after a projection matrix of the image sensor is obtained using plural characteristic points tracked from among a plurality of consecutive characteristic points, it may also be possible to reconstruct the 3D volume using self-calibration and hierarchical block matching.

Alternatively, voxels not contained in the foreground are sequentially removed from the outline information obtained from plural images, such that the shape of the object can be reconstructed. In addition, the above reconstruction scheme is extended, so that it may be possible to use the voxel-coloring or space-carving scheme in which image reconstruction is achieved using image coincidence obtained when respective voxels of the 3D voxel model are projected onto a reference image.

However, the above-mentioned 3D reconstruction schemes are merely examples applicable to the embodiments of the accident analysis device 300, and various schemes other than the above-mentioned schemes are applicable to reconstruction of 3D volume of the accident scene.

If the 3D volume (V) of the accident scene is reconstructed, the volume rendering unit 322 may render the reconstructed 3D volume (V) so that the rendering result can be visualized as a 2D image. The volume rendering scheme for visualizing 3D volume data as the 2D image may be broadly classified into the surface rendering scheme and the direct rendering scheme. The surface rendering scheme may estimate surface information on the basis of not only a user-established scalar value based on volume data but also the spatial change amount. The surface rendering scheme may convert the surface information into geometric elements such as polygons, curved patches, or the like, and then perform visualization. A representative surface rendering scheme may be a marching-cubes algorithm.

The direct rendering scheme may directly visualize the volume data without performing an intermediate step for changing the surface into geometric elements. The direct rendering scheme may be classified into the image-order algorithm and the object-order algorithm according to the search scheme of volume data.

The object-order algorithm searches for the volume data according to the storage order, and combines each voxel with the pixel corresponding to the voxel. A representative example of the object-order algorithm is the splatting scheme.

The image-order algorithm may determine each pixel value according to the order of scan lines of the image, and may sequentially determine the pixel value corresponding to volume data according to light starting from each pixel. Representative examples of the image-order algorithm include ray casting and ray tracing.

Ray casting may calculate the color and opacity values at each sample point located at a light ray through irradiation of the light ray from respective pixels constructing an image plane, and may determine the value of the corresponding pixel by combination of the calculated resultant values. The method for irradiating the light ray (i.e., projection schemes) may be classified into parallel projection and perspective projection.

Ray tracing is used to trace a path of the light ray seen by the viewer's eyes. Differently from ray casting in which the light ray searches for only an intersection point at which the light ray meets a volume of the target object, phenomena such as reflection and refraction of the light ray can be reflected by tracking the path of the irradiated light ray.

Ray tracing can be classified into forward ray tracing and reverse ray tracing. In accordance with forward ray tracing, a light ray emitted from a virtual light source reaches a target object so that reflection, scattering, and transmission of the light ray are modeled so as to search for a specific light ray seen by the viewer's eyes. Reverse ray tracing is used to reversely trace the path of a light ray seen by the viewer's eyes.

However, the above-mentioned volume rendering schemes are merely examples, the scope or spirit of the present disclosure is not limited thereto, and it is not always necessary for the volume rendering unit 322 to apply the above-mentioned schemes to volume rendering.

Meanwhile, the rendering viewpoint may be predetermined to be a default value, or may be optionally selected by the user. Alternatively, the rendering time may be determined by the volume rendering unit 322 alone. When the volume rendering unit 322 selects the rendering viewpoint, the accident scene may be considered. For example, a specific viewpoint at which the collision part of the accident vehicle is most visible can be selected.

Referring to FIG. 43, the 3D volume (V) in which the space including both the accident vehicle 1 (A) and the accident vehicle 2 (B) is reconstructed is rendered. As a result, the 2D image, viewed from or captured at the viewpoint 1 ($VP_1$), may be formed, the 2D image, viewed from or captured at the viewpoint 2 ($VP_2$), may be formed, the 2D image, viewed from or captured at the viewpoint 3 ($VP_3$), may be formed, or the 2D image, viewed from or captured at the viewpoint 4 ($VP_4$), may be formed. However, the above viewpoints shown in FIG. 43 are merely examples, the scope or spirit of the present disclosure is not limited to the exemplary viewpoints shown in FIG. 43, and other 2D images, viewed from or captured at a predetermined viewpoint or a user-selected viewpoint, can also be generated.

The display unit to be described later may display a 2D accident reenactment image generated by rendering the reconstructed 3D volume at an arbitrary viewpoint, or may display the 2D accident reenactment image generated by execution of the rendering at different viewpoints according to the 3D output format, resulting in formation of a 3D image. Alternatively, the image processing unit 320 may further include an image synthesis unit, and the image synthesis unit may synthesize a plurality of 2D accident reenactment images so that the 3D image can be formed.

As described above, if the 3D volume of the accident scene is generated and rendered at a desired viewpoint, the situation of the accident occurrence can be more correctly recognized and analyzed.

Figure 44:
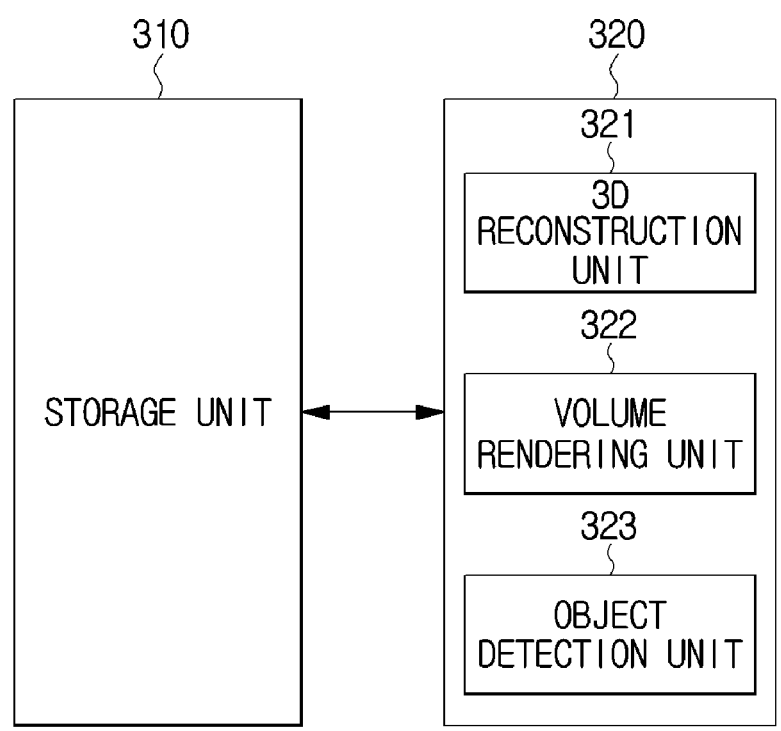
FIG. 44 is a block diagram illustrating an accident analysis device further including an object detection unit.
Figure 45:
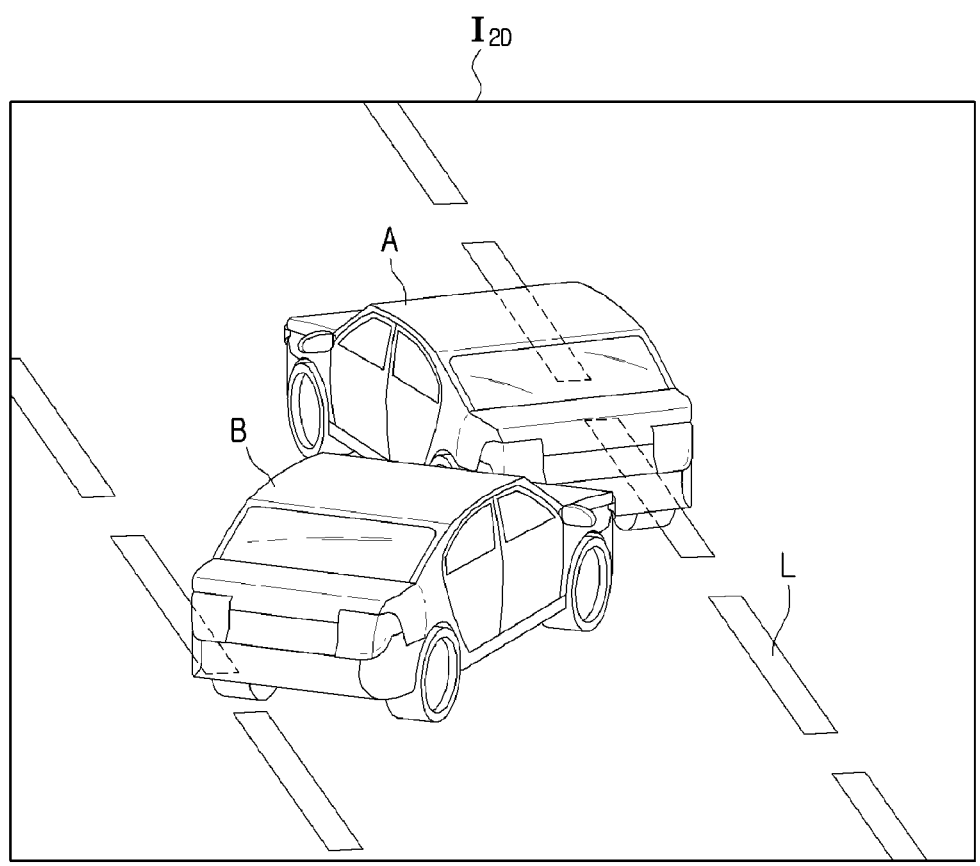
FIG. 45 exemplarily illustrates a screen image in which detected object information is displayed on an accident reenactment image.

FIG. 44 is a block diagram illustrating an accident analysis device further including an object detection unit. FIG. 45 exemplarily illustrates a screen image in which detected object information is displayed on an accident reenactment image.

Referring to FIG. 44, the image processing unit 320 of the accident analysis device 300 may further include an object detection unit 323 configured to detect a specific object using the accident associated information. In this case, the accident associated information may include the moving images captured by the accident vehicle and the peripheral vehicle before or after the accident occurrence time. Alternatively, the object detection unit 323 may detect a specific object using map data stored in the storage unit 310. Alternatively, it may also be possible to detect a specific object on the basis of the 3D volume reconstructed by the 3D reconstruction unit 321.

The object detection unit 323 may detect a hidden object covered by the accident vehicles (A, B) or other objects. For example, assuming that all or some of a traffic lane (L) are covered by the accident vehicles (A, B) so that the traffic lane (L) is hidden, the object detection unit 323 may detect the hidden lane (L).

To this end, images captured or formed at different times or at different viewpoints may be analyzed so that the traffic lane hidden by the accident vehicles (A, B) can be detected according to the analysis result. Map data stored in the storage unit 310 is mapped to the accident occurrence information so that the hidden traffic lane can also be detected.

For example, whereas the traffic lane is hidden or covered by the accident vehicles (A, B) at an accident occurrence time, the traffic lane may not be hidden or covered by the accident vehicles (A, B) before or after the accident occurrence time. Accordingly, assuming that the images captured by the accident vehicle or the peripheral vehicle before or after the accident occurrence time are analyzed, the presence and position of the traffic lane can be determined.

Alternatively, although the traffic lane is hidden or covered by the accident vehicles (A, B), the 3D volume related to the accident scene may include 3D spatial information, and voxel data constructing the 3D volume may include information related to the hidden traffic lane. Therefore, the 3D volume is analyzed so that the presence and position of the traffic lane can be determined.

Alternatively, traffic lane information may be contained in the map data stored in the storage unit 310. Therefore, if the accident occurrence position is searched for in the stored map data, the presence and position of the traffic lane in the accident scene can be determined.

If the object detection unit 323 detects a specific object, the detected specific object may be displayed on the accident reenactment image. For example, if the detected object is a traffic lane, the traffic lane (L) partially hidden by the accident reenactment image may be denoted by dotted lines as shown in FIG. 45. It is assumed that the accident reenactment image of FIG. 45 is the 2D image ($I_{2D}$) obtained when the 3D volume is rendered at one arbitrary viewpoint.

As described above, assuming that the object hidden or covered by another object is detected and the accident reenactment image is represented, this resultant image may be helpful to decide either the accident cause or the fault ratio between the accident vehicles.

Figure 46:
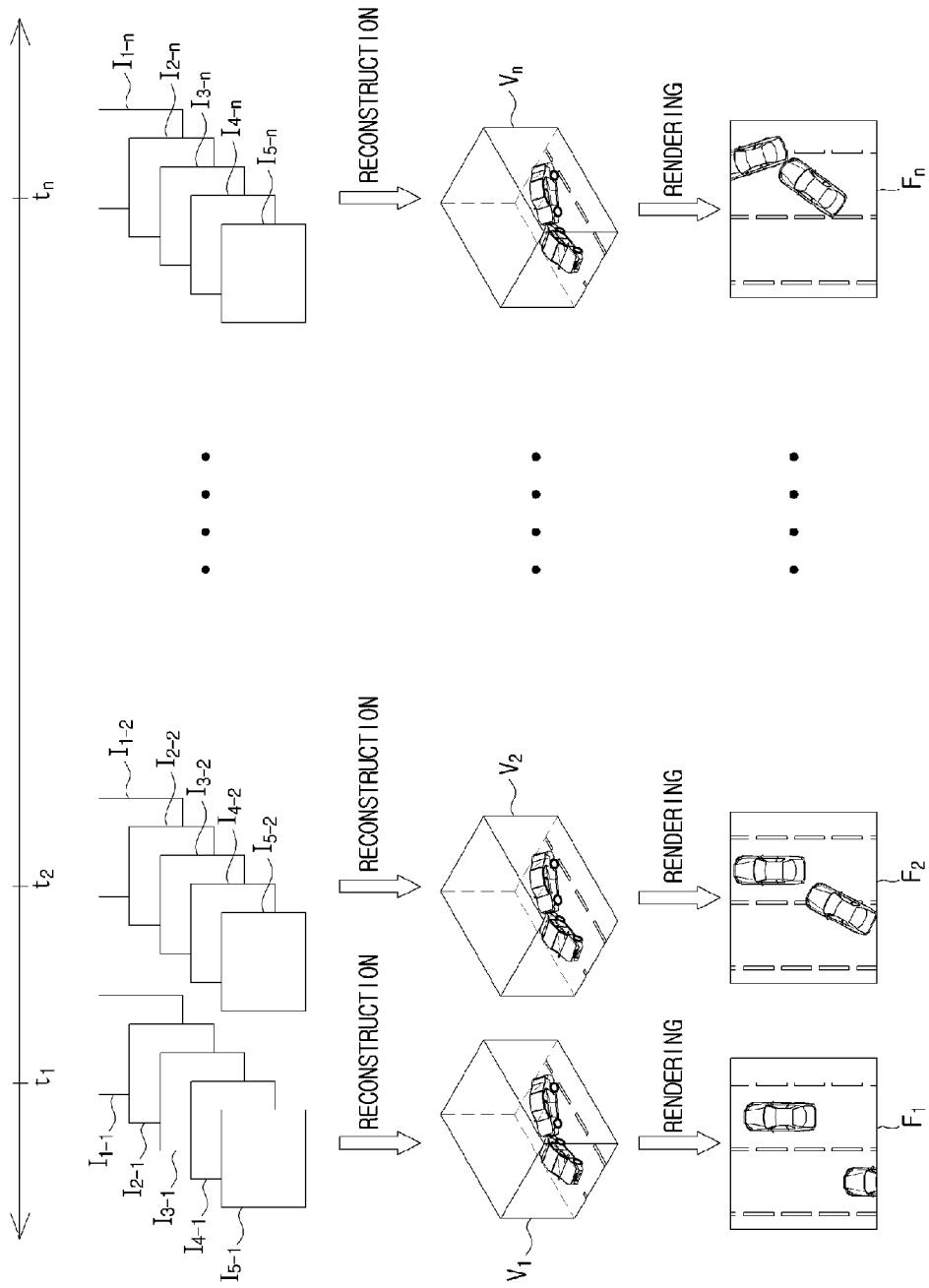
FIG. 46 exemplarily illustrates a method for reconstructing a 3D volume over time.
Figure 47:
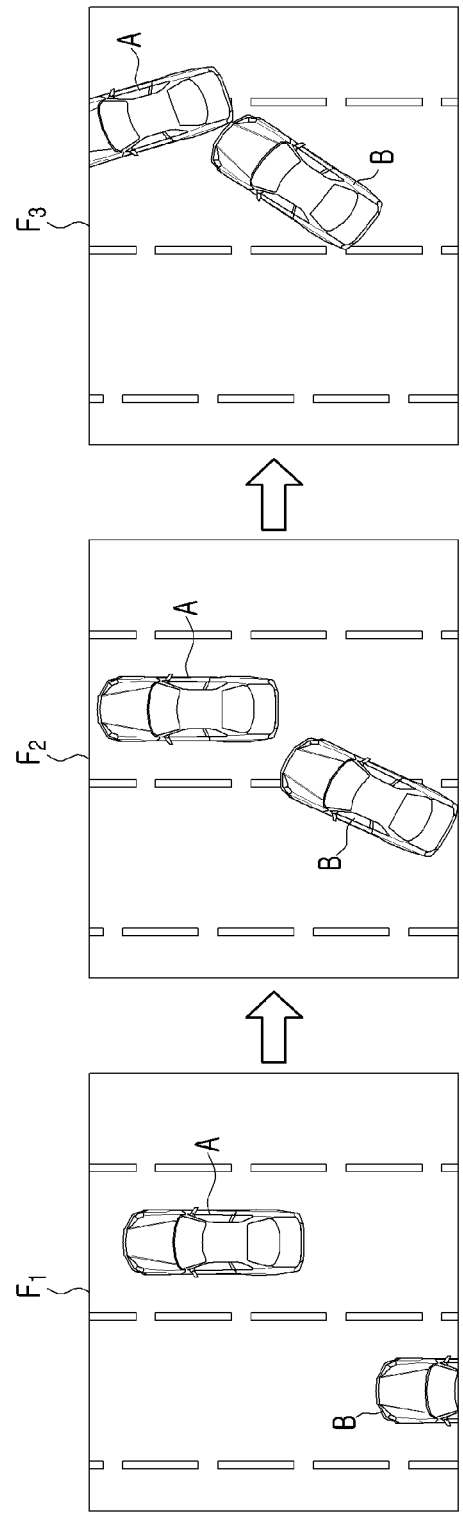
FIG. 47 exemplarily illustrates a method for displaying an accident reenactment image in the form of moving images.

FIG. 46 exemplarily illustrates a method for reconstructing a 3D volume over time. FIG. 47 exemplarily illustrates a method for displaying an accident reenactment image in the form of moving images.

As described above, the accident reenactment image may be displayed as the 2D or 3D image at one arbitrary viewpoint. Alternatively, the accident reenactment image may also be displayed as the moving images.

The accident associated information stored in the storage unit 310 may be images having been captured during a predetermined time from a previous time of the accident occurrence time to the accident occurrence time, or may be images having been captured during a predetermined time from a previous time of the accident occurrence time to the next time of the accident occurrence time. In addition, the captured images may be moving images. The 3D reconstruction unit 321 may reconstruct the 3D volume using a plurality of frame images captured from different viewpoints at the same time. If the 3D volume is repeatedly reconstructed according to the passage of time from the previous time of the accident occurrence time to the accident occurrence time, variation of the 3D volume can be obtained according to the passage of time.

Referring to FIG. 46, Volume 1 ($V_1$) may be reconstructed using a plurality of frame images ($I_{1-1}, I_{2-1}, I_{3-1}, I_{4-1}, I_{5-1}$) corresponding to an arbitrary time ($t_1$) before the accident occurrence time, and Volume 2 ($V_2$) may be reconstructed using a plurality of frame images ($I_{1-2}, I_{2-2}, I_{3-2}, I_{4-2}, I_{5-2}$) corresponding to an arbitrary time ($t_2$). A plurality of frame images corresponding to the same time may be captured from different viewpoints, and may be captured by the accident vehicles and the peripheral vehicles. In this way, a plurality of volumes up to Volume n (Vn) can also be reconstructed using a plurality of frame images ($I_{1-n}, I_{2-n}, I_{3-n}, I_{4-n}, I_{5-n}$) corresponding to the accident occurrence time ($t_n$).

If an arbitrary viewpoint at which volumes (Volumes 1 to n) are to be rendered is selected, and the volumes (Volumes 1 to n) are rendered at the selected viewpoint, 2D accident reenactment images ($F_1, F_2, \ldots F_n$) acting as frame images can be obtained. In addition, assuming that 2D accident reenactment images ($F_1, F_2, \ldots F_n$) are displayed on the display unit configured to display the accident reenactment images thereon according to the passage of time, the accident reenactment images may be displayed as the moving images as shown in FIG. 47. Alternatively, assuming that the display device supports the 3D image, the accident reenactment images can also be displayed as the 3D moving images without departing from the scope or spirit of the present disclosure.

Referring to FIGS. 46 and 47, assuming that the accident reenactment images are displayed as the moving images, a user who views the moving images can easily recognize the accident associated images captured during a predetermined time ranging from the previous time of the accident occurrence time to the accident occurrence time, such that the user can more correctly determine the accident cause and the fault ratio.

Figure 48:
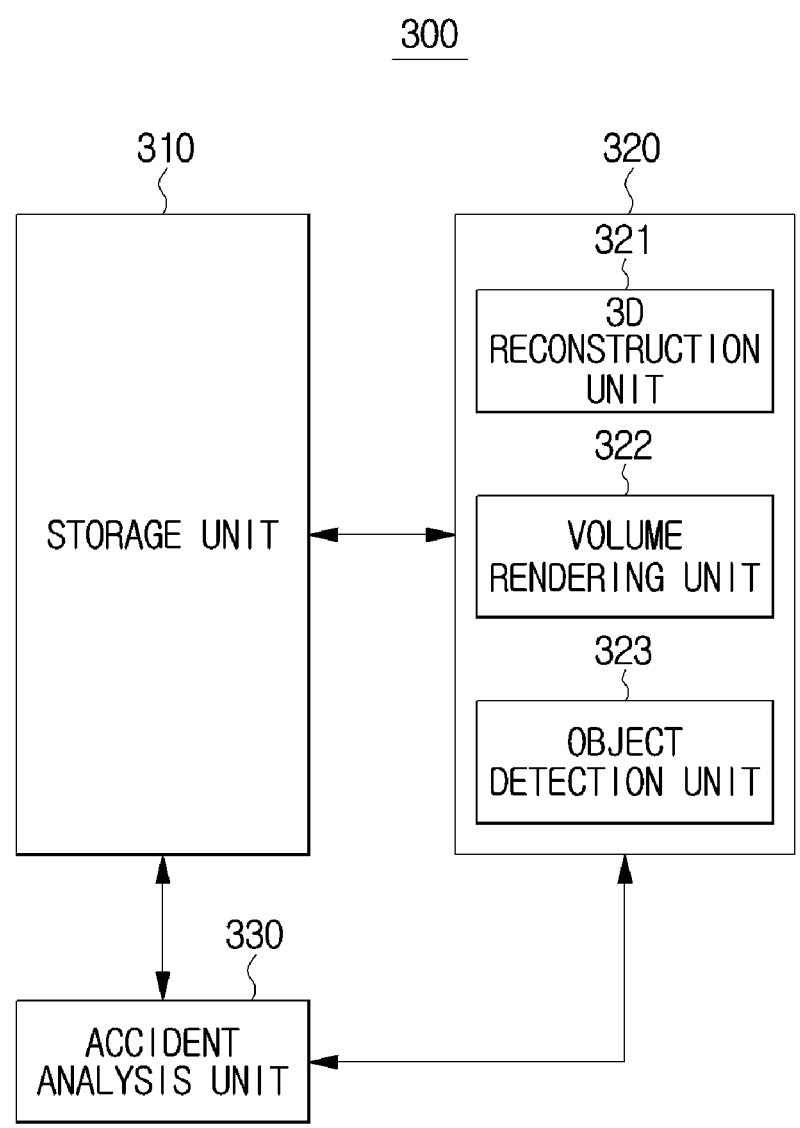
FIG. 48 is a block diagram illustrating an accident analysis device further including an accident analysis unit.
Figure 49:
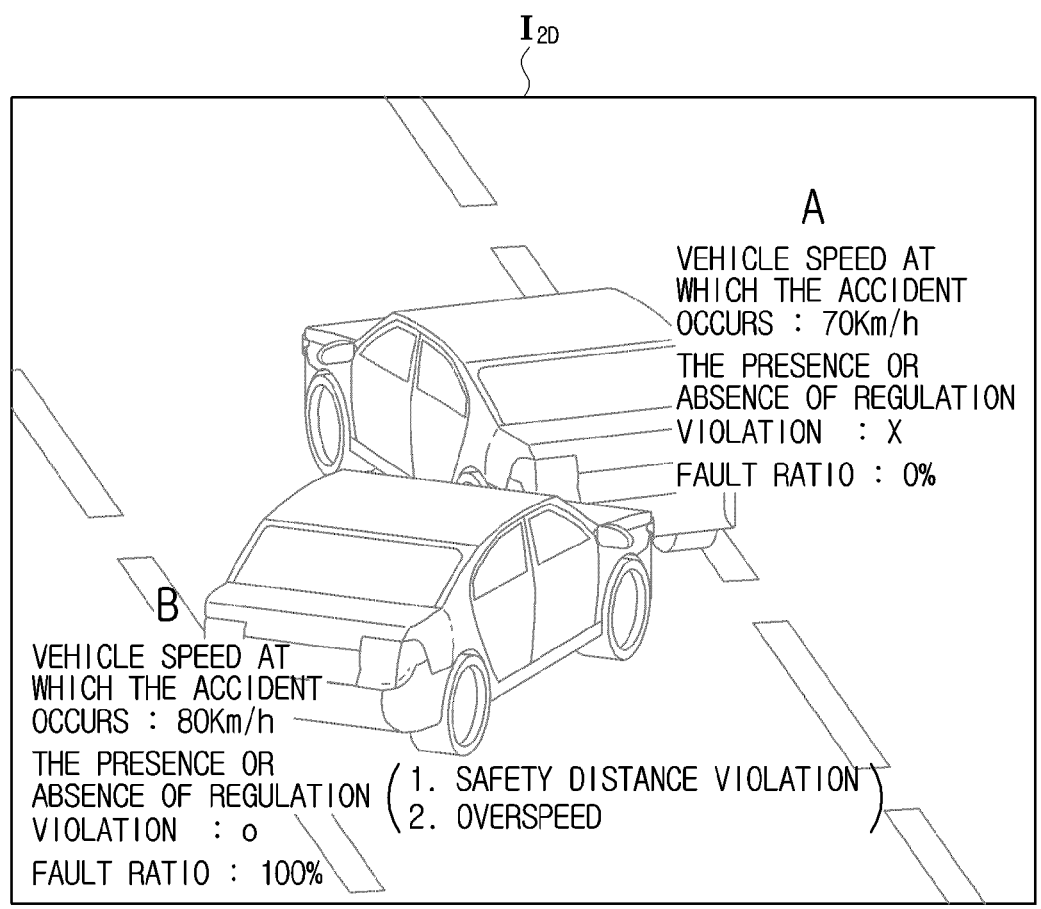
FIG. 49 exemplarily illustrates a screen image in which the accident analysis result is displayed along with the accident reenactment image.

FIG. 48 is a block diagram illustrating an accident analysis device further including an accident analysis unit. FIG. 49 exemplarily illustrates a screen image in which the accident analysis result is displayed along with the accident reenactment image.

Referring to FIG. 48, the accident analysis device 300 may further include an accident analysis unit 330. The accident analysis unit 330 may analyze the accident associated information and the vehicle state information stored in the storage unit 310, and may analyze the accident reenactment images generated by the image processing unit 320, such that the accident analysis unit 330 can determine the accident cause, the fault ratio, etc.

For example, the accident analysis unit 330 may determine the presence or absence of regulation violation on the basis of vehicle speed (at which the accident occurs) of the accident vehicles, the distance between the accident vehicles, and the positional relationship with respect to the traffic lane, etc. In addition, the accident analysis unit 330 may determine the fault ratio on the basis of the relative position between the accident vehicles, the attitudes of the accident vehicles, and the fact indicating the presence or absence of regulation violation. Decision of the fault ratio may be achieved by a predetermined reference.

Referring to FIG. 49, the accident analysis result may also be contained in the accident reenactment image ($I_{2D}$). For example, it is assumed that the speed limit of a road on which the accident has occurred is 70 km/h, and it is also assumed that the accident vehicle 2 (B) is the rear vehicle. Assuming that the vehicle speed (at which the accident occurs) of the accident vehicle 1 (A) is 70 km/h and there is no regulation violation in the accident vehicle 1 (A), when the vehicle speed (at which the accident occurs) of the accident vehicle 2 (B) is 80 km/h and the accident vehicle 2 (B) is a speeding vehicle such that the safe distance between the accident vehicle 2 (B) and the front vehicle is not maintained, it can be determined that the fault ratio of the accident vehicle 2 (B) may be determined to be 100% and the fault ratio of the accident vehicle 1 (A) may be determined to be 0%. In addition, information regarding the analysis result is contained in the accident reenactment image ($I_{2D}$), such that the user can easily recognize the analysis result of the accident cause, the fault ratio, etc.

Although FIG. 49 has exemplarily disclosed that information regarding the accident analysis result is contained in the 2D accident reenactment image for convenience of description, it should be noted that information regarding the accident analysis result is contained in the 3D accident reenactment image without departing from the scope or spirit of the present disclosure.

Figure 50:
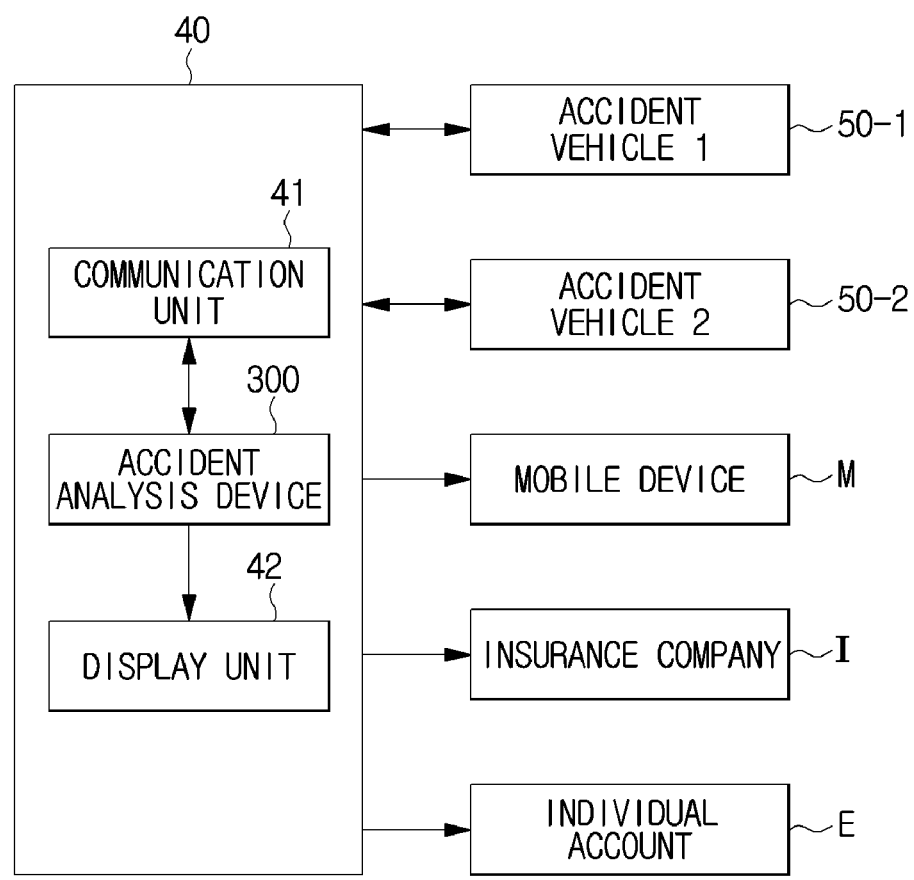
FIG. 50 is a block diagram illustrating a server further including an accident analysis device.

FIG. 50 is a block diagram illustrating a server further including an accident analysis device.

Referring to FIG. 50, the server 40 may include the accident analysis device 300 according to the embodiment. As previously described in the embodiment of the vehicles (1, 2) and the accident information management apparatuses (100, 200), the server 40 may also be implemented as the other server 30 configured to collect accident associated information from the vehicles (1, 2) or the peripheral vehicle 20, the accident occurrence information, the vehicle state information, etc. However, assuming that the accident analysis device 300 contained in the server 40 can store the accident associated information, the accident occurrence information, the vehicle state information, etc., the storage path is not limited.

The server 40 may further include the communication unit 41. The server 40 may transmit the accident analysis result to the accident vehicles (50-1, 50-2), the insurance company (I), the individual account (E), and the mobile device (M) through the communication unit 41. The accident analysis result may include not only the accident reenactment image but also all the accident associated information having been analyzed and decided by the accident analysis device 300.

The insurance company (I), the individual account (E), and the mobile device (M) for each accident vehicle (50-1 or 50-2) may be stored in the storage unit 310. For example, when the accident vehicles (50-1, 50-1) upload the accident occurrence information to the server 40, information regarding the joined or contracted insurance company (I), the individual account (E) such as an email address of a vehicle driver, and information regarding the mobile device (M) such as a mobile phone of the vehicle driver may be simultaneously uploaded to the server 40. Alternatively, the above-mentioned information for each vehicle may be pre-stored in the server 40 in such a manner that the above-mentioned information can be updated and managed while being classified according to respective vehicles.

In addition, the server 40 may further include the display unit 42 such that the analysis result of the accident analysis device 300 can be displayed on the display unit 42. If the display unit 42 supports 2D image display, i.e., if the output format of the display unit 420 is the 2D image, the 2D accident reenactment image may be displayed. If the display unit 42 supports 3D image display, the 3D accident reenactment image may be displayed.

In addition, if the display unit 42 supports 3D image display, and if the output format of the display unit 42 corresponds to the stereoscopic scheme, the display unit 42 may display the accident reenactment image rendered at the left-eye viewpoint of a viewer user and the other accident reenactment image rendered at the right-eye viewpoint of the viewer user. If the viewer user who wears special glasses views the display unit 42, the user can view the accident reenactment image displayed as the 3D image.

Alternatively, assuming that the output format of the display unit 42 corresponds to the autostereoscopic scheme, a multi-view stereoscopic image formed by combining the accident reenactment images rendered at different viewpoints can be displayed on the display unit 42. In this case, although the viewer user does not wear the special glasses, the user can view the accident reenactment images in the form of the 3D images.

Figure 51:
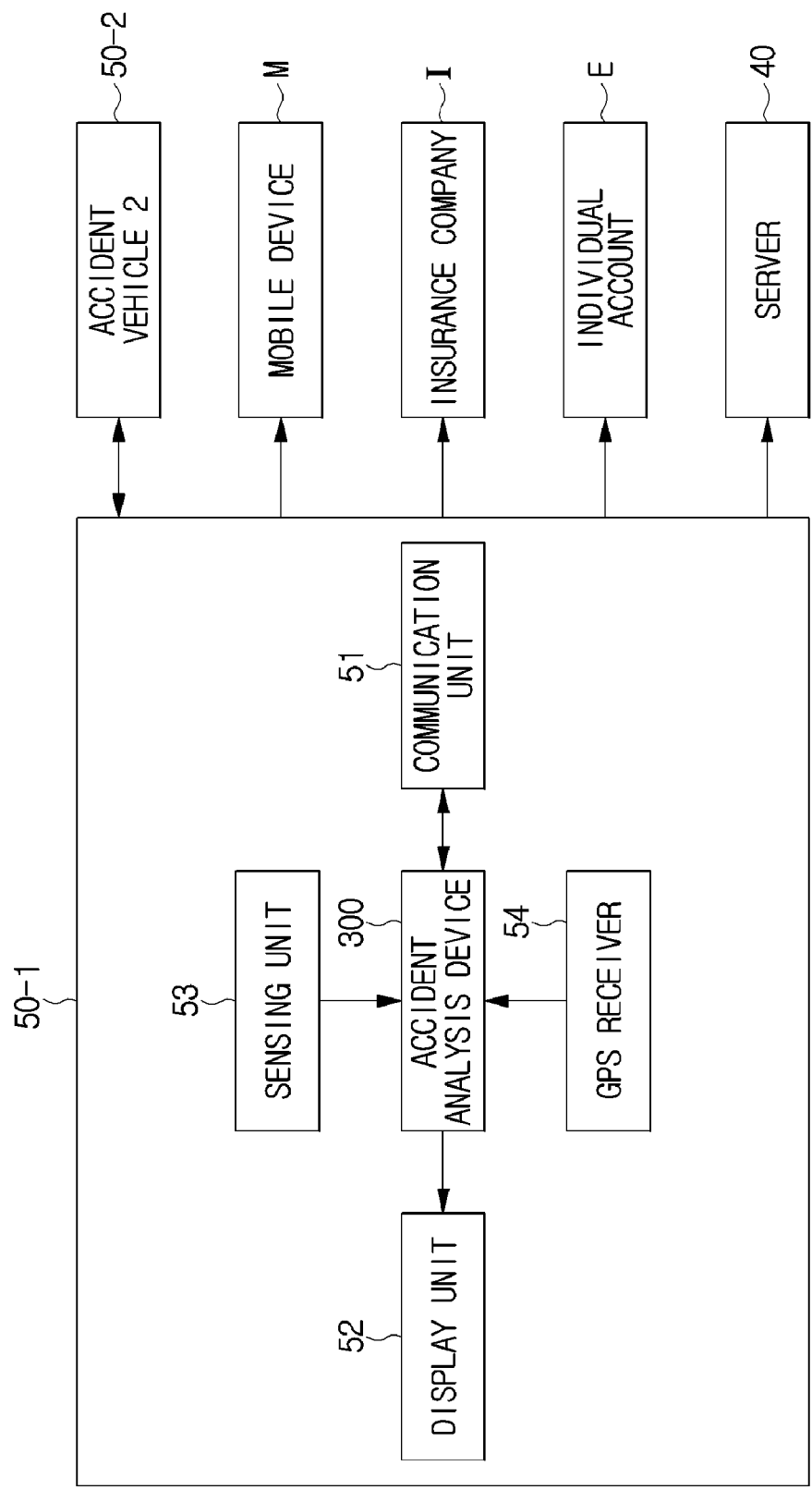
FIG. 51 is a block diagram illustrating a vehicle including the accident analysis device.

FIG. 51 is a block diagram illustrating a vehicle including the accident analysis device.

Referring to FIG. 51, the vehicle 50-1 may include the accident analysis device 300 according to the above-mentioned embodiment. The vehicle 50-1 is implemented as each vehicle (1 or 2) according to the above-mentioned embodiment, such that the vehicle 50-1 may request accident associated information from the peripheral vehicle 20 when the accident occurs. However, the scope or spirit of the vehicle 50-1 is not limited thereto.

Assuming that the vehicle 50-1 is set to the accident vehicle 1, the vehicle 50-1 may receive the accident associated information and the vehicle state information from the peripheral vehicle 20 and the accident vehicle 2 (50-2)

through the communication unit 51. In addition, the vehicle 50-1 may detect its own state information using the sensing unit 52, and may acquire its own position information through the GPS receiver 53.

Alternatively, the accident associated information and the vehicle state information of the accident vehicle 2 (50-2) and the peripheral vehicle 20 may also be received from the server 40 as necessary.

The accident analysis result may be transmitted to the accident vehicle 2 (50-2), the insurance company (I), the individual account (E), and the mobile device (M) through the communication unit 51. To this end, information regarding the insurance company (I), the individual account (E), and the mobile device (M) for each accident vehicle (50-1 or 50-2) may be stored in the storage unit 310.

In addition, a display unit 52 is further mounted to the vehicle (50-1), such that the accident analysis result of the accident analysis device 300 may be displayed on the display unit 52. For example, the display unit 52 may be an AVN display. If the display unit 52 supports 2D image display, i.e., if the output format of the display unit 52 is the 2D image, the 2D accident reenactment image may be displayed on the display unit 52. If the display unit 52 supports 3D image display, the 3D accident reenactment image may be displayed on the display unit 52.

Figure 52:
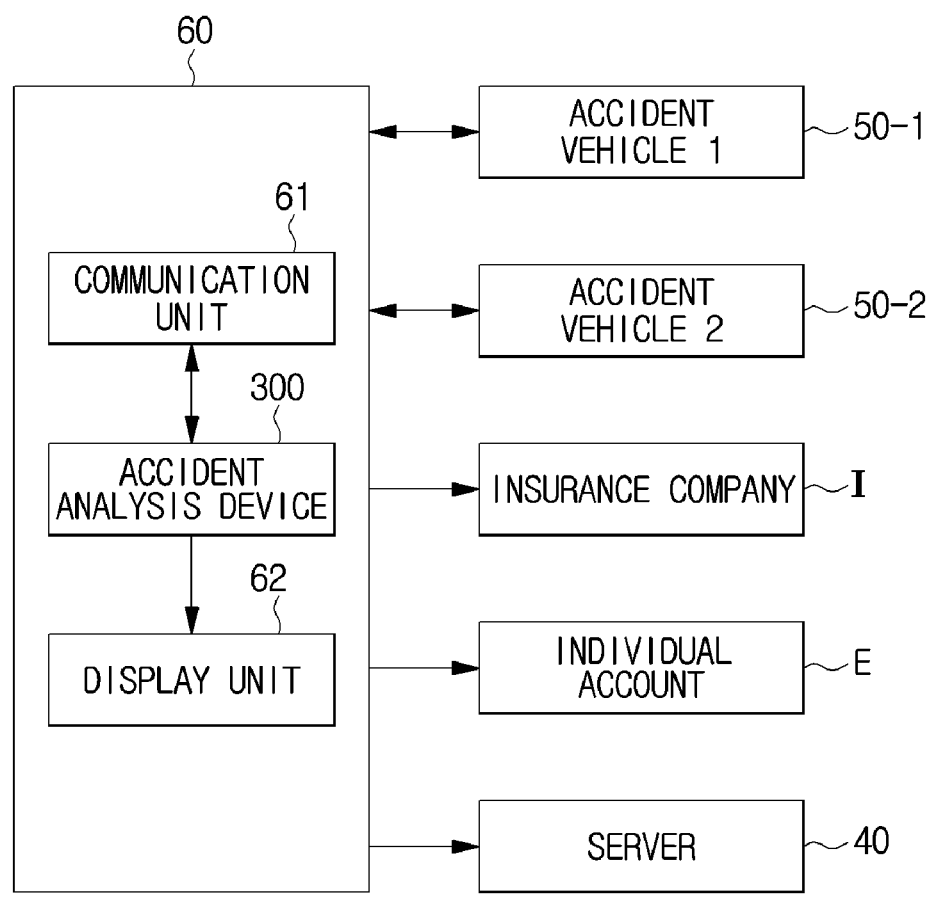
FIG. 52 is a block diagram illustrating a mobile device including an accident analysis device.

FIG. 52 is a block diagram illustrating a mobile device including an accident analysis device.

Referring to FIG. 52, the mobile device 60 may include the accident analysis device 300 according to the above-mentioned embodiment. The mobile device 60 may further include the communication unit 61. The accident associated information and the vehicle state information may be received from the accident vehicles (50-1, 50-2), the peripheral vehicle 20, or the server 40 through the communication unit 61. In addition, the accident analysis result may be transmitted to the accident vehicles (50-1, 50-2), the insurance company (I), the individual account (E), and the server (40) through the communication unit 61. To this end, information regarding the insurance company (I), the individual account (E), and the mobile device (E) for each accident vehicle (50-1 or 50-2) may be stored in the storage unit 310.

In addition, a display unit 62 is further mounted to the mobile device (M), such that the accident analysis result of the accident analysis device 300 may be displayed on the display unit 62. If the display unit 62 supports 2D image display, i.e., if the output format of the display unit 62 is the 2D image, the 2D accident reenactment image may be displayed on the display unit 62. If the display unit 62 supports 3D image display, the 3D accident reenactment image may be displayed on the display unit 62.

Figure 53:
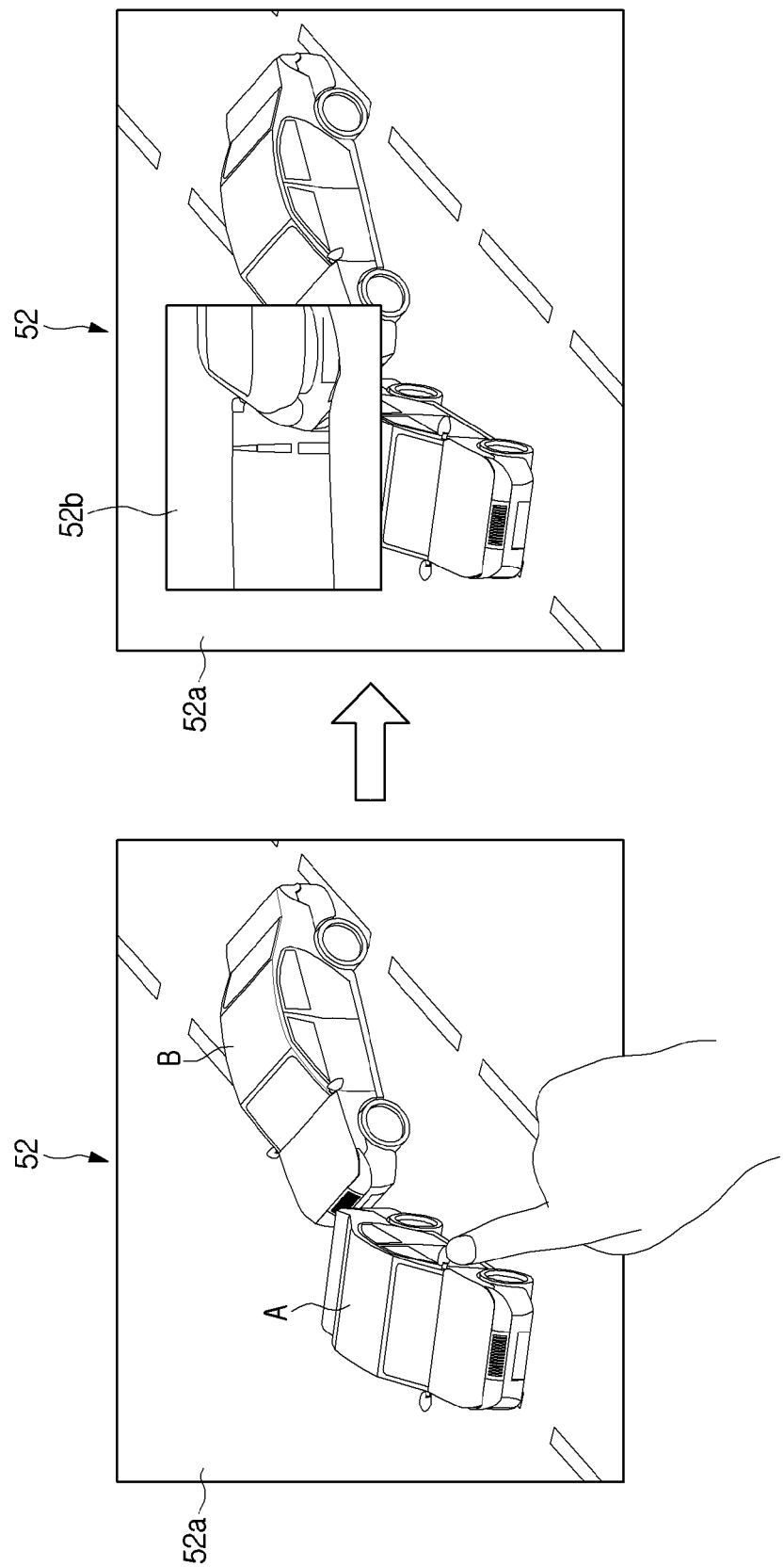
FIGS. 53 and 54 are conceptual diagrams illustrating exemplary methods for displaying the analysis result of the accident analysis device.
Figure 54:
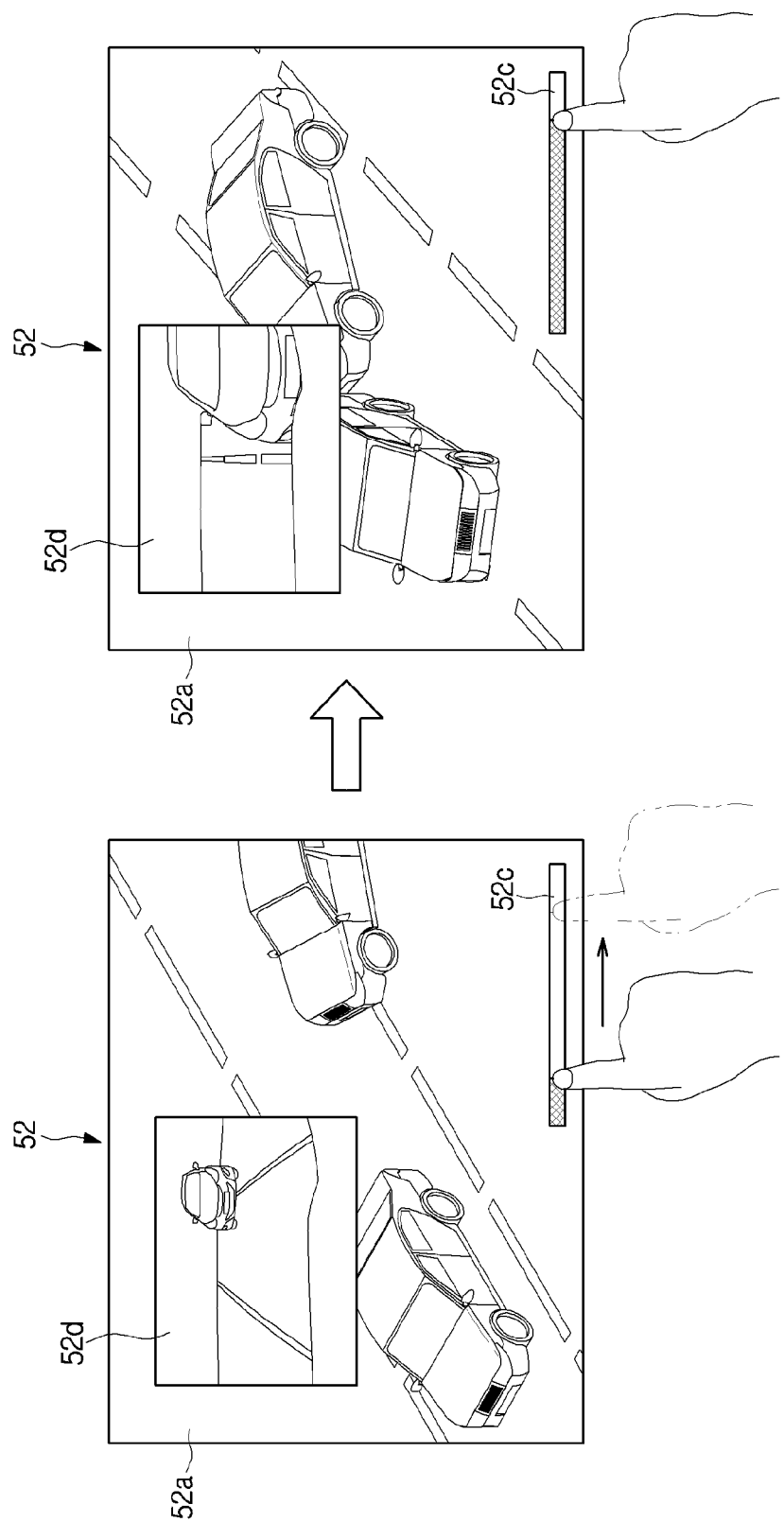

FIGS. 53 and 54 are conceptual diagrams illustrating exemplary methods for displaying the analysis result of the accident analysis device. For convenience of description and better understanding of the present disclosure, FIGS. 53 and 54 illustrate the exemplary cases in which the display unit 52 of the vehicle 50 displays the analysis result.

Although the server 40, the vehicle 50, the mobile device 60, each of which includes the accident analysis result 300, or other devices having received the accident analysis result from server 40, the vehicle 50, and the mobile device 60 can display the accident reenactment images, the information provision methods can be diversified in various ways to increase user convenience. As can be seen from FIG. 53, the display unit 52 of the vehicle 50 may display a basic screen image 52*a* on which the positions and attitudes of the accident vehicles (A, B) at the accident occurrence time can be displayed. If the user selects only one vehicle (e.g., the accident vehicle A) from among the above vehicles, the image captured by the selected accident vehicle A may be displayed on a popup window 52*b*. In this case, the displayed image may be a still image captured at an accident occurrence time from among the moving images captured by the accident vehicle A, or may be the moving image captured at the accident occurrence time. If the displayed image is the moving image, some moving images captured during a predetermined time before or after the accident occurrence time may be displayed.

If the user selects the accident vehicle B, the popup window 52*b* on which the images captured by the accident vehicle A is displayed may disappear, or may remain unchanged.

Alternatively, as can be seen from FIG. 54, a bar-shaped time display unit 52*c* for displaying a current time may be displayed at a lower end of the basic screen image 52*b* displayed on the display unit 52, such that the user may select a desired time by dragging the displayed bar shape to the left or the right. If the user selects the time, the positions and attitudes of the accident vehicle A and the accident vehicle B displayed on the basic screen 52*a* may be synchronized with the selected time and then changed, and the images displayed on the popup window 52*b* may also be synchronized with the selected time and then changed.

In addition, during the user-dragging time, at least one of the image displayed on the popup window 52*b* and the positions and attitudes of the accident vehicle A and the accident vehicle B may be synchronized with the user dragging action so that the positions and attitudes of the accident vehicles (A, B) and the image displayed on the popup window 52*b* may be successively changed. During the dragging time, the positions and attitudes of the accident vehicles (A, B) and the image displayed on the popup window 52*b* may remain unchanged. If the user stops dragging and finally selects a desired time, the positions and attitudes of the accident vehicles (A, B) and the image displayed on the popup window 52*b* may be synchronized with the selected time and then changed.

In contrast, if the display unit 52 is implemented as a touchscreen, the user input action may be achieved by user touch as shown in FIGS. 53 and 54. If the display unit 52 is not implemented as a touchscreen, the user input action may be achieved using a separate input unit such as a mouse or keyboard, etc.

A method for managing accident information and a method for analyzing accident information according to the embodiment will hereinafter be described with reference to the drawings.

Figure 55:
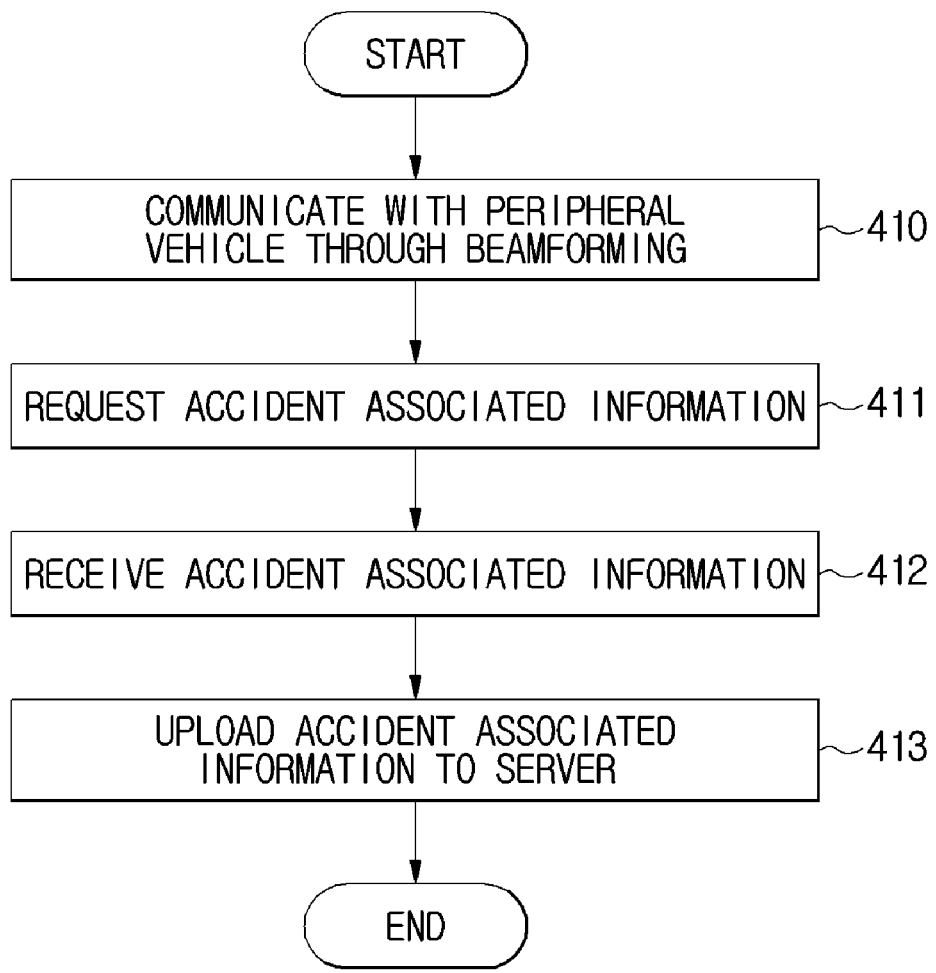
FIG. 55 is a flowchart illustrating an accident information management method according to an embodiment of the present disclosure.

FIG. 55 is a flowchart illustrating an accident information management method according to an embodiment of the present disclosure.

Referring to FIG. 55, when the accident information management method is performed, the accident information management apparatus 100 and the vehicle 1 including the same may be used. Therefore, the accident information management apparatus 100 and the vehicle 1 including the same may also be applied to the accident information management method according to this embodiment.

Referring to FIG. 55, in the case of using the accident information management method according to one embodiment, the vehicle may communicate with the peripheral vehicle through beamforming in operation 410. The vehicle 1 may include the accident information management apparatus 100. If the peripheral vehicle scheduled to request accident associated information is selected, beamforming may be performed in a manner that the beam pattern focused onto the selected peripheral vehicle can be transmitted to the peripheral vehicle. Meanwhile, the vehicle 1 may determine the position of the peripheral vehicle 20 so as to form the beam pattern focused onto the peripheral vehicle 20. For example, after the beam is emitted in all directions or several directions, it may be determined that the peripheral vehicle 20 is located in the return direction of a response message. In more detail, the vehicle 1 may transmit the request signal in all directions through the communication unit 120. If the acknowledgement (ACK) signal is fed back from the peripheral vehicles 20 located in the vicinity of the vehicle 1, it may be determined that the peripheral vehicle 20 is located in the return direction of the ACK signal. In this case, in order to more accurately recognize the position of the peripheral vehicle 20, GPS information may be contained in the ACK signal transmitted from the peripheral vehicle 20, such that the resultant ACK signal may be transmitted to a destination. In this case, although several peripheral vehicles are overlapped in the same direction on the basis of the position of the vehicle 1, the respective peripheral vehicles may be distinguished from one another.

In another example, the controller 110 may determine the position of the peripheral vehicle 20 on the basis of the output data of various sensors mounted to the vehicle 1, and as such a detailed description thereof will hereinafter be given.

Meanwhile, the vehicle 1 may also set a specific peripheral vehicle 20 located at a specific position from among the peripheral vehicles 20, the positions of which are determined, to a witness vehicle (i.e., a vehicle to be used for requesting the accident associated information).

If the vehicle 1 communicates with the peripheral vehicle 20, the vehicle 1 may request the accident associated information from the connected peripheral vehicle 20 in operation 411, and may receive the accident associated information from the peripheral vehicle 20 in operation 412. The accident associated information may include the accident associated images captured by the black box of the peripheral vehicle 20. In addition, when the peripheral vehicle 20 transmits the accident associated information to the vehicle 1, vehicle state information of the peripheral vehicle 20 may also be transmitted to the vehicle 1. Here, the vehicle state information may include various information regarding the position, attitude, speed, etc. of the peripheral vehicle 20. Meanwhile, the accident associated information may be requested when the accident occurs or when the accident occurrence is predicted. In addition, communication between the vehicle 1 and the peripheral vehicle 20 may also be achieved when the accident occurs or when the accident occurrence is predicted, however, it should be noted that the vehicle 1 may also communicate with the peripheral vehicle 20 in advance.

The vehicle 1 may upload the accident associated information received from the peripheral vehicle to the server 30 in operation 413. When the accident associated information is uploaded to the server 30, the vehicle 1 may upload vehicle state information of the peripheral vehicle 20, and vehicle state information of the vehicle 1 may also be uploaded to the server 30. In addition, the accident occurrence information that includes information regarding both the accident occurrence time and the accident occurrence position may also be uploaded to the server 30 as necessary. The server 30 may analyze the accident cause, the fault ratio, etc. using the uploaded information.

Figure 56:
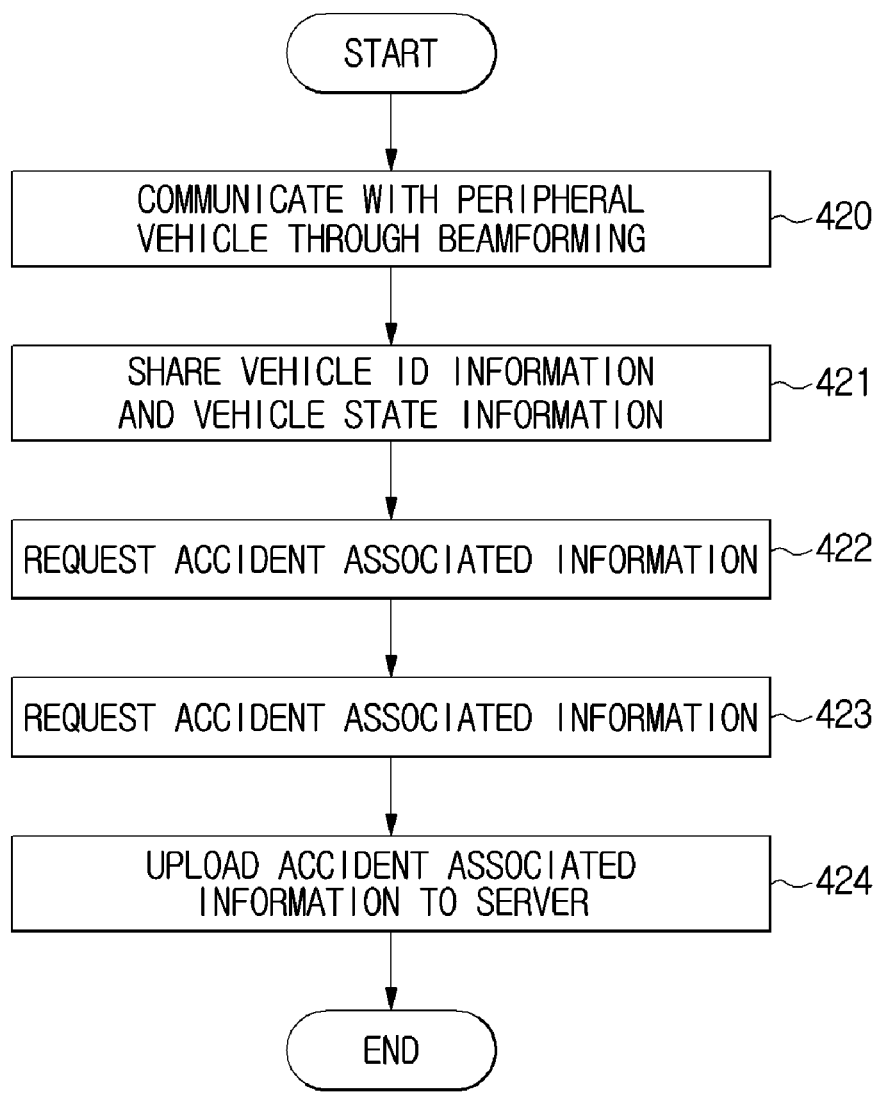
FIG. 56 is a flowchart illustrating a method for first sharing vehicle state information for use in an accident information management method according to an embodiment of the present disclosure.

FIG. 56 is a flowchart illustrating a method for first sharing vehicle state information for use in an accident information management method according to an embodiment of the present disclosure.

Referring to FIG. 56, the vehicle 1 may communicate with the peripheral vehicle through beamforming when the accident occurrence is predicted or before the accident occurs in operation 421. In this case, since there is a possibility that the accident may occur in the peripheral vehicle 20, the vehicle 1 may receive vehicle ID information and vehicle state information from the peripheral vehicle 20, and at the same time may transmit its own vehicle ID information and its own state information to the peripheral vehicle 20.

In addition, if the accident occurrence in the vehicle 1 is predicted or if the accident of the vehicle 1 occurs, the vehicle 1 may request accident associated information from the peripheral vehicle 20 in operation 422. Upon receiving the accident associated information from the peripheral vehicle 20 in operation 423, the vehicle 1 may upload the received accident associated information to the server 30 in operation 424. As described above, when the accident associated information is uploaded to the server 30, vehicle state information, vehicle ID information, and accident occurrence information of the vehicle 1 and the peripheral vehicle 20 may be simultaneously uploaded to the server 30.

Figure 57:
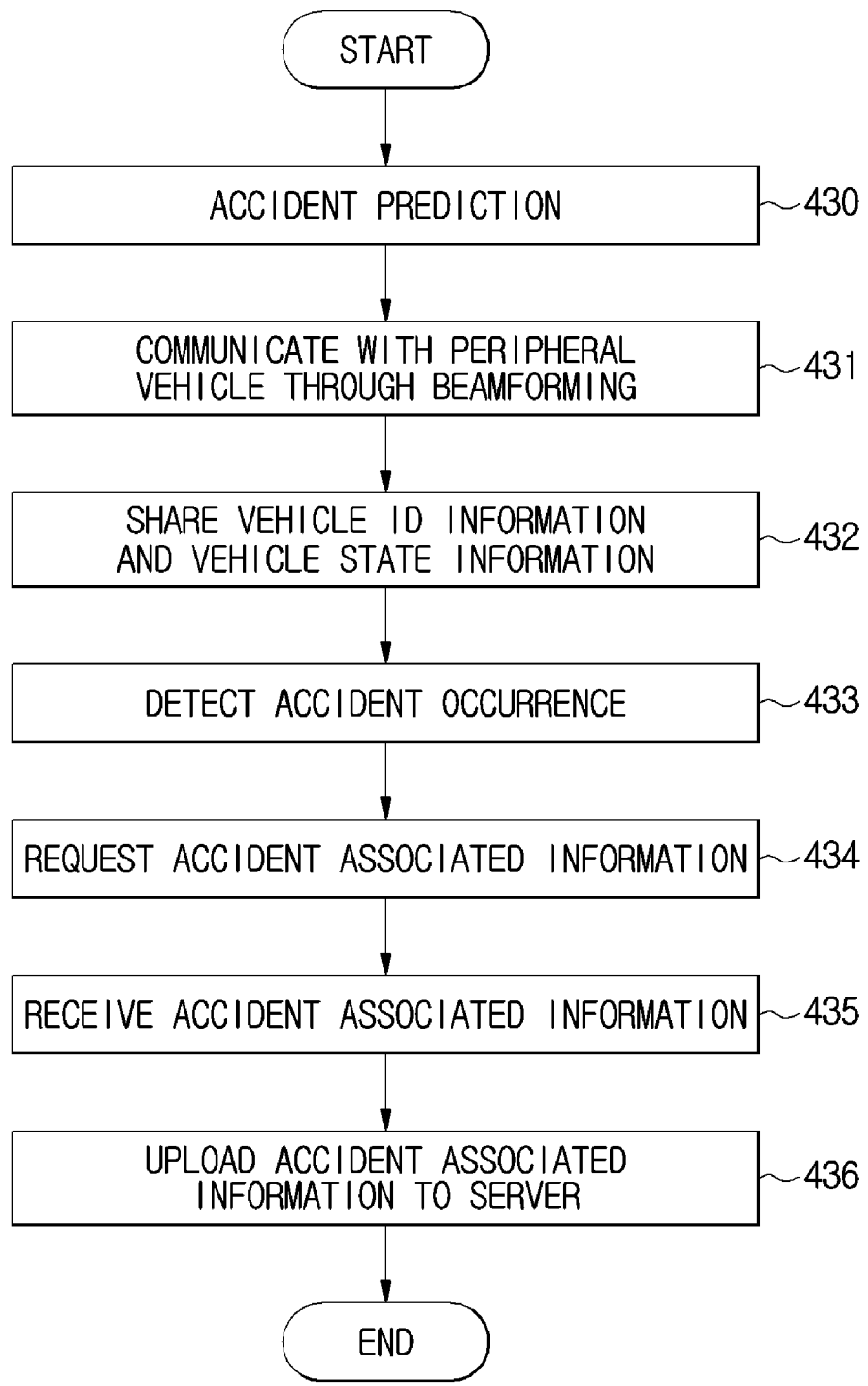
FIG. 57 is a flowchart illustrating a method for allowing a vehicle to communicate with peripheral vehicles when occurrence of accident is predicted, allowing the vehicle to receive accident associated information from the peripheral vehicles, for use in an accident information management method according to an embodiment of the present disclosure.

FIG. 57 is a flowchart illustrating a method for allowing a vehicle to communicate with peripheral vehicles when occurrence of accident is predicted, allowing the vehicle to receive accident associated information from the peripheral vehicles, for use in an accident information management method according to an embodiment of the present disclosure.

Referring to FIG. 57, the vehicle 1 may predict accident occurrence in operation 430, and may communicate with the peripheral vehicle through beamforming in operation 431. The controller 110 of the vehicle 1 may predict the accident occurrence on the basis of the detection result of the sensing unit 140. In more detail, at least one of the position of each object detected by either the proximity sensor 145 or the image sensor 141, reduction speed of the distance between the vehicle and the object, vehicle speed detected by the vehicle speed sensor 147, acceleration detected by the acceleration sensor 142, and the steering angle detected by the steering angle sensor 146 is analyzed so that the probability of collision can be determined and accident occurrence can be predicted.

If the vehicle 1 communicates with the peripheral vehicle 20, the vehicle 1 may share the vehicle ID information and the vehicle state information with the peripheral vehicle 20 in operation 432.

If the accident occurs in the vehicle 1 in operation 433, the vehicle 1 may request the accident associated information from the connected peripheral vehicle in operation 434. Upon receiving the accident associated information from the peripheral vehicle 20 in operation 435, the received accident associated information may be uploaded to the server in operation 436. The controller 110 of the vehicle 1 may determine the presence or absence of the accident on the basis of the detection result of the sensing unit 140. In more detail, the output data of at least one of the proximity sensor 145, the image sensor 141, the acceleration sensor 142, the collision sensor, and the gyro sensor 144 is analyzed, such that the presence or absence of the accident can be determined. In addition, the vehicle 1 may further include a sound sensor configured to detect sound or an acoustic signal. The vehicle 1 may simultaneously or independently analyze the output data of the sound sensor and the output data of other sensors, such that it may be possible to determine the presence or absence of the accident.

Referring to FIGS. 55 to 57, the server 30 having collected the accident associated information may store, manage, and analyze the collected accident associated information, so that the server may determine the accident cause or the fault ratio by analyzing the accident associated information. The analysis result may be transmitted to the vehicle 1, the insurance company (I), or the mobile device (M) such as a mobile phone, or may also be transmitted to the individual account (E) such as an email address. The analysis result may be transmitted to any one of the vehicle 1, the insurance company (I), the mobile device (M), and the individual account (E), or may be transmitted to all or some thereof (1, I, M, E) as necessary. Information regarding the insurance company (I), the mobile device (M), and the individual account (E), each of which receives the analysis result, may be simultaneously transmitted when the vehicle 1 uploads the accident occurrence information or the accident associated information to the server 30, or may be pre-stored in the server 30 before the accident occurrence time. Assuming that the above information is pre-stored in the server 30, a target object to be used for transmission of the accident analysis result when the accident occurs in each vehicle 1 may be predetermined as necessary.

Figure 58:
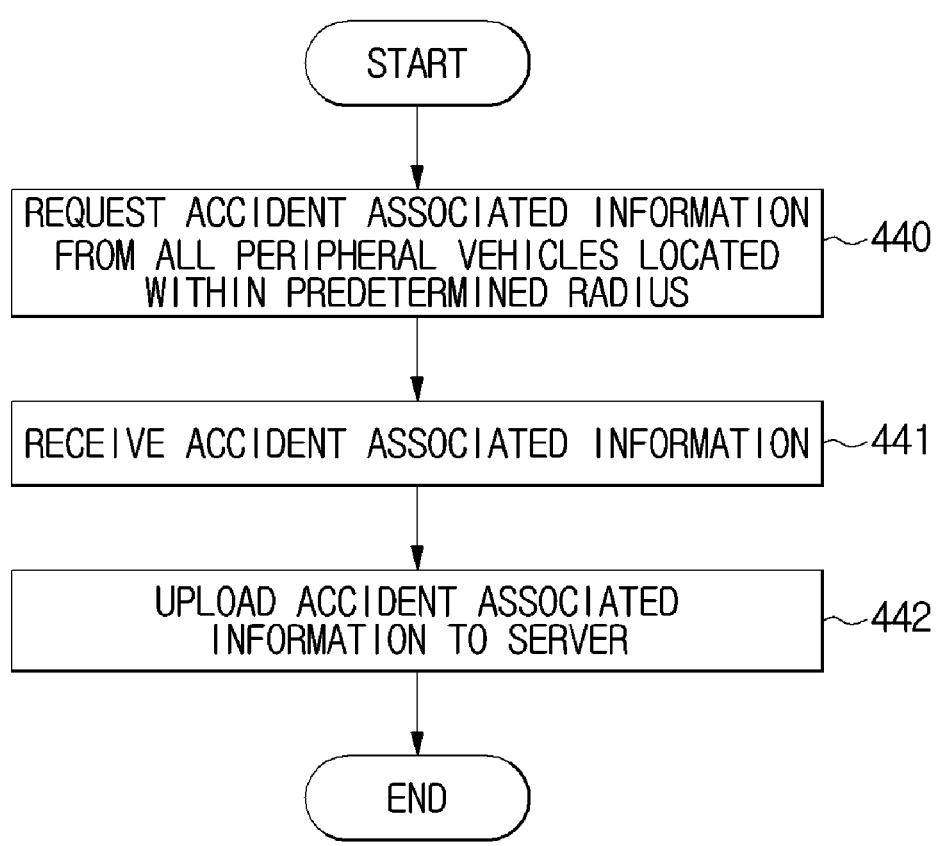
FIG. 58 is a flowchart illustrating an accident information management method according to another embodiment of the present disclosure.

FIG. 58 is a flowchart illustrating an accident information management method according to another embodiment of the present disclosure. The accident information management apparatus 200 and the vehicle 2 including the same may be applied to the accident information management method as necessary. Therefore, the accident information management apparatus 200 may also be applied to the accident information management method according to this embodiment.

Referring to FIG. 58, accident associated information is requested from all peripheral vehicles located within the predetermined radius in operation 440. It is assumed that the request of the accident associated information is achieved via the communication connection to the peripheral vehicles. In this case, communication connection to the peripheral vehicles may be achieved in advance, or may also be achieved when the accident associated information is requested. In addition, the accident associated information may be requested when the accident occurs or when the accident occurrence is predicted. In this case, communication between the communication unit 220 of the vehicle 2 and the communication unit 22 of the peripheral vehicle 20 may be D2D communication without using the BS. The predetermined radius (R) may be determined in consideration of Field Of View (FOV) or resolution, etc. of the black box mounted to the vehicle, or may be determined by communication coverage of the communication unit 220. In addition, the determined radius may also be changed by the user as necessary.

In this case, the communication unit 220 may include the beamforming module configured to focus signals in a specific direction as described above, such that the communication unit 220 may focus signals onto respective peripheral vehicles and transmit the focused signals to the respective peripheral vehicles according to the unicast or multicast scheme. However, the communication unit 220 may not include the beamforming module, and may scatter signals within the predetermined radius according to the broadcast scheme. Alternatively, the communication unit 220 may also transmit a signal to a specific peripheral vehicle using ID information of the peripheral vehicle according to the multicast scheme.

Upon receiving the accident associated information from the peripheral vehicle in operation 441, the received accident associated information is uploaded to the server in operation 442.

Figure 59:
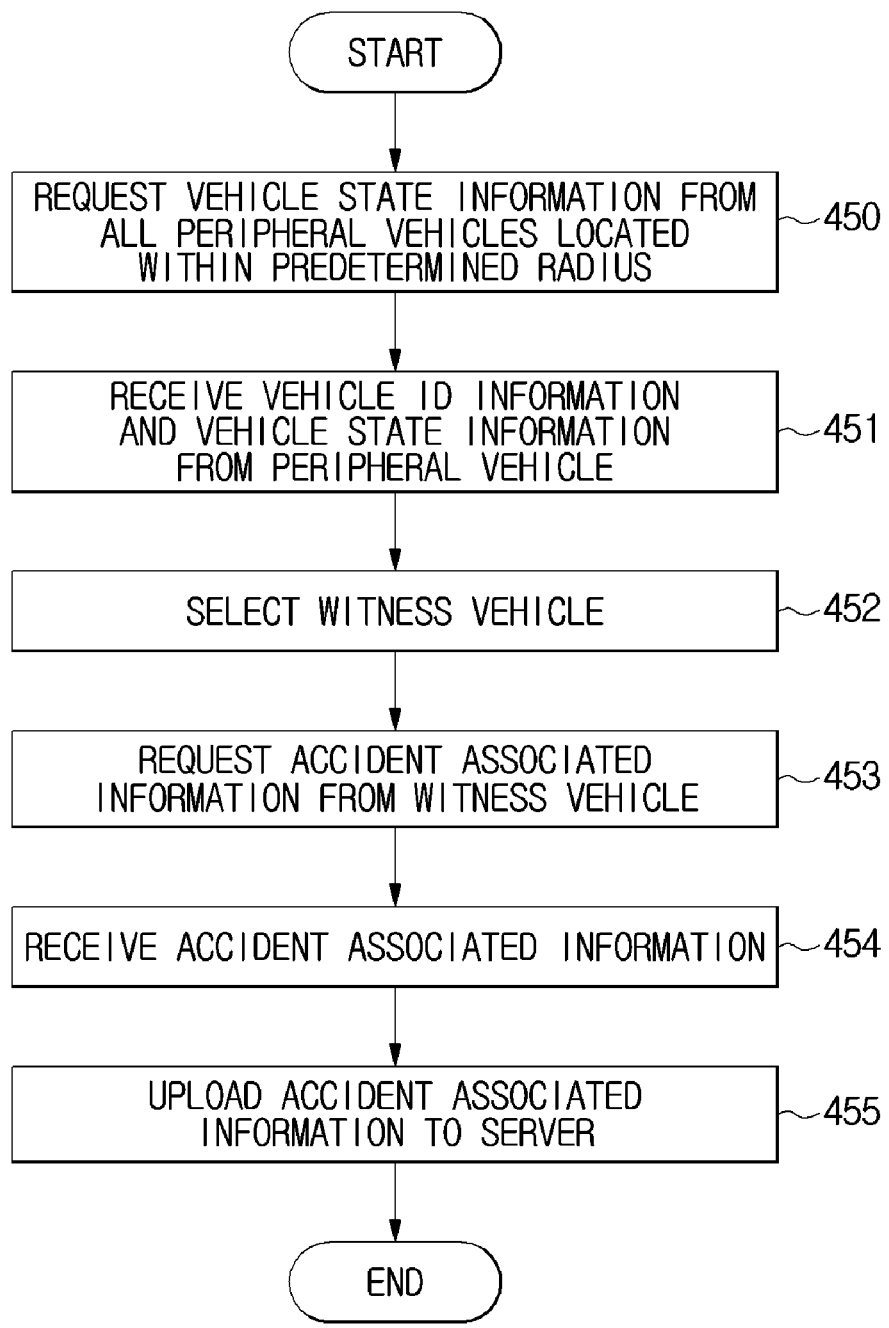
FIG. 59 is a flowchart illustrating a method for selecting a witness vehicle on the basis of state information of peripheral vehicles, for use in the accident information management method according to another embodiment of the present disclosure.

FIG. 59 is a flowchart illustrating a method for selecting a witness vehicle on the basis of state information of peripheral vehicles, for use in the accident information management method according to another embodiment of the present disclosure.

Referring to FIG. 59, the state information is requested from all the peripheral vehicles located within the predetermined radius in operation 450, and the vehicle ID information and the vehicle state information may be received from the peripheral vehicle in operation 451. A witness vehicle may be selected on the basis of the vehicle state information of the peripheral vehicle in operation 452. In more detail, the controller 210 may analyze the vehicle state information received from the peripheral vehicle 20 and select a witness vehicle according to the analysis result. The controller 210 may also use vehicle (2) state information obtained from the sensing unit 240 or the GPS receiver 260. For example, when the accident occurs, or during a predetermined time located before or after the accident occurrence time, the vehicle 2 receives the position and attitude of the peripheral vehicle 20 and the position, attitude, and speed of the vehicle 2, such that the vehicle 2 may select a specific peripheral vehicle 20 as a witness vehicle. Here, the specific peripheral vehicle 20 will be used to capture the event generated in the vehicle 2 either at the accident occurrence time or before or after the accident occurrence time. In this case, the accident occurrence part, and the FOV or position of the black box mounted to the peripheral vehicle 20 may be considered. When the peripheral vehicle 20 transmits vehicle state information to the vehicle 2, the FOV or position of the black box may also be transmitted to the vehicle 2.

If the vehicle 1 requests accident associated information from the selected witness vehicle in operation 453 or receives the accident associated information from the selected witness vehicle in operation 454, the vehicle 1 may upload the received accident associated information to the server 30 in operation 455. Requesting of the vehicle state information and the accident associated information may be achieved when the accident occurrence is predicted or when the accident occurs. Such requesting of the vehicle state information may be achieved when the accident occurrence is predicted or before the accident occurs. Here, the accident associated information may be requested when the accident occurrence is predicted or when the accident occurs.

Figure 60:
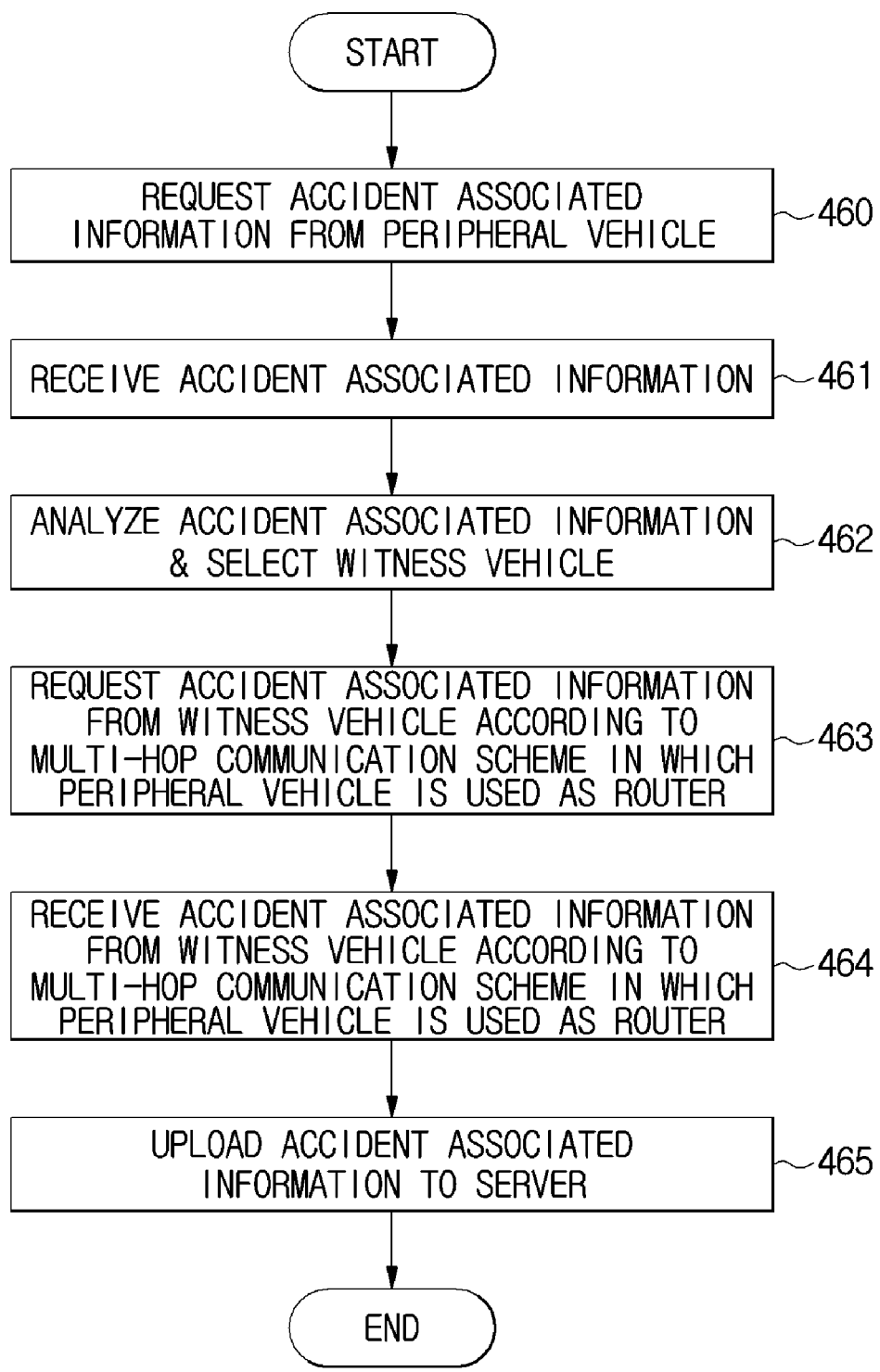
FIG. 60 is a flowchart illustrating a method for selecting a witness vehicle on the basis of accident associated information of peripheral vehicles, for use in the accident information management method according to another embodiment of the present disclosure.

FIG. 60 is a flowchart illustrating a method for selecting a witness vehicle on the basis of accident associated information of peripheral vehicles, for use in the accident information management method according to another embodiment of the present disclosure.

Referring to FIG. 60, if the accident associated information is requested from the peripheral vehicle in operation 460, and if the vehicle 2 receives accident associated information from the peripheral vehicle in operation 461, the vehicle 2 may analyze the accident associated information and may select a witness vehicle according to the analysis result in operation 462. The peripheral vehicle having transmitted the accident associated information to the vehicle 2 may be an arbitrary peripheral vehicle located in the communication coverage of the vehicle 2 from among a plurality of peripheral vehicles having transmitted the accident associated information, or may be a witness vehicle selected according to the analysis result of the vehicle state information. However, it is assumed that this peripheral vehicle may be located in the communication coverage within which the peripheral vehicle can directly communicate with the vehicle 20. The accident associated information may include the accident associated images, and a specific peripheral vehicle expected to be used for capturing the accident scene, from among plural peripheral vehicles shown in the accident associated image may be determined to be a new witness vehicle. If the new witness vehicle is the peripheral vehicle that has not transmitted the accident associated information to the vehicle 2, the vehicle 2 may request the accident associated information from the witness vehicle. In this case, if the witness vehicle is not located in the communication coverage in which the witness vehicle can directly communicate with the vehicle 2, the vehicle 2 may request accident associated information from the witness vehicle using another peripheral vehicle located in the above direct communication coverage as a router according to the multi-hop communication scheme in operation 463.

In addition, upon receiving the accident associated information from the witness vehicle, the vehicle 2 may receive the accident associated information from the witness vehicle according to the multi-hop communication scheme in which using the peripheral vehicle is used as a router in operation 464. The vehicle 2 may upload the received accident associated information to the server 30 in operation 465.

Figure 61:
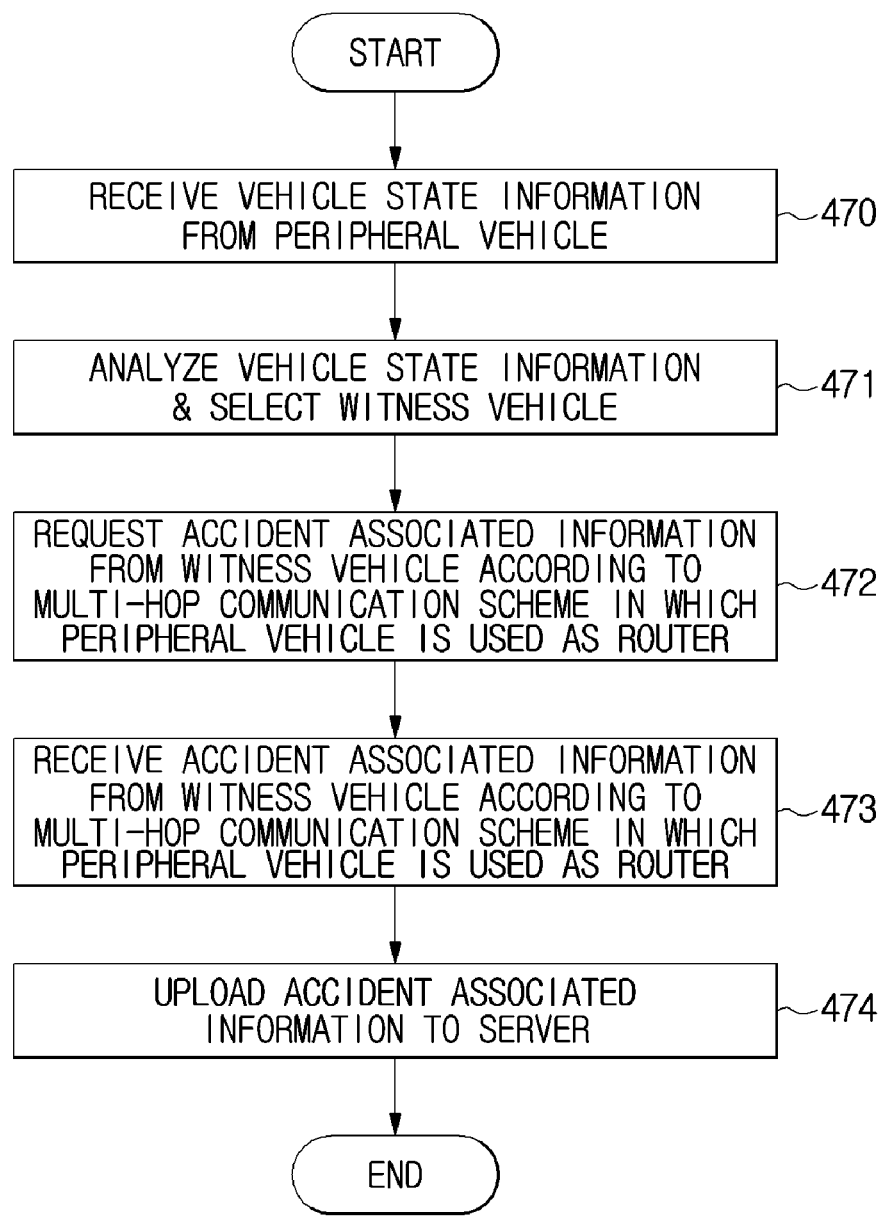
FIG. 61 is a flowchart illustrating a method for selecting a witness vehicle on the basis of vehicle state information received from peripheral vehicles, for use in the accident information management method according to another embodiment of the present disclosure.

FIG. 61 is a flowchart illustrating a method for selecting a witness vehicle on the basis of vehicle state information received from peripheral vehicles, for use in the accident information management method according to another embodiment of the present disclosure.

Referring to FIG. 61, the vehicle 2 may receive vehicle state information from the peripheral vehicle in operation 470. Referring to FIG. 35, vehicle state information may be shared among the peripheral vehicles (20-1, 20-2, 20-3, 20-4), and the vehicle 2 may receive vehicle state information from the peripheral vehicle 1 (20-1) located in the communication coverage (C) of the vehicle 2. The vehicle state information received from the peripheral vehicle 1 (20-1) may include not only vehicle state information of the peripheral vehicle 1 (20-1) but also vehicle state information of other peripheral vehicles (20-2, 20-3, 20-4).

The vehicle 2 may select a witness vehicle by analyzing vehicle state information in operation 471. For example, the peripheral vehicle expected as a witness vehicle having captured the situation of the occurrence time of the accident generated in the vehicle 2 or the other situation obtained for a predetermined time before or after the accident occurrence time, upon receiving the position and attitude of the vehicle 2 and the position, attitude, and speed of the peripheral vehicles (20-1, 20-2, 20-3, 20-4). In this case, the position, attitude, and speed of various peripheral vehicles located in the vicinity of the vehicle 2 are simultaneously analyzed, such that it may also be possible to consider a specific situation in which a visual field of the black box mounted to each peripheral vehicle is hidden or covered by other peripheral vehicles.

If the witness vehicle is selected, accident associated information may be requested from the witness vehicle according to the multi-hop communication scheme in which using the peripheral vehicle is used as a router in operation 472. In addition, the vehicle 2 may receive the accident associated information from the witness vehicle according to the multi-hop communication scheme in which the peripheral vehicle is used as a router in operation 473.

In addition, the accident associated information may be uploaded to the server in operation 474.

Meanwhile, when an accident occurs in the peripheral vehicle, the vehicle 2 may also provide this peripheral vehicle with accident associated information, and a detailed description thereof will hereinafter be given with reference to FIG. 62.

Figure 62:
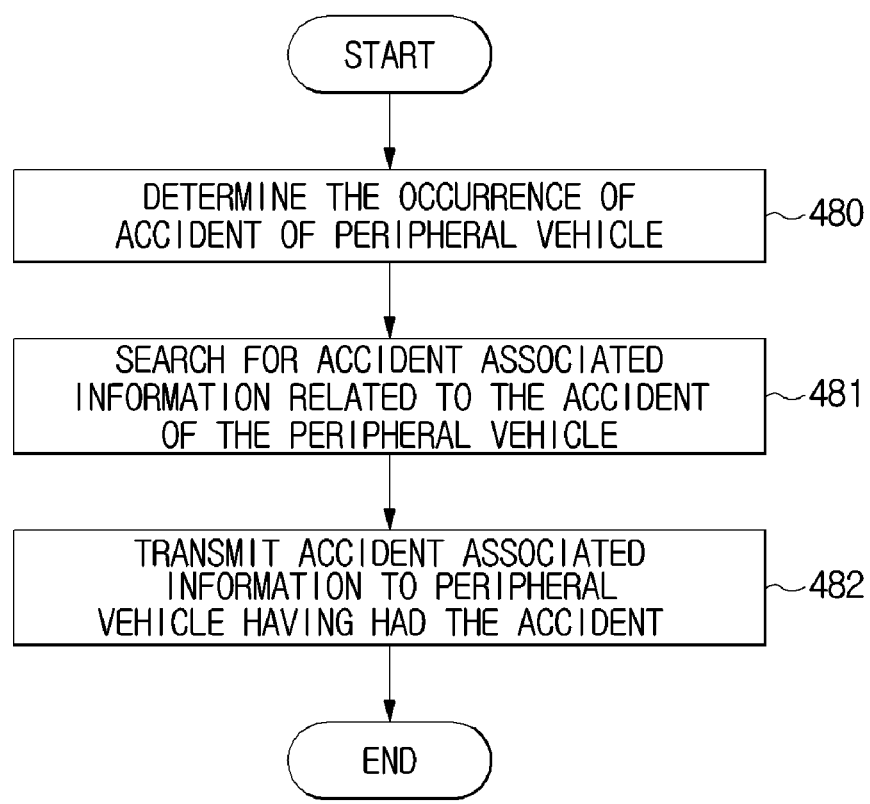
FIG. 62 is a flowchart illustrating an accident information management method in which a vehicle determines the presence or absence of accidents of peripheral vehicles and provides accident associated information.

FIG. 62 is a flowchart illustrating an accident information management method in which a vehicle determines the presence or absence of accidents of peripheral vehicles and provides accident associated information.

Referring to FIG. 62, the vehicle 2 may determine whether the accident occurs in the peripheral vehicle 20 in operation 480. For example, the vehicle 2 may detect the accident of the peripheral vehicle 20 on the basis of the detection result of the sensing unit 240. For example, if the proximity sensor detects the presence of the peripheral vehicle 20 in the vicinity of the vehicle 2, and if sound volume detected by the sound sensor of the sensing unit 240 is equal to or higher than a predetermined reference volume, it may be determined that the accident has occurred in the peripheral vehicle 20. Alternatively, it may also be determined that the accident has occurred in the peripheral vehicle 20 by analyzing images captured by the image sensor. In this case, it may be determined whether the peripheral vehicle 20 is damaged or broken in shape according to the image processing algorithm. Alternatively, if the speed of the peripheral vehicle 20 detected by the proximity sensor or the image sensor is equal to or less than a predetermined reference speed as compared to other peripheral vehicles, it may be determined that the accident has occurred in the peripheral vehicle 20. Alternatively, if light is detected by the image sensor or the proximity sensor, light brightness or light duration, etc. is compared with a predetermined reference value, such that it may be possible to determine whether the detected light has occurred due to the accident generated in the peripheral vehicle 20.

If the accident occurs in the peripheral vehicle, the vehicle 2 may search for information associated with the corresponding accident in operation 481, and may transmit the accident associated information to the peripheral vehicle in operation 482. The accident associated information associated with the accident of the peripheral vehicle may include images captured for a predetermined time before or after the accident occurrence time, from among a plurality of images stored in the storage unit 230. In addition, during transmission of the accident associated information, vehicle state information of the vehicle 2 may also be transmitted. Alternatively, the vehicle may directly upload the accident associated information without transmitting the accident associated information to the peripheral vehicle 20. Here, the accident occurrence information of the peripheral vehicle 20 may also be uploaded.

The accident information analysis method according to the embodiment will hereinafter be described with reference to FIG. 63.

Figure 63:
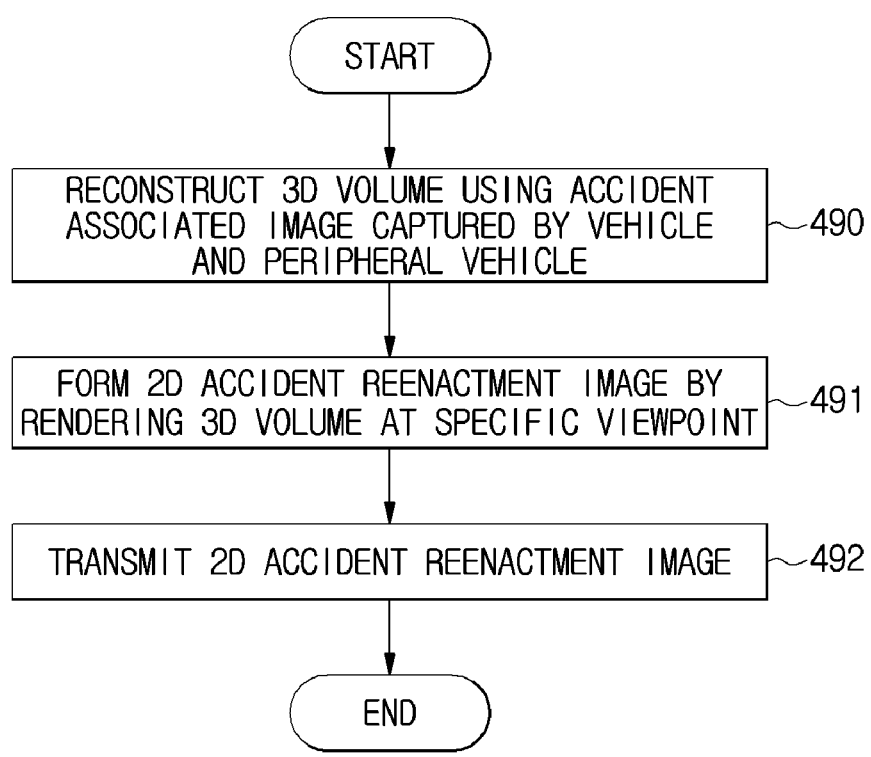
FIG. 63 is a flowchart illustrating an accident information analysis method according to an embodiment of the present disclosure.

FIG. 63 is a flowchart illustrating an accident information analysis method according to an embodiment of the present disclosure. When the accident information analysis method according to this embodiment is performed, the accident information analysis apparatus 300 may be used, and it should be noted that a detailed description of the accident information analysis apparatus 300 can be applied to the accident information analysis method according to this embodiment without departing from the scope and spirit of the present disclosure.

Referring to FIG. 63, the 3D volume may be reconstructed using the accident associated images captured by the vehicle and the peripheral vehicle in operation 490. In this case, the vehicle may be an accident vehicle having had the accident. Information regarding the accident of the vehicle may be stored in the storage unit 310 of the accident analysis device 300. The accident associated information may include not only the vehicle state information (e.g., the position, attitude, and speed of the vehicle), but also the accident associated information including the accident associated images directly captured by the image sensor. This accident associated information may be stored as the accident vehicle information. The vehicle state information (e.g., the position, attitude, and speed of the peripheral vehicle 20) and the accident associated information including the accident associated images captured by the black box (i.e., the image sensor) of the peripheral vehicle 20 may be stored as the peripheral vehicle information. If there are 2D images obtained when the same accident scene is captured from different viewpoints, the 3D reconstruction unit 321 may extract the common characteristic points from the plural 2D images so that it can reconstruct the 3D volume. If the moving images are stored in the storage unit 310, it may be possible to reconstruct the 3D volume using frame images corresponding to the same time point from among the plurality of moving images captured by different viewpoints.

The 3D volume is rendered at a specific time so that the 2D accident reenactment image is formed in operation 491 and the 2D accident reenactment image is transmitted in operation 492. The reception object of the accident reenactment image may be changed according to the installation position of the accident analysis device 300. For example, if the accident information analysis device 300 is contained in the server 40, the accident reenactment image may be transmitted to the accident vehicles, the insurance company, the mobile device, the individual account, etc. Alternatively, if the accident information analysis device 300 is contained in the accident vehicle 1 (50-1), the accident reenactment image may be transmitted to the accident vehicle 2 (50-2), the server 40, the insurance company, the mobile device, the individual account, etc. Alternatively, if the accident analysis device 300 is contained in the mobile device 60, the accident reenactment image may be transmitted to the accident vehicles, the insurance company, the mobile device, the individual account, etc.

Figure 64:
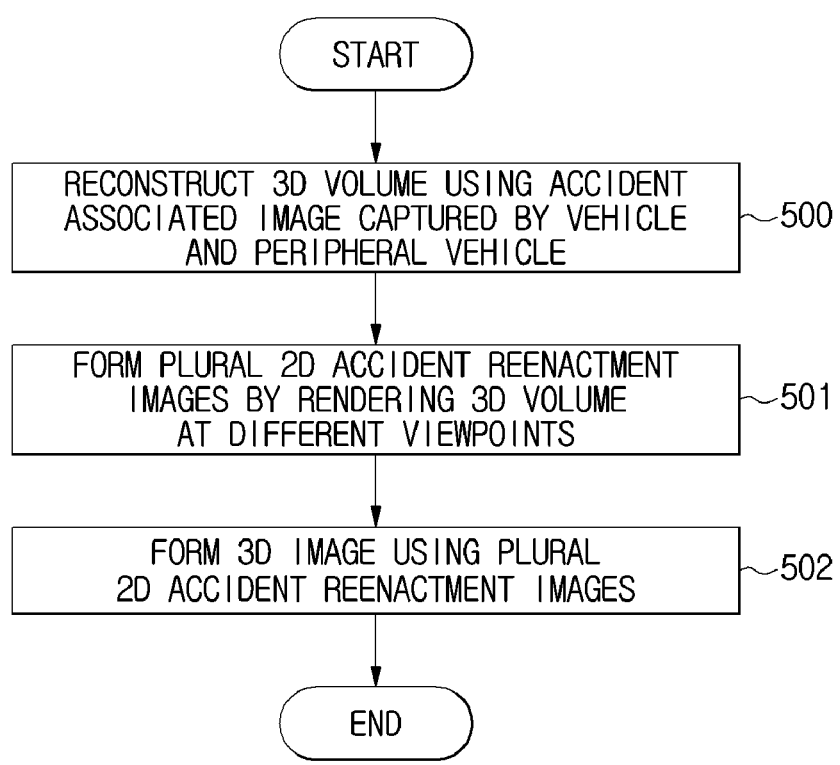
FIG. 64 is a flowchart illustrating a method for constructing an accident reenactment image in the form of 3D images, for use in the accident information analysis method according to an embodiment of the present disclosure.

FIG. 64 is a flowchart illustrating a method for constructing an accident reenactment image in the form of 3D images, for use in the accident information analysis method according to an embodiment of the present disclosure.

Referring to FIG. 64, the 3D volume is reconstructed using the accident associated images captured by the vehicle and the peripheral vehicle in operation 500. The 3D volume is rendered at different viewpoints so that the 2D accident reenactment image is formed in operation 501. The 3D image may be generated using a plurality of 2D accident reenactment images in operation 502. The rendering viewpoint may be determined according to the output format of the 3D image. If the output format corresponds to the autostereoscopic scheme, a multi-view stereoscopic image formed by combining the accident reenactment images rendered at different viewpoints may be displayed. In this case, although a viewer user does not wear special glasses, the user can view the accident reenactment images in the form of the 3D images.

Figure 65:
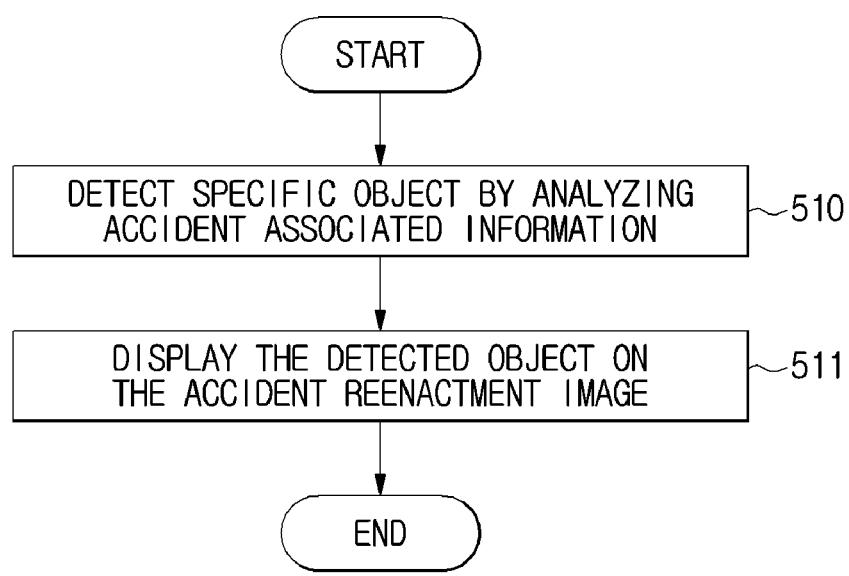
FIG. 65 is a flowchart illustrating a method for detecting a specific object associated with an accident and displaying the detected object, for use in the accident information analysis method according to an embodiment of the present disclosure.

FIG. 65 is a flowchart illustrating a method for detecting a specific object associated with an accident and displaying the detected object, for use in the accident information analysis method according to an embodiment of the present disclosure.

Referring to FIG. 65, a specific object is detected by analyzing the accident associated images in operation 510. For example, if the object to be detected is a traffic lane, images captured or generated at different viewpoints or at different times are analyzed so that the traffic lane hidden by the accident vehicle may be detected, and map data stored in the storage unit 310 is matched to the accident occurrence information, such that the traffic lane can be detected. Alternatively, although the traffic lane is hidden by the accident vehicle, the 3D volume concerned with the accident scene may include 3D spatial information, and voxel data constructing the 3D volume may include information regarding the hidden traffic lane. Therefore, the presence and position of the traffic lane may also be determined according to the analysis result of 3D volume. Alternatively, traffic lane information may be contained in the map data stored in the storage unit 310. Therefore, if the accident occurrence position is searched for in the stored map data, the presence and position of the traffic lane in the accident scene may be determined.

The detected object may be displayed on the accident reenactment image in operation 511. That is, the accident reenactment image on which the detected object is displayed may be displayed. For example, if the detected object is a traffic lane, the hidden traffic lane (L) of the accident reenactment image may be denoted by dotted lines.

The accident information management apparatus, the vehicle including the same, the accident information analysis apparatus, the accident information collection method, and the accident information analysis method according to the embodiments of the present disclosure can allow the vehicle to directly receive the accident associated information from the peripheral vehicle through V2V communication, such that the accident cause can be definitively dinvestigated. In addition, since the 5G communication scheme is used in V2V communication or Vehicle-to-Server (V2S) communication, such that real-time data can be efficiently acquired. As a result, a variation in the positional relationship between vehicles moving from one place to another place in real time can be rapidly and effectively reflected in the accident investigation process.

In addition, the beamforming scheme is applied to communication between one vehicle and the peripheral vehicle, such that signal interference can be minimized, resulting in implementation of efficient communication.

Moreover, information obtained before or after the accident occurrence time can be acquired in real time, such that the acquired information can be used to analyze the accident cause.

As is apparent from the above description, the accident information management apparatus, a vehicle including the same, and a method for managing accident information according to the embodiments of the present disclosure can acquire accident associated information such as images stored in a black box (i.e., black box images) from a peripheral vehicle through direct communication between vehicles when an accident such as a traffic accident occurs.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A vehicle comprising:
   a communication unit configured to perform D2D (Device to Device) communication with a first peripheral vehicle; and
   a controller configured to control the communication unit to request at least one of accident associated information and vehicle state information from the first peripheral vehicle, and to select a witness vehicle on the basis of any one of the accident associated information and the vehicle state information received from the first peripheral vehicle,
   wherein the controller analyzes at least one of the accident associated information and the vehicle state information received from the first peripheral vehicle, and selects a second peripheral vehicle, having captured an event generated in the vehicle during a predetermined time before or after an accident occurrence time, as the witness vehicle,
   wherein the accident associated information received from the first peripheral vehicle includes an accident associated image captured by the first peripheral vehicle and includes at least one of a position of an image sensor mounted to the first peripheral vehicle and a position of the first peripheral vehicle shown in the captured image and an attitude of the first peripheral vehicle shown in the captured image, and
   wherein the vehicle state information received from the first peripheral vehicle includes at least one of a speed, the position, and the attitude of the first peripheral vehicle and the second peripheral vehicle located in the vicinity of the first peripheral vehicle.

2. The vehicle according to claim 1, wherein the controller controls the communication unit to request at least one of the accident associated information and the vehicle state information from all the first peripheral vehicles located in a predetermined radius of the vehicle.

3. The vehicle according to claim 1, wherein the controller controls the communication unit to request the accident associated information from the witness vehicle.

4. The vehicle according to claim 3, wherein the communication unit requests the accident associated information from the witness vehicle according to a multi-hop communication scheme in which the first peripheral vehicle is used as an intermediate node.

5. The vehicle according to claim 3, wherein the communication unit receives the accident associated information from the witness vehicle according to a multi-hop communication scheme in which the first peripheral vehicle is used as an intermediate node.

6. The vehicle according to claim 5, wherein:
   the witness vehicle is a first witness vehicle; and
   the controller selects a second witness vehicle on the basis of the accident associated information received from the first witness vehicle.

7. The vehicle according to claim 6, wherein the communication unit requests the accident associated information from the second witness vehicle and receives the accident associated information from the second witness vehicle, according to the multi-hop communication scheme in which the first peripheral vehicle is used as a first intermediate node and the first witness vehicle is used as a second intermediate node.

8. The vehicle according to claim 1, wherein the controller controls the communication unit to request the accident associated information from the first peripheral vehicle either at an accident prediction time or at the accident occurrence time.

9. The vehicle according to claim 1, wherein the controller controls the communication unit to upload the accident associated information received from the first peripheral vehicle, and the witness vehicle, accident associated information and accident occurrence information obtained from the vehicle to a server configured to analyze the accident associated information.

10. An accident information management method for collecting accident associated information from a first peripheral vehicle, the method comprising:
    communicating with the first peripheral vehicle through D2D (Device to Device) communication;
    requesting at least one of accident associated information and vehicle state information from the first peripheral vehicle; and
    selecting a witness vehicle on the basis of any one of the accident associated information and the vehicle state information received from the first peripheral vehicle,
    wherein the selecting the witness vehicle includes:
    analyzing at least one of the accident associated information and the vehicle state information received from the first peripheral vehicle; and
    selecting a second peripheral vehicle, having captured an event generated in the vehicle during a predetermined time before or after an accident occurrence time, as the witness vehicle,
    wherein the accident associated information received from the first peripheral vehicle includes an accident associated image captured by the first peripheral vehicle and includes at least one of a position of an image sensor mounted to the first peripheral vehicle and a position of the first peripheral vehicle shown in the captured image and an attitude of the first peripheral vehicle shown in the captured image, and
    wherein the vehicle state information received from the first peripheral vehicle includes at least one of a speed, the position, and the attitude of the first peripheral vehicle and the second peripheral vehicle located in the vicinity of the first peripheral vehicle.

11. The accident information management method according to claim 10, wherein the requesting at least one of accident associated information and vehicle state information from the first peripheral vehicle includes:
    requesting at least one of the accident associated information and the vehicle state information from all the peripheral vehicles located in a predetermined radius.

12. The accident information management method according to claim 10, further comprising:
    requesting the accident associated information from the witness vehicle.

13. The accident information management method according to claim 10, wherein the requesting the accident associated information from the new witness vehicle includes:
    requesting the accident associated information from the witness vehicle according to a multi-hop communication scheme in which the first peripheral vehicle is used as an intermediate node.

14. The accident information management method according to claim 13, further comprising:
    receiving the accident associated information from the witness vehicle according to the multi-hop communication scheme in which the first peripheral vehicle is used as an intermediate node.

15. The accident information management method according to claim 14, wherein the witness vehicle is a first witness vehicle, and further comprising:
- selecting a second witness vehicle on the basis of the accident associated information received from the first witness vehicle.

16. The accident information management method according to claim 15, further comprising:
- requesting the accident associated information from the second witness vehicle, and receiving the accident associated information from the second witness vehicle, according to a multi-hop communication scheme in which the first peripheral vehicle is used as an intermediate node and the first witness vehicle is used as a second intermediate node.

17. The accident information management method according to claim 10, further comprising:
- uploading the accident associated information received from the first peripheral vehicle, and the witness vehicle, accident associated information and accident occurrence information obtained from the vehicle to a server configured to analyze the accident associated information.

* * * * *